(12) United States Patent
Mohebbi

(10) Patent No.: US 8,086,174 B2
(45) Date of Patent: *Dec. 27, 2011

(54) SHORT-RANGE CELLULAR BOOSTER

(75) Inventor: Behzad Mohebbi, San Diego, CA (US)

(73) Assignee: Nextivity, Inc., San Diego, CA (US)

( * ) Notice: Subject to any disclaimer, the term of this patent is extended or adjusted under 35 U.S.C. 154(b) by 94 days.

This patent is subject to a terminal disclaimer.

(21) Appl. No.: 12/422,221

(22) Filed: Apr. 10, 2009

(65) Prior Publication Data

US 2009/0325481 A1 Dec. 31, 2009

Related U.S. Application Data

(63) Continuation of application No. 10/597,119, filed on Jul. 12, 2006, now Pat. No. 7,519,323.

(51) Int. Cl.
*H04B 7/15* (2006.01)

(52) U.S. Cl. ............... 455/11.1; 455/13.1; 455/13.4; 455/15; 455/41.2

(58) Field of Classification Search .......... 455/11.1, 455/41.2, 7, 422.1, 466, 557, 132, 13.1, 560, 455/3.01, 151.2, 571, 522, 13.4, 16, 15; 370/280, 370/315, 310, 343, 447
See application file for complete search history.

(56) References Cited

U.S. PATENT DOCUMENTS

| 4,083,009 | A | | 4/1978 | Bickford et al. |
| 5,847,663 | A | | 12/1998 | Chasek |
| 5,950,124 | A | * | 9/1999 | Trompower et al. ....... 455/422.1 |
| 6,130,881 | A | | 10/2000 | Stiller et al. |
| 7,519,323 | B2 | * | 4/2009 | Mohebbi ..................... 455/11.1 |
| 2002/0028655 | A1 | | 3/2002 | Rosener et al. |
| 2002/0115409 | A1 | * | 8/2002 | Khayrallah .................... 455/41 |
| 2006/0046642 | A1 | * | 3/2006 | Bassiri et al. ...................... 455/7 |
| 2009/0129442 | A1 | * | 5/2009 | Mohebbi et al. ............. 375/130 |

(Continued)

FOREIGN PATENT DOCUMENTS

EP 0442617 A1 8/1991

(Continued)

OTHER PUBLICATIONS

KIPO English Translation of Notice of Preliminary Rejection issued by the Korean Intellectual Property Office dated Oct. 30, 2009 issued in connection with counterpart Korean Patent Application No. 7016350/2006.

(Continued)

*Primary Examiner* — Tan Trinh

(74) *Attorney, Agent, or Firm* — Mintz Levin Cohn Ferris Glovsky and Popeo, P.C.

(57) ABSTRACT

A repeater mediates traffic between a network transceiver and a user transceiver in a wireless communication system. The repeater comprises a network unit that maintains a network link with the network transceiver, a user unit that maintains a user link with the user transceiver, a two-way communication pathway between the network unit and the user unit; that facilitate the communication of signals between the network transceiver and the user transceiver in autonomous repeater hops between the network transceiver and the network unit, between the user transceiver and the user unit, and between the network unit and the user unit, and beam-formers respectively coupled to the network unit and the user unit and adapted to communicate signals in an operating frequency band of the network and user transceivers and to control effective radiated power.

20 Claims, 27 Drawing Sheets

U.S. PATENT DOCUMENTS

2009/0239521 A1 * 9/2009 Mohebbi .................. 455/422.1

FOREIGN PATENT DOCUMENTS

| JP | 02-109439 A | 4/1990 |
| JP | 09-064798 A | 3/1997 |
| JP | 2001-196994 A | 7/2001 |
| JP | 2001-223628 A | 8/2001 |
| JP | 2002-111571 A | 4/2002 |
| JP | 2002-538640 T | 11/2002 |
| JP | 2003-032739 A | 1/2003 |
| JP | 2003-087217 A | 3/2003 |
| JP | 2003-298496 A | 10/2003 |
| JP | 2003-347843 A | 12/2003 |
| KR | 2001-42878 | 5/2001 |
| KR | 2001-44887 | 6/2001 |
| WO | WO-98/54844 A1 | 12/1998 |
| WO | WO-00/50971 A2 | 8/2000 |
| WO | WO 01/52447 | 7/2001 |
| WO | WO-02/33996 A1 | 4/2002 |
| WO | WO-03/032524 A1 | 4/2003 |

OTHER PUBLICATIONS

Examination Report dated Aug. 30, 2011, issued by the Indian Patent Office for counterpart Indian Applicaiton No. 2940/CHENP/2006.

* cited by examiner $\tau_f = \tau_{Us} + \tau_{P1}$
$\tau_t = \tau_{Nrx} + \tau_d + \tau_{Ntx} + \tau_{P2} + \tau_f = \tau_d + \tau_{P2} + \tau_{P1}$

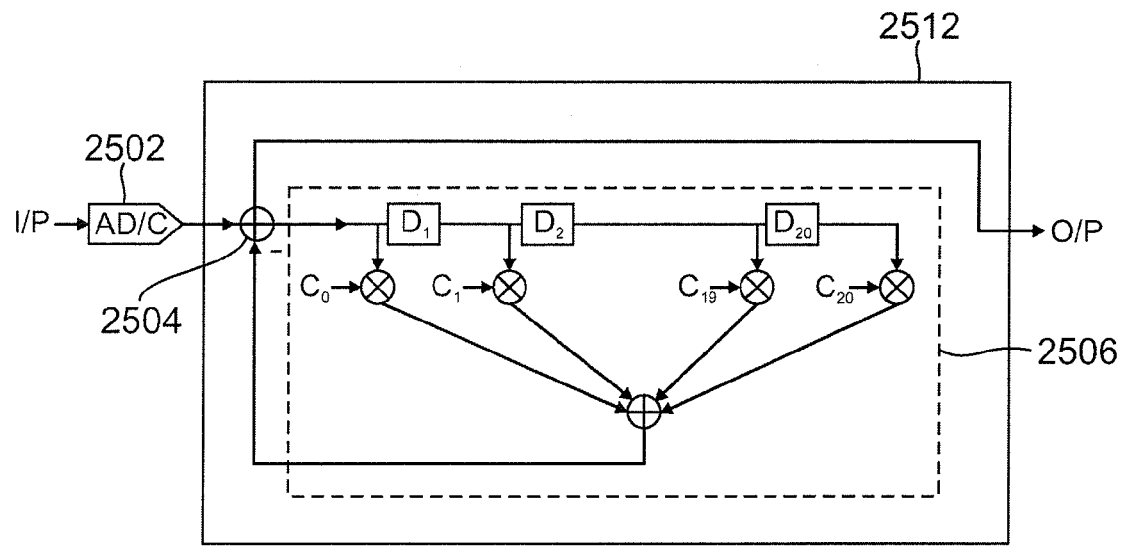
FIG. 15A
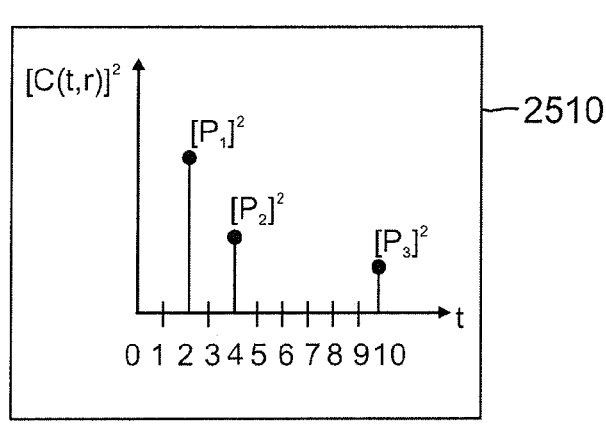
FIG. 15B
| | |
|---|---|
| $C_0=0$ | $C_{11}=0$ |
| $C_1=0$ | $C_{12}=P_1$ |
| $C_2=0$ | $C_{13}=0$ |
| $C_3=0$ | $C_{14}=P_2$ |
| $C_4=0$ | $C_{15}=0$ |
| $C_5=0$ | $C_{16}=0$ |
| $C_6=0$ | $C_{17}=0$ |
| $C_7=0$ | $C_{18}=0$ |
| $C_8=0$ | $C_{19}=0$ |
| $C_9=0$ | $C_{20}=P_3$ |
| $C_{10}=0$ | |
FIG. 15C

SHORT-RANGE CELLULAR BOOSTER

CROSS REFERENCE TO RELATED APPLICATIONS

This application is a continuation and claims the benefit of priority under 35 U.S.C. §120 of U.S. patent application Ser. No. 10/597,119, filed Jul. 12, 2006 now U.S. Pat. No. 7,519,323, entitled "SHORT RANGE CELLULAR BOOSTER", which claims the benefit of U.S. Provisional Patent Application No. 60/535,930, filed Jan. 12, 2004, the disclosures of which is incorporated herein by reference.

BACKGROUND

The existing cellular networks, such as (Global System for Mobile Communications (GSM) and IS95, are intended to provide a contagious and continuous coverage, so as to support the high terminal mobility expected from such systems. However, despite careful network design, indoor (in-building) coverage, or the coverage of places with high shadowing attenuation (e.g. tunnels) of such networks is often "patchy", with "coverage Holes" at best, and no coverage at worst. The reason for the impaired indoor coverage is that the cellular base stations are usually placed outside buildings, higher than the average building heights, to provide large area coverage. Although the signal may be adequate at "street-level", it is severely attenuated by the building material, reducing the signal power in-building, resulting in the poor converges. Loss of signal power (attenuation) depends on the building material and can be tens of dBs for each wall penetration. The problem is exacerbated in the $3^{rd}$ generation systems such as Wideband Code Division Multiple Access (WCDMA) and cdma2000, as these new systems have the capability of high data transmission, which results in lower information bit energy ($E_b$), and much reduced link budget and cell footprint. Currently, the common solutions for providing indoor coverage are:
  I) More outdoor base stations in the same geographical area, supporting smaller cell sizes.
  II) Microcells.
  III) Picocells (in-building cells).
  IV) Conventional repeaters.

Clearly all the above solutions (except the repeater solution) are very expensive and involve extensive investment in the cellular network infrastructure and are much more complex in planning and operation. There are other solutions such as repeaters that can be used to boost the signal in a given geographical area.

The repeater solution, although cheaper than a base station, has several drawbacks. These outdoor repeaters are still too expensive for a private user, and involve careful planning. Most use large directional antennas, or additional backhaul frequencies to reduce antenna gain specifications, which results in lower spectral efficiency and are capacity limited. The repeaters tend to transmit the maximum allowed transmit power and often cause increased interference in the network and accordingly may be unsuitable for network operators. The indoor repeaters are still cheaper than the outdoor version, but typically involve installation of high directional antennas on the roof, and ensured antenna isolation, creating costly demand for skilled installation and operation. Therefore, the system generally remains too complicated for an unskilled user and not sufficiently inexpensive for usage in a much localized coverage area.

SUMMARY

In accordance with an embodiment of a communication device, a repeater mediates traffic between a network transceiver and a user transceiver in a wireless communication system. The repeater comprises a network unit that maintains a network link with the network transceiver, a user unit that maintains a user link with the user transceiver, a two-way communication pathway between the network unit and the user unit; that facilitate the communication of signals between the network transceiver and the user transceiver in autonomous repeater hops between the network transceiver and the network unit, between the user transceiver and the user unit, and between the network unit and the user unit, and a beam-formers respectively coupled to the network unit and the user unit and adapted to communicate signals in an operating frequency band of the network and user transceivers and to control effective radiated power.

BRIEF DESCRIPTION OF THE DRAWINGS

Embodiments of the invention relating to both structure and method of operation may best be understood by referring to the following description and accompanying drawings whereby:

FIGS. 15A, 15B, and 15C respectively illustrate a block diagram of a channel filter, a spectral plot showing channel filter coefficients, and a table depicting the coefficients for an embodiment of a channel filter.

DETAILED DESCRIPTION

The system disclosed herein provides better, and localized indoor coverage without causing excess interference in the network, usage of costly equipment or network planning. The system increases the overall network capacity, reducing the mobile and BTS transmit power, increasing the battery life and reducing the "harmful" radiation to the user.

Descriptions of the illustrated embodiments are based on a GSM (Global System for Communications) network, which is a Time Division Multiple Access-Frequency Division Duplex (TDMA/FDD) based system operating at various spectrum bands, depending on the country and the region's regulations. However, the disclosure, with minor modifications, is equally applicable to any other cellular system, including (but not limited to) IS95, cdma2000 and WCDMA, and with further modifications applicable to wireless LAN systems such as 802.11a, b, and g. Although the description is given for cellular systems, with minor modifications, it can equally be applied to other systems such as GPS or any other system that uses signal-boosting capability. The operating frequency can be at a selected part of communications spectrum used for mobile communications (e.g. PCS 1900, or DCS1800 or GSM900 or UMTS 2000, ISM or UNII band). The description here is only intended as an example and as such utilization of the booster is not only limited to the in-building coverage and can be used in other places such as trains, planes, cars, tunnels, etc. Also, the example may not include all minute or unimportant design details. Units and sub-units discussed and explained hereafter meet regulations of the respective licensed and unlicensed band of operation. Therefore, for the different example implementations and embodiments disclosed, specifications including maximum transmit power, spectral mask, out of band radiation, and others for transmitters, receivers, repeaters and boosters, are met for both licensed and unlicensed bands of operation.

Analogue Implementation Example

Figure 1:
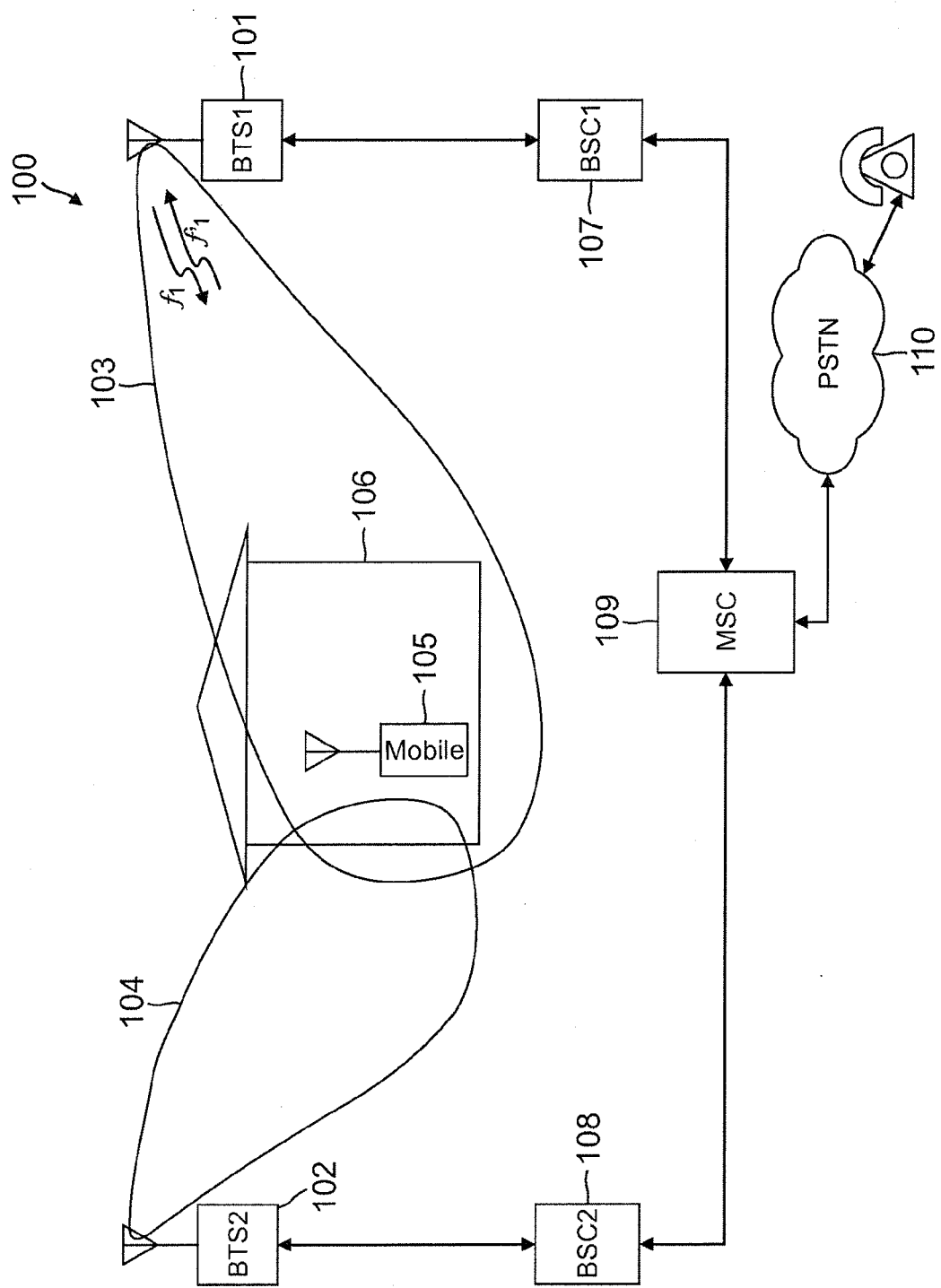
FIG. 1 is a schematic block diagram illustrating an embodiment of a cellular network with two base stations.

FIG. 1 shows a cellular network 100 with two base stations (BTS1 (101) & BTS2 (102)). A typical network supports more than two base stations. The disclosed system may be applied in any size network, regardless of the supported number of base stations. BTS1 101 is connected to Base Station Controller BSC1 107. BTS2 102 is connected to Base Station Controller BSC2 108. BTS2 102 can also be connected to Base Station Controller BSC1 107, instead of BSC2 108. BSC1 107 is connected to Mobile Switching Center MSC 109. BSC2 108 is connected to MSC 109, or instead may be connected to another MSC in the network. MSC 109 is connected to PSTN 110. BTS1 101 has an associated coverage area 103. BTS2 102 has an associated coverage area 104. These coverage areas may or may not overlap. However, usually the network is planned such that there is considerable overlap, to facilitate handoffs. The mobile terminal 105 is inside building 106, in the coverage area 103 communicating with BTS1 101, using a traffic channel transmitted at around frequency f1 in the forward-link and its associated reverse-link frequency, f1'. The traffic channel can be one of the available time slots on the BCCH carrier, or may be on a TCH carrier, where frequency hopping may be used to reduce interference. Mobile terminal 105 may or may not be in coverage area 104, but the mobile unit 105 is well within the coverage area 103 and average signal power from BTS1 101 is much stronger than the average signal power from BTS2 102, within the building 106, and the locality of mobile unit 105. Root-mean-square (rms) forward-link signal level $\hat{S}_1$, outside the building 106 is higher than the rms signal level $\hat{S}_2$ inside the building by the wall penetration loss $\alpha$. The loss $\alpha$ may be such that $\hat{S}_2$ is not at sufficiently high level for the mobile unit 105 to maintain reliable communication with BTS1 101, or BTS2 102, or both BTS1 101 and BTS2 102. Further, the signal level $\hat{S}_2$ may be such that mobile unit 105 may have difficulty to setup and maintain a communication link with BTS1 101 or BTS2 102, or both BTS1 101 and BTS2 102, or the communication link does not have the selected performance and reliability, in all or some of the in-building areas. The coverage problem inside the building 106 may be solved by more transmit power from BTS1 101 in the down-link to combat the signal loss, by the wall penetration loss, $\alpha$. The rms reverse-link signal level $\hat{S}'_1$, inside the building 106 is higher than the rms signal level $\hat{S}'_2$, outside the building, by the wall penetration loss $\alpha'$. The loss $\alpha'$ may be such that $\hat{S}'_2$ is not at sufficiently high level for the mobile unit 105 to maintain reliable communication with BTS1 101, or BTS2 102, or both BTS1 101 and BTS2 102. Further, the signal level $\hat{S}'_2$ may be such that mobile unit 105 may have difficulty to setup and maintain a communication link with BTS1 101 or BTS2 102, or both BTS1 101 and BTS2 102, or the communication link does not have the selected performance and reliability, in all or some of the in-building areas. The coverage problem inside the building 106 may be solved by more transmit power from mobile unit 105 in the up-link to combat the signal loss, by the wall penetration loss, $\alpha'$. Usually the forward and reverse link frequency pairs are sufficiently close, such that $\alpha$ level is substantially similar to $\alpha'$ level.

Figure 2:
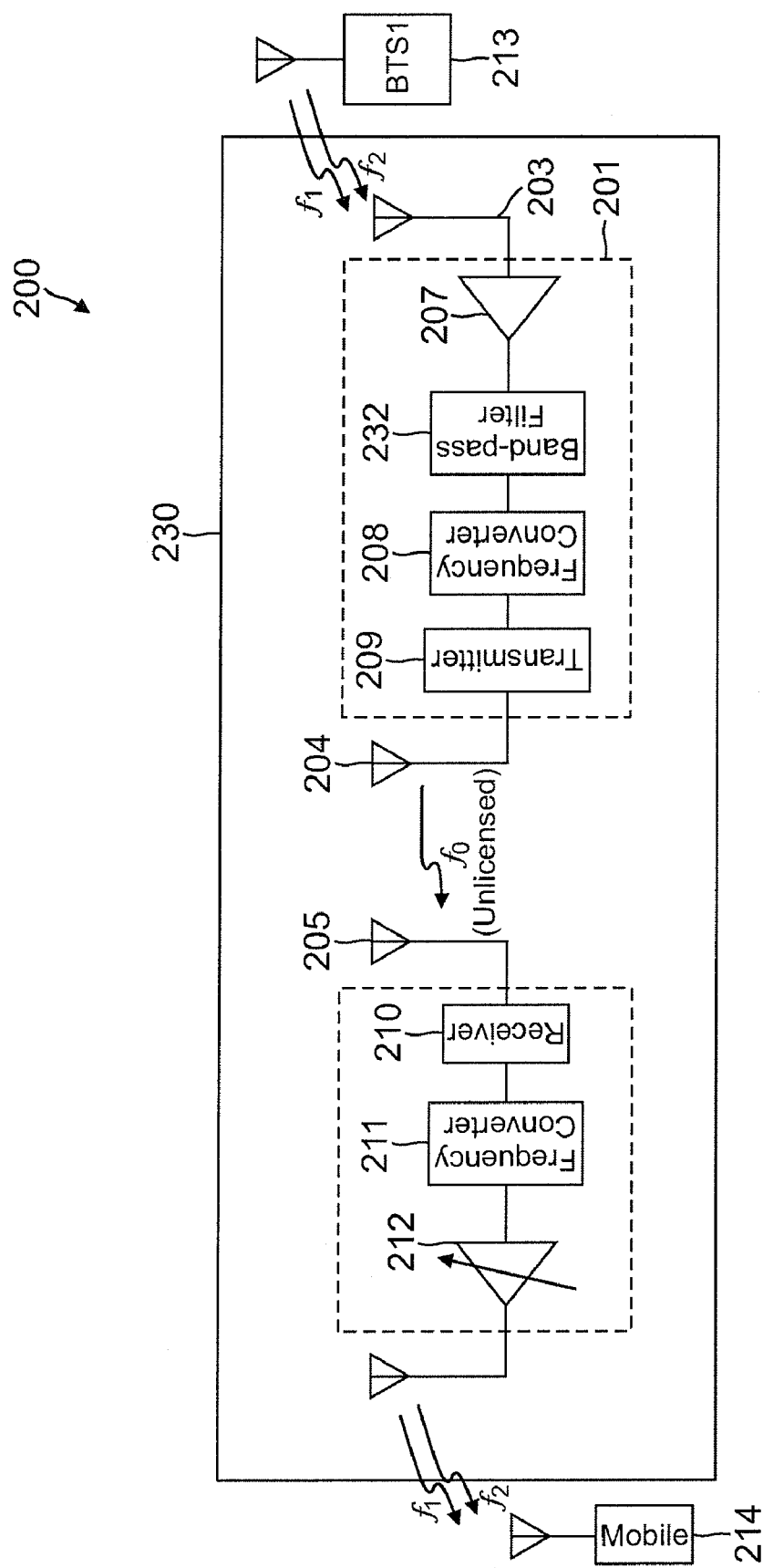
FIG. 2 is a schematic block diagram depicting an embodiment of a forward-link part of a repeater.

FIG. 2 depicts a forward-link part 230 of the repeater 200. The forward-link portion 230 in a simple form supplies improved indoor coverage by boosting the signal level in building in the forward-link of the cellular network. BTS1 213 has a BCCH radio channel (beacon channel) transmitted substantially close to f1. BTS1 213 is in communications with the mobile unit 214 at a frequency substantially close to f1 (the BCCH carrier frequency) or another carrier frequency, f2, that may or may not be frequency hopping. There may or may not be other frequencies that are transmitted by BTS1 213, or other base stations in the same area, which are not shown in the FIG. 2.

The device has two separate units, the "Forward-link Network unit" 201, which is placed where good signal coverage exists, indoor or outdoors, and the "Forward-link User unit" 202, which is placed where good signal coverage does not exist, indoor or outdoors. The Forward-link Network unit 201 is connected to an antenna 203, tuned to operate at the cellular network operating frequency band. The Forward-link Network unit 201 is also connected to an antenna 204 tuned to operate at suitable Unlicensed National Information Infrastructure (known as U-NII) bands, where the system is designed to operate at U-NII spectrum bands. Subject to the relevant regulations, the system can also be designed to operate at Unlicensed Personal Communications Services (U-PCS) band or at Industrial, Scientific and Medical (ISM) band of frequencies. The choice of the unlicensed frequency depends on the design of the equipment and the system specification. Frequencies defined in the portion of the radio spectrum known as U-NII bands may be implemented in some embodiments. Some design modifications are useful, for ISM band operation. The modifications are related to the minimum spreading factor of 10 specified for the ISM band operation, and the maximum allowed transmit power. If the system is designed to operate in ISM band, the signal may use further spread spectrum modulation/demodulation and other modifications to meet FCC 47 CFR Part-15, subpart E specifications.

The frequency bands defined for U-NII operations are as follows:
1) 5.15-5.25 GHz @ Max Transmit power of 2.5 mW/MHz
2) 5.25-5.35 GHz @ Max Transmit power of 12.5 mW/MHz 3) 5.725-5.825 GHz @ Max Transmit power of 50 mW/MHz Any unlicensed operation in U-NII band is allowed, as long as the signal transmissions meet FCC 47 CFR Part-15. So operation of the described booster generally complies with standards of the FCC 47 CFR Part-15 (subpart E for U-NII frequencies). Regulations commonly specify transmit power, emission limits, and the antenna gain limits and are implemented for an acceptable device.

The "Forward-link User Unit" 202 is connected to an antenna 205 tuned to operate in the same frequency band as antenna 204, which is U-NII band in some embodiments. The Forward-link User unit 202 is also connected to an antenna 206 tuned to operate at the cellular network operating band.

Antenna 203 is connected to a (Low Noise Amplifier) LNA unit 207, which is further connected to a bandpass filter 232. LNA unit 207 may be a high performance amplifier, with a typical gain of 15 dB and a noise figure of 1.5 dB with sufficient bandwidth to cover the appropriate portion of the spectrum manually or automatically. The bandpass filter 232 can be designed to pass all or a desired part of the interested cellular spectrum, or can be a bank of overlapping bandpass filters, covering the full spectrum of the interested cellular system, with a RF switch, such that the selected band and bandwidth can be selected. The bandpass filter 232 is connected to frequency converter 208. The frequency converter 208 is capable of converting the cellular network operating spectrum band to a desirable part of the U-NII spectrum, and includes components such as mixers and filters for correct operation. The frequency converter 208 is connected to the Forward-link Network unit transmitter 209. The transmitter unit 209 is designed to operate in U-NII band and conforms to the FCC 47 CFR Part-15, subpart E regulations, and can be as simple as a single amplifier operating at the desirable U-NII operation band, or more complex transmitter with amplifiers and filters, or even a WLAN transmitter such as 802.11a. The transmitter unit 209 is connected to antenna 204.

Antenna 205 is connected to the Forward-link User unit receiver 210, which is designed to receive the signal transmitted by unit 201. The receiver 210 which is connected to frequency converter 211, can be as simple as a single LNA operating at desirable U-NII band of device operation, or it can be better designed with additional functionalities such as automatic gain control (AGC), multiple cascaded amplification stages, and variable channel select filters, or even a Wireless Local Area Network (WLAN) receiver such as 802.11a (where the transmitter part of 802.11a is used in the Network unit 209). If automated gain control (AGC) is used in receiver 210 and the unit is designed for Code Division Multiple Access (CDMA) cellular networks, performance is enhanced by selecting AGC bandwidth to be substantially smaller than the power control repetition rate of the CDMA system, for example less than 1.5 kHz in WCDMA networks, so that AGC operation does not interfere with closed-loop power control. Frequency converter unit 211, which is connected to receiver unit 210 and variable gain amplifier unit 212, converts the input signals, from U-NII band, to the cellular network operating frequencies, and includes all components such as mixers and filters for correct operation. The frequency converter unit 211 performs the opposite conversion operation of the frequency converter unit 208, and includes all components such as mixers and filters for correct operation. The frequency converter 211 is connected to the Variable Gain (VG) amplifier 212, operating at the cellular network operating frequency band. The variable gain amplifier 212 is connected to antenna 206, which transmits signals with substantially similar frequencies to the frequencies transmitted by base station 213 and conforms to cellular system specifications.

The signal radiated by antenna 208, which is an amplified repeated version of the original incident signal received by antenna unit 203, will experience some loss in the power level, before returning and re-entering the antenna 203 again. The re-entered signal into antenna 203 is termed "Down-link Returned-Signal" hereafter. The ratio of the rms signal value of the Down-link Returned-Signal to the rms value of the original incident signal at the output of the antenna 203 terminator, with system and propagation path delays between the antenna units 208 and 203 removed, is the Down-link Returned-Signal path loss, and is termed here as the "Down-link System Path Loss" and referred to as $PL_{dl}$.

Further, the "Down-link System Link Gain", which is here referred to as $G_{dl}$, is defined as "the ratio of the rms signal value at the input to the antenna 208 terminator, to the rms signal value, at the antenna 203 terminator, where the Down-link System Path Loss, $PL_{dl}$, as defined above, is infinite (for example no EM coupling path between antenna 208 and antenna 203), and all the system and propagation path delays (from antenna 203, through the system to antenna 208) are removed".

The variable gain amplifier unit 212 gain is set such that Down-link System Link Gain, $G_{dl}$, is less than the Down-link System Path Loss, $PL_{dl}$, by $dg_{dl}$, so as to avoid a "positive feed-back" loop in the system, for example, $$G_{dl} = PL_{dl} - dg_{dl} \text{ (dB)}$$

Note that all values of $PL_{dl}$, $G_{dl}$, and $dg_{dl}$ are all in dB. The value of $dg_{dl}$ ranges from 0 to $PL_{dl}$, and can be assumed to be 3 dB for the purposes of the description here. However, it is possible to select better values for $dg_{dl}$, where the system performance is optimized further.

Figure 3:
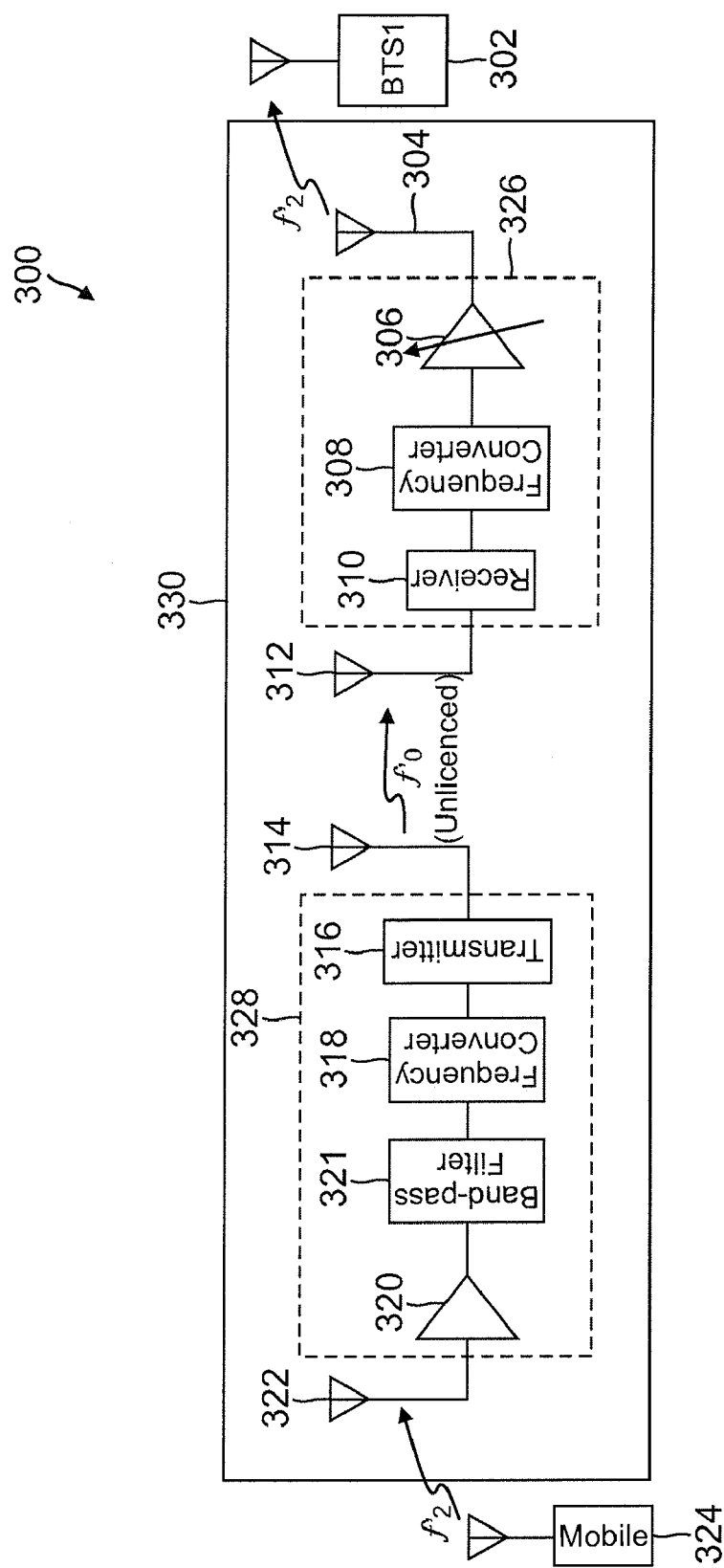
FIG. 3 is a schematic block diagram showing an embodiment of a reverse-link part of a repeater.

FIG. 3 depicts an embodiment of the reverse-link part 330 of a repeater 300. The reverse-link portion 330 in a simple form improves indoor coverage by boosting signal level in building in the reverse-link of the cellular network to such level that attains acceptable link performance. BTS1 302 has a BCCH radio channel (beacon channel) transmitted substantially close to f1, and a frequency pair, f'1 on the reverse-link. BTS1 302 is in communications with the mobile unit 324 at a frequency substantially close to f'1 (the BCCH carrier frequency) or another carrier frequency, f'2, that may or may not be frequency hopping. There may or may not be other frequencies that are transmitted by BTS1 302, or other base stations in the same area, which are not shown in the FIG. 3.

The device has two separate units, the "Reverse-link Network unit" 326, which is placed where good signal coverage exists, indoor or outdoors, and the "Reverse-link User unit" 328, which is placed where good signal coverage does not exist, indoor or outdoors. The Reverse-link Network unit 326 is connected to an antenna 304, tuned to operate at the cellular network operating frequency band. The Reverse-link Network unit 326 is also connected to an antenna 312 tuned to operate at suitable Unlicensed National Information Infrastructure (J-NII) bands, where the system is designed to operate at U-NII bands. Subject to the relevant regulations, the system can also be designed to operate at Unlicensed Personal Communications Services (J-PCS) band or at Industrial, Scientific and Medical (ISM) band of frequencies. The choice of the unlicensed frequency depends on the design of the equipment and the system specification. Frequencies defined in the portion of the radio spectrum known as U-NII bands may be used in some system designs. Some design modifications are used for ISM band operation. The modifications are related to the minimum spreading factor of 10 used for ISM band operation, and the maximum allowed transmit power. If the system is designed to operate in ISM band, the signal uses further spread spectrum modulation/demodulation and other modifications to meet the FCC 47 CFR Part-15, subpart E specifications.

The frequency bands defined for U-NII operations are as follows:

1) 5.15-5.25 GHz @ Max Transmit power of 2.5 mW/MHz
2) 5.25-5.35 GHz @ Max Transmit power of 12.5 mW/MHz
3) 5.725-5.825 GHz @ Max Transmit power of 50 mW/MHz Any unlicensed operation in U-NII bands is allowed, as long as the signal transmissions meet with FCC 47 CFR Part-15. Operation of the illustrative booster meets specifications of FCC 47 CFR Part-15 (subpart E for U-NII frequencies).

The "Reverse-link User Unit" 328 is connected to an antenna 314 tuned to operate in the same frequency band as antenna 312, which is U-NII band for example. The Reverse-link User unit 328 is also connected to an antenna 322 tuned to operate at cellular network operating band.

Antenna 322 is connected to a LNA unit 320, which is further connected to a bandpass filter 321. LNA unit 320 may be a high performance amplifier with a typical gain of 15 dB and a noise figure of 1.5 dB with sufficient bandwidth to cover the appropriate portion of the spectrum. The bandpass filter 321 can be designed to pass all or a desired part of the cellular spectrum, or can be a bank of overlapping bandpass filters, covering the full spectrum of the interested cellular system, with a RF switch, such that the selected band and bandwidth can be selected manually or automatically. Bandpass filter 321 is connected to frequency converter 318. The frequency converter 318 is capable of converting the cellular network operating spectrum band to a desirable part of the U-NII spectrum, and includes all components such as mixers and filters for correct operation. The frequency converter 318 is connected to the Reverse-link User unit transmitter 316. The transmitter unit 316 is designed to operate in U-NII band and conforms to the FCC 47 CFR Part-15, subpart E regulations, and can be as simple as a single amplifier operating at the desirable U-NII operation band, or a more complex transmitter with amplifiers and filters or even a WLAN transmitter such 802.11a. The transmitter unit 316 is connected to antenna 314. The selected portion of the U-NII band of operation for the reverse-link part of the booster is different to the selected portion of the U-NII band of operation for Forward-link part of the booster, and sufficiently apart, so that no substantial interference is experienced from the operation of one link, to the other.

Antenna 312 is connected to the Reverse-link Network unit receiver 310, which is designed to receive the signal transmitted by unit 328. The receiver 310 which is connected to frequency converter 308, can be as simple as a single LNA operating at desirable U-NII band of device operation frequency, or it can be better designed with additional functionalities such as automatic gain control (AGC), multiple cascaded amplification stages, and variable channel select filters or even a WLAN receiver such as 802.11a (where the transmitter part of 802.11a is used in the User unit 316). If automated gain control (AGC) is used in receiver 310 and the unit is designed for CDMA cellular networks, performance is enhanced by selecting AGC bandwidth to be substantially smaller than the power control repetition rate of the CDMA system, for example less than 1.5 kHz in WCDMA networks, so that AGC operation does not interfere with closed-loop power control. Frequency converter unit 308, which is connected to receiver unit 310 and variable gain amplifier unit 306, converts the input signals, from U-NII band, to the cellular network operating frequencies, and includes all components such as mixers and filters for correct operation. The frequency converter unit 308 performs the opposite conversion operation of the frequency converter unit 318. The frequency converter 308 is connected to the variable gain amplifier 306, operating at the cellular network operating frequency band. The variable gain amplifier 306 is connected to antenna 304. Antenna 304 will be transmitting signals with substantially similar frequencies to the frequencies transmitted by mobile unit 324.

The signal radiated by antenna 304, which is an amplified repeated version of the original incident signal received by antenna unit 322, will experience some loss in the power level, before returning and re-entering the antenna 322 again. The re-entered signal into antenna 322 is termed "Up-link Returned-Signal" hereafter. The ratio of the rms signal value of the Up-link Returned-Signal, to the rms value of the original incident signal, at the output of the antenna 322 terminator, with system and propagation path delays between the antenna units 304 and 322 removed, is the Up-link Returned-Signal path loss, and is termed here as the "Up-link System Path Loss" and referred to as $PL_{ul}$.

Further, the "Up-link System Link Gain" which here is referred to as $G_{ul}$, is defined as "the ratio of the rms signal value at the input to the antenna 304 terminator, to the rms signal value, at the antenna 322 terminator, where the Up-link System Path Loss, $PL_{ul}$, as defined above, is infinite (for example no EM coupling path between antenna 304 and antenna 322), and all the system and propagation path delays (from antenna 322, through the system to antenna 304) are removed".

The variable gain amplifier unit 306 gain is set such that Up-link System Link Gain, $G_{ul}$, is less than the Up-link System Path Loss, $PL_{ul}$, by the amount of "Up-link gain margin", $dg_{ul}$, avoiding a "positive feed-back" loop in the system, for example, $$G_{ul}=PL_{ul}-dg_{ul} \text{ (dB)}.$$

Note that all values of $PL_{ul}$, $G_{ul}$, and $dg_{ul}$ are in dB. The value of $dg_{ul}$ ranges from 0 to $PL_{ul}$, and can be assumed to be 3 dB for the purposes of the description here. However, it is possible to select better values for $dg_{ul}$, where the system performance is optimized further.

Usually the forward and the reverse links frequency pairs are sufficiently close, such that $G_{ul}$ level is substantially similar to $G_{dl}$ level, and $PL_{ul}$ level is substantially similar to $PL_{dl}$ level and $dg_{ul}$ level is substantially similar to $dg_{dl}$ level.

The unique booster unit identity code and optionally the device location can be transmitted to the cellular network. The information can be used to locate a user in an indoor environment, for example by generating a heavily coded (protected), low bit rate data containing a long known preamble, the unique identity code, optionally the longitude, and the latitude of the reverse-link Network unit 326. The information can then be pulse-shaped for low spectral leakage and superimposed on the reverse-link signal of a given channel by an appropriate modulation scheme, within the reverse-link Network unit 326. The choice of the modulation scheme depends on the operating cellular system. For example, for GSM, which enjoys a constant envelope modulation such as Gaussian Minimum Shift Keying (GMSK), amplitude modulation (with low modulation index) can be used. For CDMA systems with fast reverse-link power control, Differential Binary Phase Shift Keying (DBPSK) can be used as the modulation scheme. Extraction of information from the received channel signal at base station may involve base station receiver modifications, but does not effect the normal operation of the cellular link.

Figure 4:
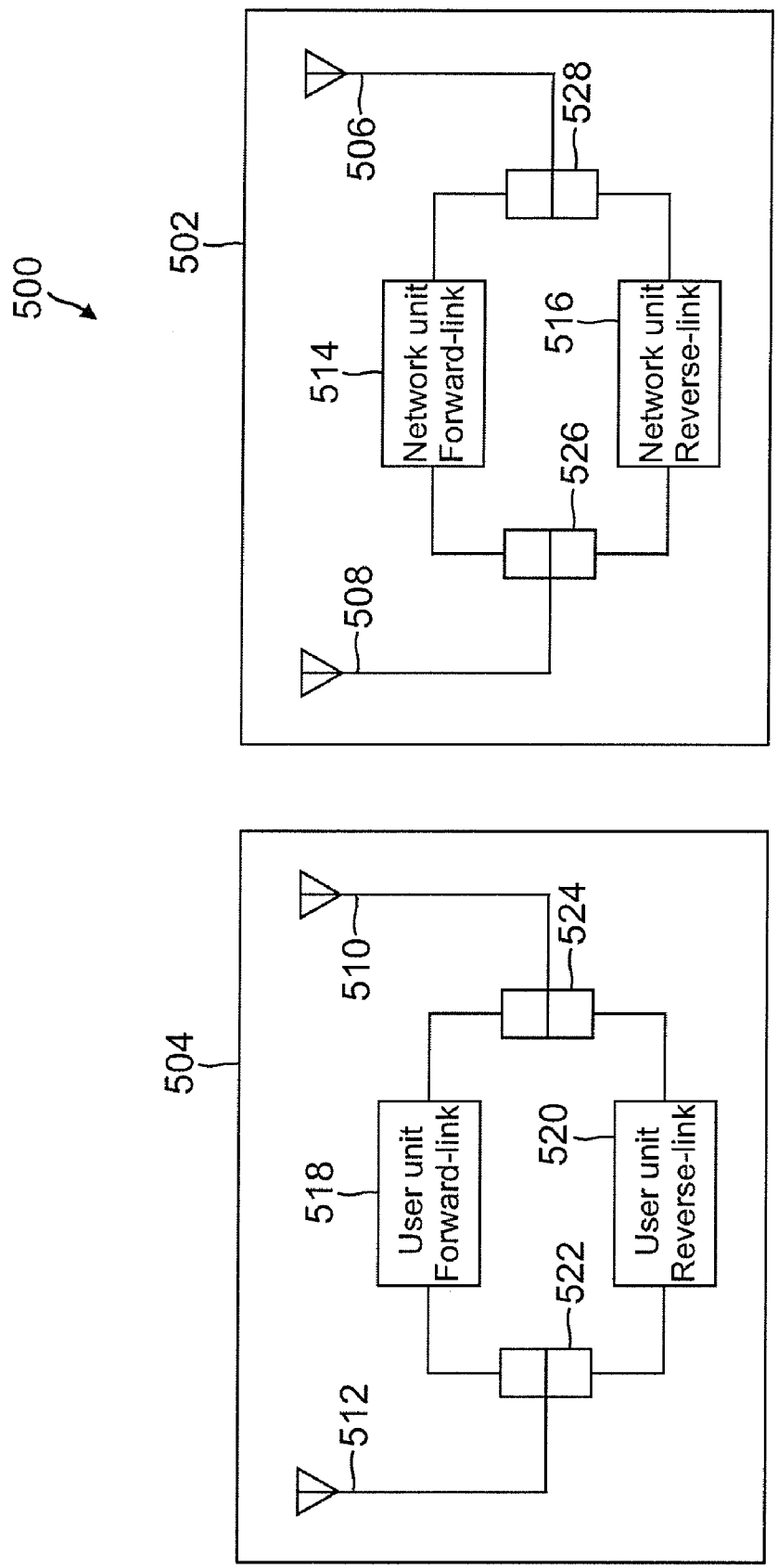
FIG. 4 is a schematic block diagram illustrating an embodiment of a system including a Network unit and a User unit.

FIG. 4 shows an embodiment of a system 500 including the Network unit 502, together with the User unit 504 in the same diagram. The Forward-link Network unit 514 (201 in FIG. 2) and the Reverse-link Network unit 516 (326 in FIG. 3) are now in one unit, referred to hereafter as the Network unit 502. The Forward-link User unit 518 (202 in FIG. 2) and the Reverse-link User unit 520 (328 in FIG. 3) are now in one User unit, referred to hereafter as the User unit 504. In FIG. 4, the transmit/receive antenna 203 in FIG. 2 and transmit/receive antenna 304 in FIG. 3 are replaced by a single antenna 506 and duplex filter 528. The duplex filter unit 528 is designed for optimum performance, and meets specifications for cellular operation. Also, the transmit/receive antenna 204 in FIG. 2 and transmit/receive antenna 312 in FIG. 3 are replaced by a single antenna 508 and duplex filter 526. Further, the transmit/receive antenna 205 in FIG. 2 and transmit/receive antenna 314 in FIG. 3 are replaced by a single antenna 510 and duplex filter 524 in FIG. 4. Equally, the transmit/receive antenna 206 in FIG. 2 and transmit/receive antenna 322 in FIG. 3 are replaced by a single antenna 512 and duplex filter 522 in FIG. 4. The duplex filter unit 522 is designed for optimum performance, and complies with specifications for cellular operation. GSM system is a FDD system, and as such reverse-link frequencies are different to that of the forward-link frequencies. In such system a duplex filter provides appropriate functionality. However, if the Network unit 502 and the User unit 504 are designed for a TDD system, the duplexers 528 and 522 can be replaced by hybrid combiners or "circulators". However, duplexers 526 and 524 are still used, since forward-link and reverse-link frequencies in the U-NII band are kept separate (for example FDD). With minor modifications, it is possible that, instead of antennas 508 and 510, a coaxial cable (such as RG58 or IS inch heliax) is used to connect the Network unit 502 to the User unit 504. In such an arrangement, where coaxial cable is used for the link connection, although still possible, up-conversion to U-NII bands is superfluous, and the system can operate with the Forward and reverse-link signals kept at original cellular frequencies.

Transmit power level for the Network Unit 502 in the cellular band is in the range of minus 10 dBm to 37 dBm with a down-link receiver sensitivity of about −110 dBm to −120 dBm. Transmit power level for the User Unit 504 in the cellular band is in the range of −20 dBm to 0 dBm with an up-link receiver sensitivity of about −110 dBm to −120 dBm.

The described booster system typically operates satisfactorily in limited scenarios, where the isolation between antennas 506 and 512 is more than the up-link and down-link System Link Gains. To ensure the correct operation of the booster system in all propagation and operating conditions, and without the need for the directional antennas, several features may be included in the system design.

1. Since both the Network unit 502 and the User unit 504 are for most time stationary relative to each other, and possibly other network elements such as base stations, antenna (space) diversity is used for transmit and receive operations.
2. The signals transmitted by antenna 506, in the reverse-link, are substantially at the same operating frequency band as the reverse-link signals received by antenna unit 512. Equally, the signals transmitted by antenna 512, in the forward-link, are substantially at the same operating frequency band as the forward-link signals received by antenna unit 506. As the signals received by the Forward-link Network unit 514 are transmitted to Forward-link User unit 518, via antenna units 508 and 510, and further, as the signal received by the Forward-link User unit 518 is then amplified before the retransmission via antenna unit 512, a feed-back loop, through the antennas 512 and 506, between the two Forward-link Network unit 514 and Forward-link User unit 518 exists. Any gain in the loop causes "positive feed-back", which results in unstable operation, a phenomenon that is also true for reverse-link operation of the Network unit 502 and the User unit 504. To keep the two feed-back loops in a stable operating region, in the forward-link the Down-link System Link Gain, $G_{dl}$, is less than the Down-link System Path Loss, $PL_{dl}$, by $dg_{dl}$, so as to avoid a "positive feed-back" loop in the system, for example $G_{dl}=PL_{dl}-dg_{dl}$ (dB). Equally, in the reverse-link, the Up-link System Link Gain, $G_{ul}$, is less than the Up-link System Path Loss, $PL_{ul}$, by $dg_{ul}$, so as to avoid a "positive feed-back" loop in the system. for example $G_{ul}=PL_{ul}-dg_{ul}$ (dB). The propagation losses, $PL_{ul}$ and $PL_{dl}$, may be due to shadowing, distance and antenna radiation pattern, and multipath propagation as well as wall penetration loss. The levels of these propagation losses, $PL_{ul}$ and $PL_{dl}$, are not readily available and are measured.
3. Continuous and correct operation of the Network unit 502 and User unit 504 is monitored. Any operational problem at the Network unit 502 or the User unit 504 can result in unwanted transmissions in either forward or reverse (or both) links. Further, the system may rely on radio channels operating at unlicensed frequency bands, which are prone to interference from other unlicensed devices. Also, operation of the Network unit 502 and the User unit 504 is coordinated. Therefore a control-signaling channel is inserted between the two Network 502 and the User 504 units.
4. The local oscillators of the network unit 502 and the User unit 504 are substantially similar in frequency, as any large frequency error between the Network 502 and the User 504 units will result in an unacceptable cellular link performance. In some embodiments, a pilot signal can be transmitted in a control link from the network unit 502 to the user unit 504 and used for synchronization of local oscillators of the two units. In other examples, an electric power supply waveform can be used for synchronization of local oscillators in the two units.
5. In conventional repeaters sufficient isolation between antennas corresponding to antennas 512 and 506 in the illustrative embodiment is normally supplied by use of directional antennas. Such directional antennas inherently have large apertures, leading to large size antennas. To enable maximum RF isolation between the antennas, advanced adaptive temporal and spatial signal processing techniques are used, enabling antenna directivity requirements to be relaxed.

Advanced Features

Illustrative advanced features include design solutions that are useful in countering the enumerated problems.

Figure 5:
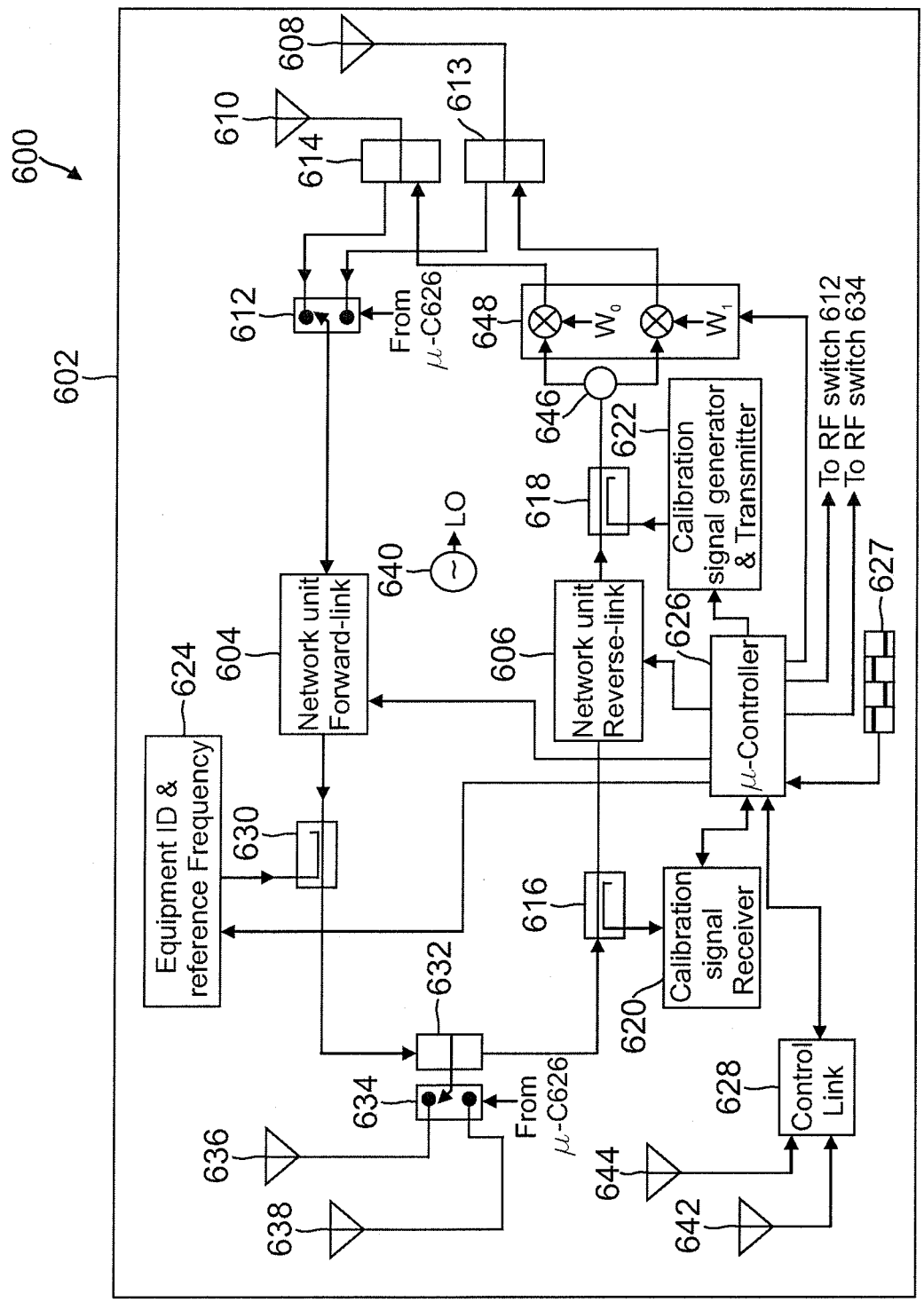
FIG. 5 is a schematic block diagram that illustrates an embodiment of a system including a Network unit implementing antenna diversity.

FIG. 5 shows a system 600 including the Network unit 602 (502 in FIG. 4) with the new design features included. Two antennas 610 and 608 are used for antenna diversity, instead of a single antenna 506 in FIG. 4. Also two antennas 636 and 638 are used for antenna diversity, instead of a single antenna 512 in FIG. 4. Although any diversity-combining scheme such as Maximal Ratio Combining or others can be used for the receiver chain, and transmit diversity schemes such as random phase change in one or both antennas may be used for the transmitter chain, a simple scheme that is based on antenna switched diversity is suggested herein for the receiver part. Switching may be continuous or based on received signal power level. Therefore, the RF switch 612 connected to duplexers 614 and 613 and the Forward-link Network unit 604 performs switching operations for the cellular receive operation of the Network unit 602. Also, the RF switch 634 connected to antennas 636 and 638 and the duplex filter 632 performs switching operations for the U-NII band transmit/receive operation of the Network unit 602. The duplex filters 614 and 613 are also connected to antennas 610 and 608 on one side, and the Complex-Weight unit 648 on the other side, as well as the RF switch unit 612. The complex-weight unit 648 is connected to power-splitter (hybrid combiner) 646 and the micro-controller 626. The power-splitter (hybrid combiner) 646 is connected to Reverse-link Network unit 606 via the directional coupler 618. In one embodiment, all directional couplers may be 17 dB directional couplers. Also, the duplex filter 632 is connected to Forward-link Network unit 604 via the directional coupler 630, and Reverse-link Network unit 606 is connected via the directional coupler 616. Hybrid combiners may otherwise be used in place of the directional couplers 618, 630 and 616. The Reverse-link Network unit 606 receiver unit 310 internal LNA maybe positioned before the directional coupler 616, or the hybrid combiner replacement, in diagram 600 in a configuration that may be advantageous in some embodiments.

Figure 6:
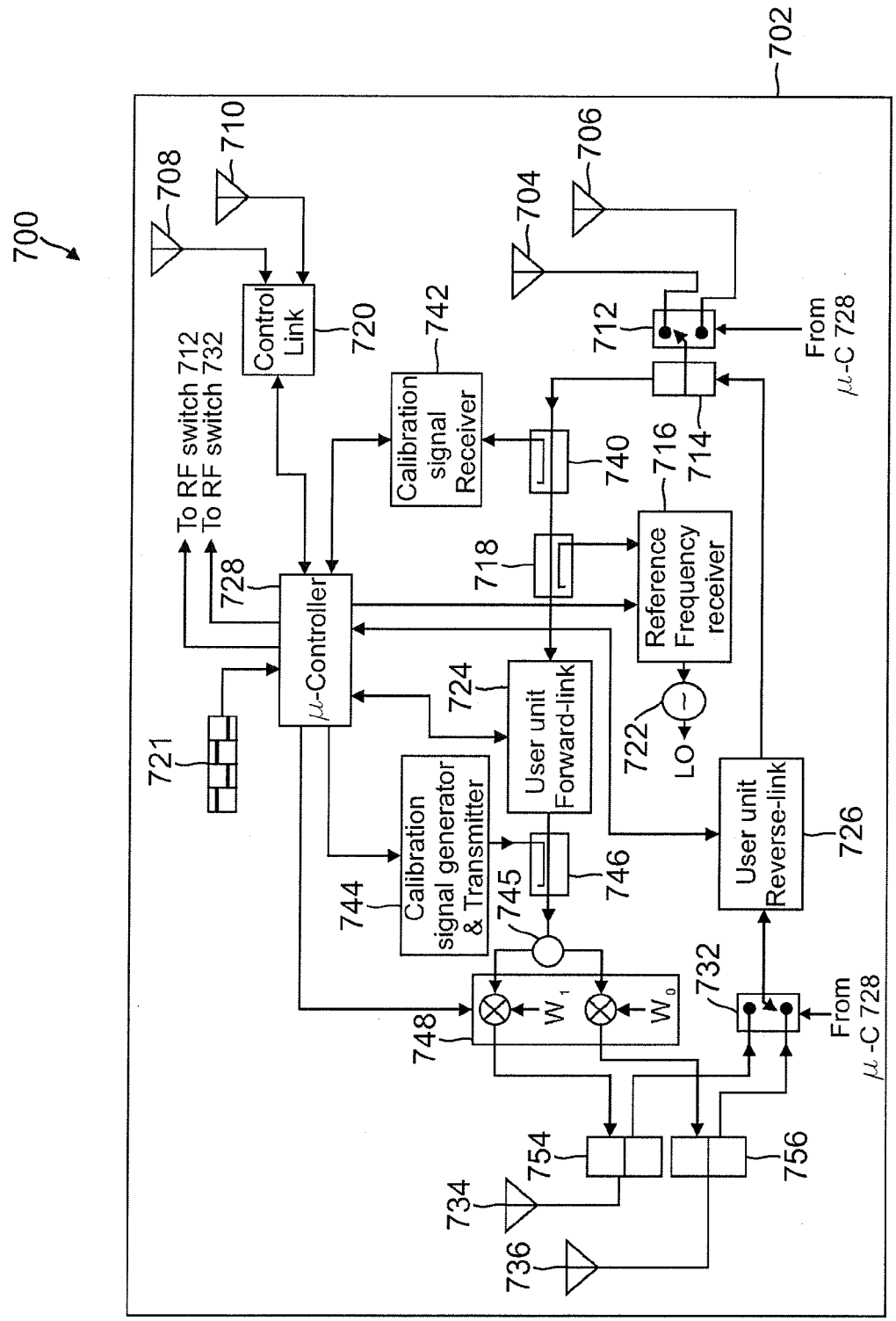
FIG. 6 is a schematic block diagram depicting an embodiment of a repeater that uses two antennas for antenna diversity.

A calibration signal generator/transmitter unit 622 is coupled to the reverse-link transmitter path of the Network unit 602 via the directional coupler 618. The unit 622 supplies a channel-sounding signal, which is used to establish the complex channel characteristics between the Network unit 602 antennas 608 and 610, and the input to the calibration signal receiver 620. The channel-sounding signal generated by unit 622 is transmitted via the complex-weight unit 648 and the diversity antennas 610 and 608 with a maximum transmit level, which is substantially below any expected signal level from cellular network (for example 20 dB below the minimum expected cellular signal level). The combined transmitted channel-sounding signal level and the processing gain used in the calibration signal receiver unit 620 are equal to or less than the Up-link Gain Margin ($dg_{ul}$). The channel-sounding signal generated by unit 622 is a direct-sequence spread spectrum signal modulated by a known Pseudo Random (PN) code with a known code phase (referred to hereafter as "own code" phase) and with a chipping rate comparable to the forward and reverse links of the Network unit 602 and User unit 702 (in FIG. 6) operating bandwidths (e.g. 5 Mchips/s for 5 MHz bandwidth) and a minimum code length to supply sufficient processing gain, which also has a code time duration longer than the maximum expected path delay. A code length of 1000 chips is adequate for most scenarios. The channel-sounding signal can be transmitted continuously or transmitted only when required. The code phases are selected such that the minimum code phase difference is larger than the maximum expected path delay, measured in multiple number of chips, and after that the code phases should be multiple integer of the minimum code phase. The calibration signal receiver unit 620 is coupled to the reverse-link receive path of the Network unit 602 by directional coupler 616. The calibration signal receiver unit 620, using the known PN code and the transmit code phase, detects and demodulates the channel-sounding signal transmitted by unit 622, which enters the reverse-link path via the closed-loop mechanism that exists between the Network unit 602 and the User unit 702 in FIG. 6, shown as user unit 504 in FIG. 4. The calibration signal receiver unit 620 is configured to establish the received signal strength and phase—the complex channel impulse response that exists between the Network unit 602 combined outputs of antennas 608 and 610 and the input to the calibration signal receiver 620. The calibration signal receiver unit 620 establishes received signal strength and phase either by correlation operation, similar to a RAKE receiver path searcher, or by matrix inversion operation on an appropriate block of sampled received signal, discussed in more detail in appendix A. The calibration signal receiver unit 620 includes many sub-units, including a frequency converter, to return the calibration signal to base-band frequencies and other units such as A/D converters and base-band processors to perform base-band algorithms which are not shown in the diagram. The PN code phase can be assigned uniquely, or drawn according to a random algorithm, such that the probability of two units having the same code phase can be very low. Other code offset assignment strategies are also possible, such as dynamic assignment, where the code offset is selected if no such offset was detected in that geographical area. The feature enables the calibration signal receiver 620 to be able to scan and receive "other code" phases, and hence establishing whether any other signal couples to or from other units that may be operating in the same geographical area. More than one code phase can be used to establish the complex channel impulse response so that the probability of detection by other systems is increased. The PN code used for the channel-sounding signal can be modulated with information about the identity of the Network unit 602. The carrier frequency of the transmitted channel-sounding signal can be at the operating cellular frequency band. However, carrier frequencies in other bands, such as ISM band at 2.4 GHz, may be used for transmission of the channel-sounding signal. When carrier frequencies in the other bands are used, the calibration signal generator and transmitter 622 carrier frequency is placed as near as possible to the operating frequency band. The chipping rate and the transmit power of the channel-sounding signal PN code are implemented in a manner that the channel-sounding signal complies with the FCC 47 CFR Part-15 rules. The ISM band is not the same as the cellular operating band, but is sufficiently close to enable the system to converge the spatial algorithm weights and establish weights $W_0$ and $W_1$ used in the complex-weight unit 648. Any antenna and propagation differences in average signal power and antenna behavior between the ISM and cellular operating bands can be taken into account in an operating implementation.

The Equipment ID and reference frequency unit 624 basically generates a Binary Phase Shift Keying (BPSK) signal, modulated by the equipment ID number and placed at a suitable part of U-NII band, and is coupled in the transmitter path of the forward-link of the Network unit 602 via the directional coupler 630. The unit is "frequency locked" to the local oscillator of the Network unit 602. The carrier frequency of the signal is selected to avoid an unacceptable interference to the main cellular signal in the transmit path of the forward-link of the Network unit 602, but is sufficiently close for an optimum transmission bandwidth. Where the Network unit 602 and the User unit 702 use the mains electricity supply for their operations, the 60 Hz or 50 Hz mains oscillations can be used to "lock" the local oscillators of the two units to a common frequency source. The 60 Hz or 50 Hz mains oscillations are converted, by suitable circuitry, to the selected frequency for the operation of the Network unit 602 and the User unit 702.

The Control Link unit 628 is a radio link between the two, Network unit 602 and the User unit 702 in FIG. 6. It may be a simple proprietary link that operates in one of the unlicensed band of frequencies, or may be an in-band control signaling, multiplex with the cellular signal path. It may also be a standard wireless link such as 802.11b, 802.11a or Bluetooth, designed to operate in unlicensed frequency band. The control link unit 628 is connected to micro-controller unit 626, and is able to communicate through an appropriate interface. The control link unit 628 is also connected to antenna 644 and 642 for transmission and reception of the control signals. If operating bandwidth and frequencies allow, with minor modifications to init 602, antenna units 636 and 638 can also be used for the operation of control link unit 628. In some embodiments, the User unit 702 can be a very simple device with all signal processing and control functionalities supported in the Network unit 602. If so, the control link unit 628 can be eliminated or may implement very simple control signaling such as in-band frequency tones to set the system bandwidth and gain in the User unit 702. Provided that the antenna bandwidth allows, with minor modifications to unit 602, antenna units 636 and 638 can also be used for control link unit 628 operations.

Micro-controller unit 626 may be a simple micro-processor such as ARM7 or ARM9 with appropriate memory and interfaces. The micro-controller unit 626 is controlling the operation of the Network unit 602, and may perform some additional signal conditioning and processing such as signal level averaging, estimation, and adaptive algorithms such as Least Mean-Square (LMS) and Recursive Least Squares (RLS), where useful. Operations of micro-controller unit 626 include setting the operating bandwidth and set the weights $W_0$ and $W_1$ to communicate and control the User unit 702 in FIG. 6 via the control link unit 628, communicate and control the calibration signal generator and transmitter 622 and calibration signal receiver 620, operate switching for the receiver antenna diversity, and monitor the correct operation of the Network unit 602 and User unit 702. Other tasks of the micro-controller 626 are disclosed as examples in FIGS. 8A, 8B, 8C, and 8D. Micro-controller unit 626 is connected to units 627, 628, 622, 606, 604, 620, 648 and 624, as well as the RF switches 634 and 612. The micro-controller 626, using the complex channel impulse response at the output of the calibration signal receiver unit 620 and using Least Mean-Square (LMS), Recursive Least Squares (RLS), QR-RLS, or QR decomposition, computes values of the complex weights, $W_0$ and $W_1$ such that the received complex channel impulse response at the output of the calibration signal receiver unit 620 is reduced or minimized in magnitude. With such transmit weights arrangement, the RF isolation for up-link frequencies between the Network unit 602 and the User unit 702 is adapted within the propagation channel, enabling the maximum possible overall ERP (Effective Radiated Power) from antennas 608 and 610, and hence the maximum coverage footprint.

Units 628, 622, 606, 604, 620, 624 are all connected to local oscillator unit 640, and derive clock and reference frequencies from the local oscillator 640 signal. A simple user interface unit 627, for example a keypad, simple dipswitch or similar device, is connected to micro-controller unit 626. The Network unit 602 has a unique "identity code", which can be set by the user interface unit 627, is accessible by the micro-controller unit 626, and can be communicated to the User unit 702 micro-controller unit 728 or any other User units that may be within the operating range of Network unit 602.

FIG. 6 shows an embodiment of a repeater 700 including the User unit 702 (504 in FIG. 4) with the new design features included. Two antennas 734 and 736 are used for antenna diversity, instead of a single antenna 512 in FIG. 4. Also, two antennas 704 and 706 are used for antenna diversity, instead of a single antenna 510 in FIG. 4. Although any diversity-combining scheme such as Maximal Ratio Combining, etc. can be used for the receiver chain, and transmit diversity schemes such as random phase change in one or both antennas for the transmitter chain, a simple scheme that is based on antenna switched diversity can be implemented for the receiver. The switching can be continuous or based on received signal power level. Therefore, the RF switch 732 connected to duplexers 754 and 756 and the Reverse-link User unit 726 performs switching operations for the cellular receive operation of the User unit 702. Also, the RF switch 712 connected to antennas 704 and 706 and the duplex filter 714 performs switching operations for the U-NII band transmit/receive operation of the User unit 702. The duplex filters 754 and 756 are also connected to antennas 734 and 736 on one side, the Complex-Weight unit 748 on the other side, as well as the RF switch unit 732. The complex-weight unit 748 is connected to power-splitter (hybrid combiner) 745 and the micro-controller 728. The power-splitter (hybrid combiner) 745 is connected to Forward-link User unit 724 via the directional coupler 746. All directional couplers in may be 17 dB directional couplers. Also, the duplex filter 714 may be connected to Forward-link User unit 724 via the directional couplers 740 and 718, and also connected to Reverse-link User unit 726. The Forward-link User unit 328 receiver 210 internal LNA may be positioned prior to the directional couplers 718 and 740 in diagram 700, a configuration that may enhance performance.

A calibration signal generator/transmitter unit 744 is coupled to the forward-link transmitter path of the User unit 702 via the directional coupler 746. The unit 744 generates a channel-sounding signal, which is used to establish complex channel characteristics between the User unit 702 antennas 734 and 736, and the input terminal to the calibration signal receiver 742. The channel-sounding signal generated by unit 744 is transmitted via the complex-weight unit 748 and the diversity antennas 734 and 736 with a maximum transmit level that is substantially below any expected signal level from cellular network, for example 20 dB below the minimum expected cellular signal level. The combined transmitted channel-sounding signal level and the processing gain used in the calibration signal receiver unit 742 is less than or equal to Down-link Gain Margin, $dg_{dl}$. The channel-sounding signal generated by unit 744 is a direct-sequence spread spectrum signal modulated by a known Pseudo Random (PN) code with a known code phase, for example termed an "own code" phase, and having a chipping rate comparable to the forward and reverse links of the User unit 702 and Network unit 602 shown in FIG. 5 operating bandwidths of, for example 5 Mchips/s for 5 MHz bandwidth. The PN code further may have the minimum code length sufficient to supply suitable processing gain and which exceeds the maximum expected path delay. A PN code length of 1000 chips is adequate for most scenarios. The channel-sounding signal can be transmitted continuously or transmitted only when evoked by conditions. Code phases are selected so that the minimum code phase difference is larger than the maximum expected path delay measured in multiple chips. Subsequent code phases can be a multiple integer of the minimum code phase. The calibration signal receiver unit 742 is coupled to the forward-link receive path of the User unit 702 by directional coupler 740 and uses the known PN code and the transmit code phase to detect and demodulate the channel-sounding signal transmitted by unit 744. The channel-sounding signal enters the reverse-link path via the closed-loop mechanism between the User unit 702 and the Network unit 602 in FIG. 5, also shown as unit 502 in FIG. 4. The calibration signal receiver unit 742 adapted to establish the received signal strength and phase. A complex channel impulse response exists between the User unit 702 combined outputs of antennas 734 and 736, and the input terminal to the calibration signal receiver 742. The calibration signal receiver unit 742 sets received signal magnitude and phase either by correlation operation, for example similar to a RAKE receiver path searcher, or by matrix inversion operation on an appropriate block of sampled received signal, as disclosed in appendix A. The calibration signal receiver unit 742 includes many sub-units, such as a frequency converter that returns the calibration signal to base-band frequencies and other units such as A/D converters and base-band processors to perform base-band algorithms. The sub-units are not shown in the diagram. The PN code phase can be assigned uniquely or drawn according to a random algorithm so that the probability of two units having the same code phase is very low. Other code offset assignment strategies are also possible. For example, dynamic assignment may be used so that the code offset is selected to avoid other such offsets in the same geographical area. Dynamic assignment enables the calibration signal receiver 742 to scan and receive "other code" phases and hence establish whether any other signal couples to or from other units that may be operating in the same geographical area. Further, more than one code phase can be used to establish the complex channel impulse response so that the probability of detection by other systems is increased. The PN code used for the channel-sounding signal can be modulated with information about the identity of the User unit 702. The carrier frequency of the transmitted channel-sounding signal may be at the operating cellular frequency band. However, carrier frequencies in other bands such as ISM band at 2.4 GHz may be used for transmission of the channel-sounding signal. Usage of the other bands enables the calibration signal generator and transmitter 744 carrier frequency to be placed as near as possible to the operating frequency band. The chipping rate and the transmit power of the channel-sounding signal PN code are selected so that the channel-sounding signal complies with the FCC 47 CFR Part-15 rules. The ISM band, although different from the cellular operating band, is sufficiently close to enable the system to converge the spatial algorithm weights, and establish the weights $W_0$ and $W_1$ used in the complex-weight unit 748. Any antenna and propagation differences in average signal power and antenna behavior between the ISM and cellular operating bands can be investigated in the design phase and taken into account in the final system design.

The Reference signal receiver unit 716, which is capable of receiving the transmitted signal generated by the equipment ID and reference frequency unit 624 in FIG. 5, is connected to the directional coupler 718. The receiver is capable of extracting the reference frequency and the ID code transmitted by the Network unit 602 equipment ID and reference frequency generator 624. The extracted reference frequency is then used to provide a reference local oscillator 722. The directional coupler 718 is connected to the Forward-link User unit 724. Reverse-link User unit 726 is connected to duplex filter 714. The reference signal and the local oscillator unit 722 can alternatively be based on the control link unit 720 oscillator, if the unit 726 is capable of locking to the received signal carrier frequency which has been transmitted by control link unit 628 of the Network unit 602.

The Control Link unit 720 is a radio link between the two, Network unit 602 and the User unit 702. It may be a proprietary link that operates in one of the unlicensed band of frequencies, or may be a standard wireless link such as 802.11b, 802.11a or Bluetooth, designed to operate in unlicensed band. The control link unit 720 is connected to micro-controller unit 728, and is able to communicate through an appropriate interface. The control link unit 720 is also connected to antennas 708 and 710 for transmission and reception of the control signals. Note that provided that the antenna bandwidth and operating frequency allow, with minor modifications to unit 702, antenna units 704 and 706 can also be used for the control link unit 720 operations.

Micro-controller unit 728 is a simple microprocessor such as ARM7 or ARM9 with appropriate memory and interfaces. The micro-controller unit 728 is controlling the operation of the User unit 702 and may perform some additional signal conditioning and processing such as signal level averaging and estimation and adaptive algorithms such as LMS and RLS in suitable conditions. The micro-controller unit 728 may set operating bandwidth and set weights $W_0$ and $W_1$ to communicate and control the Network unit 602 in FIG. 5 via the control link unit 720, and to communicate and control the calibration signal generator and transmitter 744 and calibration signal receiver 742. The micro-controller unit 728 may also operate switching for receiver antenna diversity and monitor the correct operation of the User unit 702. Other tasks of the micro-controller 728 are disclosed in examples depicted in FIGS. 8A, 8B, 8C, and 8D. Micro-controller unit 728 is connected to units 720, 742, 744, 716, 748, 726, and 724, as well as the RF switches 732 and 712. The micro-controller 728 may use a complex channel impulse response at the output of the calibration signal receiver unit 742 and use Least Mean-Square (LMS), Recursive Least Squares (RLS), QR-RLS, or QR decomposition to compute optimum values of complex weights $W_0$ and $W_1$ such that the received complex channel impulse response at the output of the calibration signal receiver unit 742 is reduced or minimized. With the disclosed transmit weights arrangement, the RF isolation for down-link frequencies between the User unit 702 and the Network unit 602 is adapted within the propagation channel, enabling a maximum possible overall ERP (Effective Radiated Power) from antennas 734 and 736 and a maximum coverage footprint.

Units 720, 726, 724, 742, 744 and 728 are depicted connected to local oscillator unit 722 and derive clock and reference frequencies from the local oscillator 722 signal. A simple user interface unit 721, for example a keypad or simple dipswitch, may be connected to micro-controller unit 728. The Network unit 702 has a unique "identity code" which can be set by the user interface unit 721, is accessible to micro-controller unit 728, and can be communicated to the Network unit 602 micro-controller unit 626 or other Network or User units that may be within the operating range of User unit 702.

Techniques, such as the use of vertical polarization for antennas units 610 and 608, and horizontal polarization for antennas 734 and 736 can further improve the system performance. It is also possible to improve system performance by the use of directional antennas, as in conventional booster and repeater systems.

The unique Network unit 602 identity code and optionally device location can be transmitted to the cellular network. The information can be used to locate a user in an indoor environment, for example by generating a heavily coded (protected), low bit rate data, containing a long known preamble, the unique identity code and optionally the longitude and the latitude of the Network unit 602. The information can then be pulse-shaped for low spectral leakage and superimposed on the reverse-link signal of a given channel by an appropriate modulation scheme, within the Network unit 602. The choice of the modulation scheme depends on the operating cellular system. For example, for GSM, which enjoys a constant envelope modulation such as Gaussian Minimum Shift Keying (GMSK), amplitude modulation (with low modulation index) can be used. For Code Division Multiple Access (CDMA) systems, with fast reverse-link power control, Differential Binary Phase Shift Keying (DBPSK) can be used as the modulation scheme. The extraction of the above mentioned information from the received channel signal at base station may involve base station receiver modifications, but does not effect the normal operation of the cellular link.

An example of the above system operation is shown in FIGS. 7A, 7B, 7C, 7D, 8A, 8B, 8C, and 8D. FIGS. 7A, 7B, 7C, and 7D are the system operation flow diagrams for the Network unit 602 and FIGS. 8A, 8B, 8C, and 8D are the flow diagrams for the User unit 702. The examples do not include all possible functionalities for the complete operation of the Network unit 602 and User unit 702. The examples show an example of minimum control flows for basic operation of the Network unit 602 and the User unit 702. Two independent control flow operations can be executed concurrently on the micro-controller 626. A first control-flow establishes normal operation of the booster. A second control flow monitors operation of the control link between the Network unit 602 and the User unit 702. On "power-up", "reset", or a "Stop" instruction, Network unit 602 sets complex-weight unit 648 weights $W_0$ and $W_1$ to an "Initial" value by default. The "Initial" values of the weights are values allowing minimum power radiation from the two antennas 608 and 610 with no phase differential between the two radiated fields, for example broadside radiation. On "power-up" or "reset" instructions of the Network unit 602, assuming the "identity code" of the interested User unit 702 is known or pre-entered into the Network unit 602 via the user interface unit 627), the micro-controller unit 626 starts the control-flow 802 in FIG. 7A. The micro-controller unit 626 instructs the control link unit 628 to establish 804 link with the User Unit 702. The control link unit 628, using appropriate protocols, continues attempts to establish a communication link with the control unit 720 of the User unit 702 until such link is established 806. The micro-controller unit 626 selects 808 the U-NII band of operation, if desired, and instructs the calibration signal receiver unit 620 to attempt to receive 810 all the possible code offsets in the U-NII frequency band, ensuring no signal paths from other User units are operational in the immediate area into the Network unit 602 and facilitating selection of an unused code offset and transmission channel. If an unintended signal path exists 812 between the Network unit 602 and other operating User units, depending on the severity of the coupling path and the strength of the "other units" received channel-sounding signal(s) strength, several different actions can be taken after comparison of the received signal Signal to Noise Ratio (SNR) with threshold $SNR_{th}$, which is based on maximum allowed interference plus noise level 814 for acceptable performance:

1) If the strength of the received channel-sounding signal(s) from other User units is below the threshold $SNR_{th}$, indicating NO interference with the operation of the Network unit 602 and User unit 702, the micro-controller 626 proceeds as normal to action 824.
2) If the strength of the received channel-sounding signal(s) from other User units is above the threshold $SNR_{th}$, indicating interference with the operation of the Network unit 602 and User unit 702, the Network unit 602 will try to select another U-NII frequency band of operation (step 816), and if more U-NII operating band available, steps 808, 810, and 812 are repeated (step 816).
3) If the strength of the received channel-sounding signal(s) from other User units is above the threshold $SNR_{th}$, indicating interference with the operation of the Network unit 602 and User unit 702, and no new clean U-NII operating frequency band can be found, the Network unit 602 will issue an appropriate error signal (block 818) and instruct User unit 720 to stop operation (step 9), and the Network unit 602 stops operation (step 822).

Figure 7A:
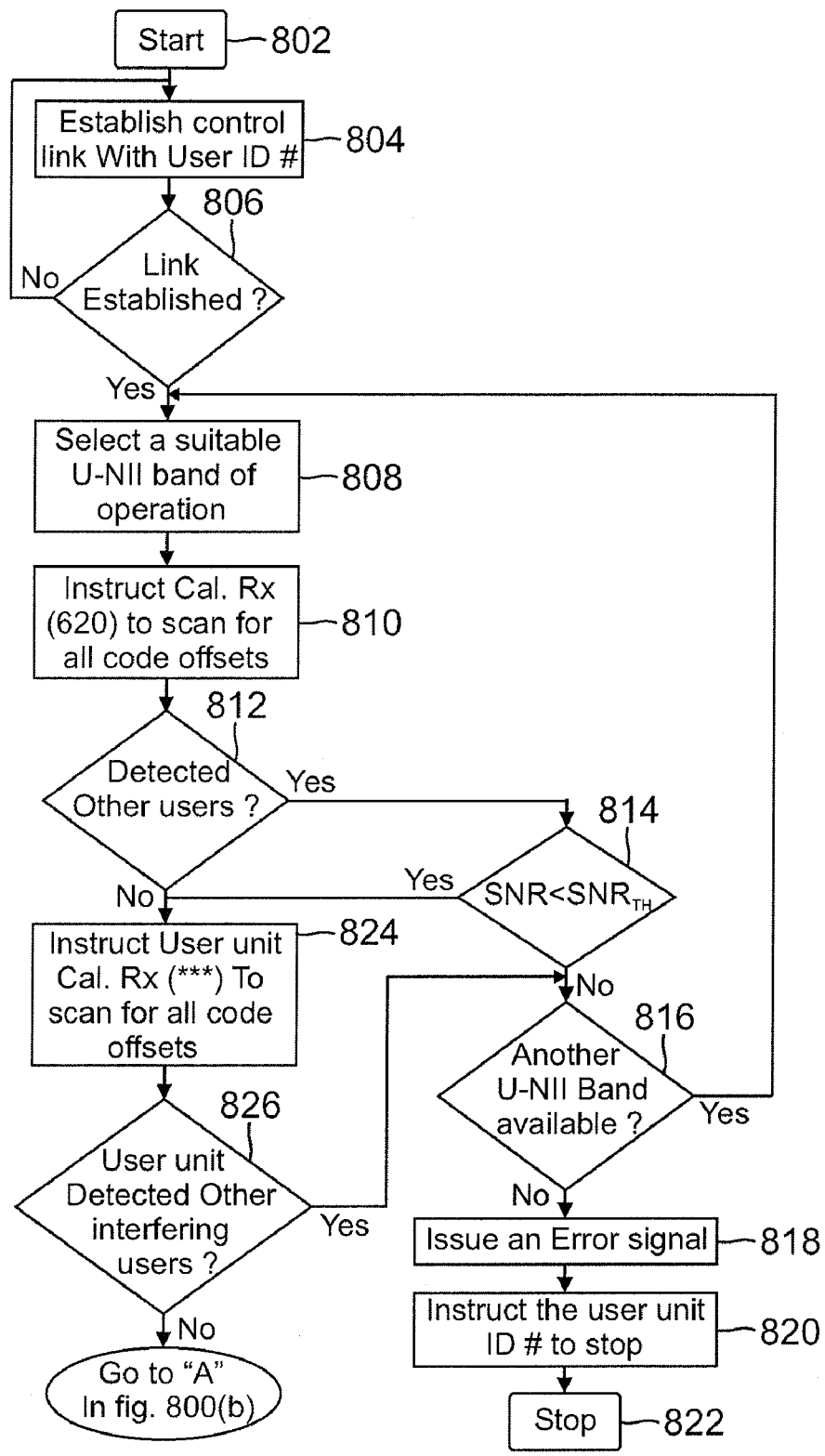
FIGS. 7A, 7B, 7C, and 7D are flow charts depicting embodiments of system operation flow for a network unit.
Figure 7B:
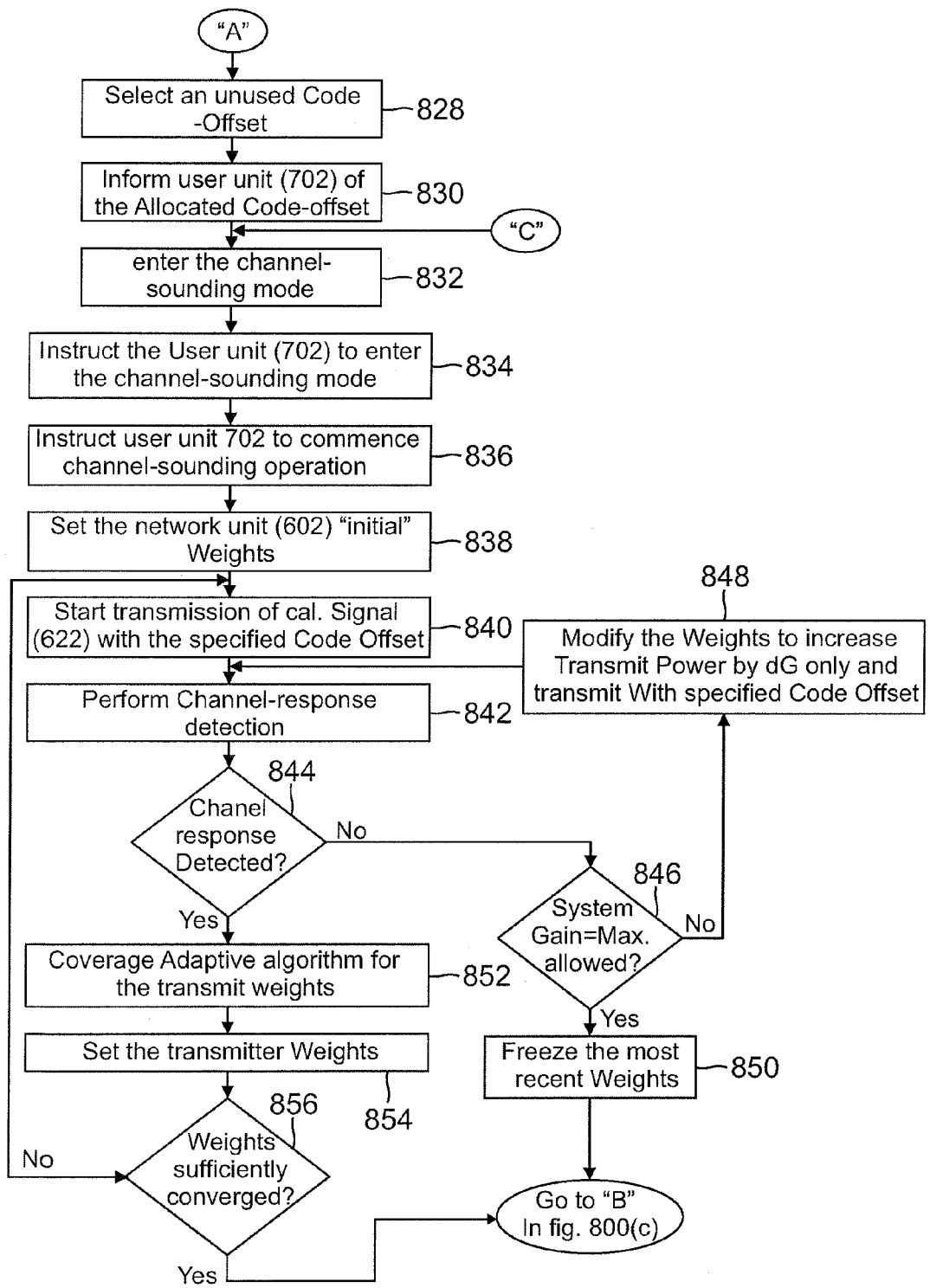
Figure 7C:
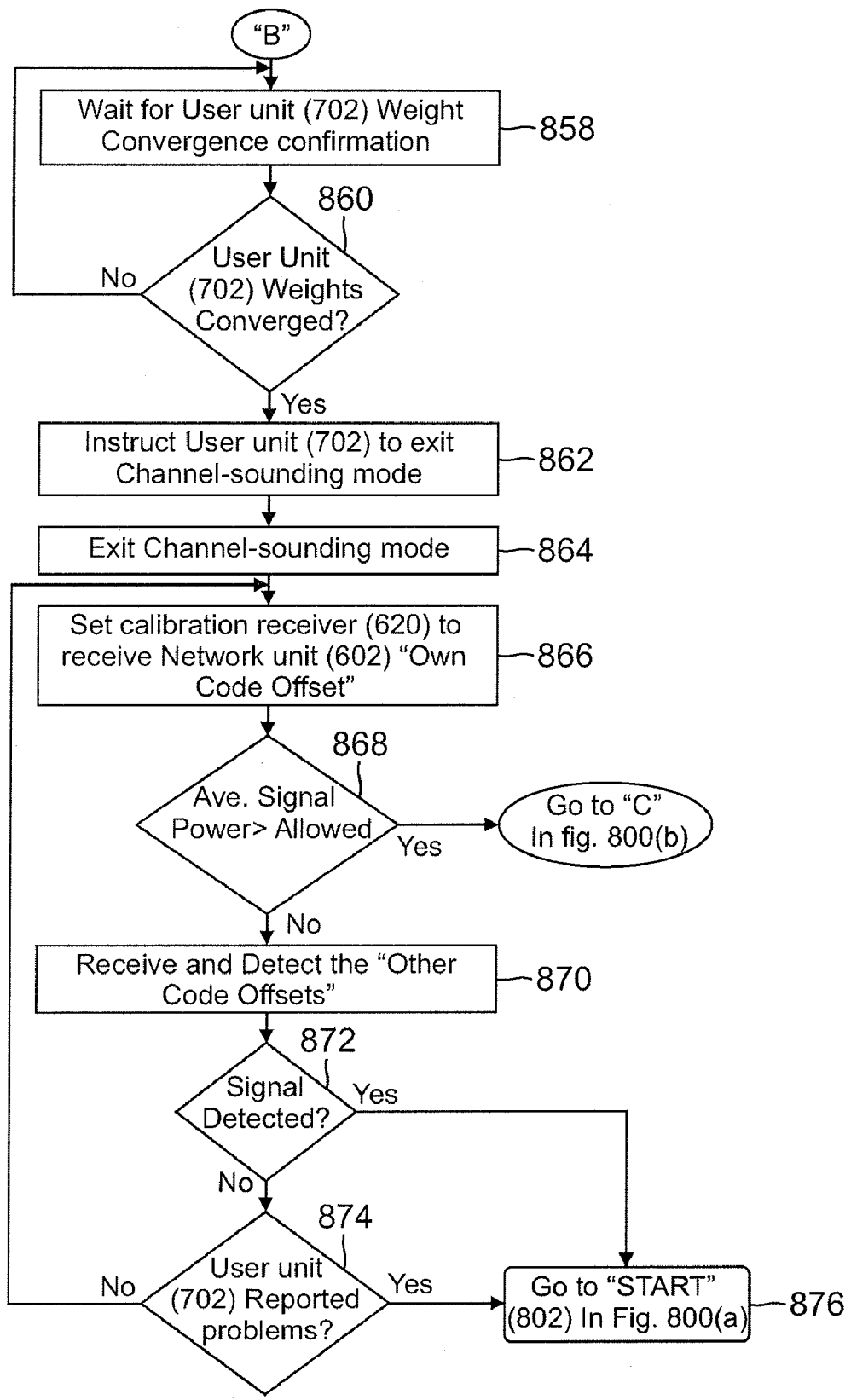

After successful establishment of a control link between the Network unit 602 and the User unit 702, and successful selection of a U-NII operation band, micro-controller 626, via the control link unit 628, instructs the User unit 702 to scan 824 for possible code offsets in the selected U-NII band of frequencies. Micro-controller 626 waits for a scan report from User unit 702. If any other units are operating nearby and are detected by the User unit 702, micro-controller 626 seeks 816 another U-NII band of frequencies and follows the subsequent steps as described. If no other operational unit is detected by the User unit 702, the micro-controller 626 selects 828, as shown in FIG. 7B, an unused Code-Offset, called an "own code" phase. The micro-controller 626, via the control link unit 628, informs 830 the User unit 702 of the selected "own code" phase. After entering 832 the network unit 602 into "channel-sounding" mode, micro-controller 626, via the control link unit 628, instructs User unit 702 to enter 834 the "channel-sounding" as well. In "channel-sounding" mode the diversity switches 612 and 634 in Network unit 602, and 732 and 712 in User unit 702, are kept in the current position, for example not switching. Micro-controller 626, via the control link unit 628, instructs 836 the User unit 702 to commence with channel-sounding operation. Micro-controller 626 sets 838 the complex-weight unit 648 weights $W_0$ and $W_1$ to the "Initial" value. Micro-controller 626 instructs 840 calibration signal generator and transmitter unit 622 to commence transmission with the specified "own code" phase. Micro-controller 626 also instructs 842 the calibration signal receiver unit 620 to attempt to receive the channel-sounding signal for the above mentioned code offset, used by the transmitter unit 622. If no substantial channel-sounding signal is detected 844 with the specified set of weights of the complex-weight unit 648, and Up-link System Link Gain, $G_{ul}$, is less than the specified maximum allowed system gain 846, micro-controller 626 modifies and issues 848 new weight values to complex-weight unit 648 such that the transmit power of the channel-sounding signal is increased by a predetermined step size, dG, while keeping the relative phases of the weights $W_0$ and $W_1$ the same. Actions 842, 844, 846 and 848 are repeated until a substantial channel-sounding signal is detected or the maximum allowed system gain is reached. If maximum allowed system gain is reached, the most recent weights are maintained 850 unchanged as the most optimum weights for normal operation. If maximum allowed system gain is not reached and substantial channel-sounding signal is present at the output of the calibration signal receiver 620, an adaptive convergence algorithm such as LMS is used to further modify 852 the weights $W_0$ and $W_1$ such that the channel-sounding signal power is reduced or minimized. New weights are issued 854 to the complex-weight unit 648 for transmission of the channel-sounding signal. If the weights are sufficiently converged 856, control-flow proceeds, otherwise actions 840 to 856 are repeated. After successful convergence of the Network unit 602 weights $W_0$ and $W_1$, micro-controller 626 checks 858 and, if warranted, waits 860 for confirmation of User unit 702 weight convergence. After successful convergence of both Network unit 602 and User unit 702 weights $W_0$ and $W_1$, micro-controller 626 instructs 862 the user unit 702 to exit the channel-sounding mode and exit 864 channel sounding mode. Micro-controller 626 instructs 866 calibration signal receiver 620 to continue to receive the channel-sounding signal transmitted by the calibration signal transmitter 622. If the safe average channel-sounding signal power level is exceeded 868 for a substantial amount of time, micro-controller 626 control flow goes to action 832, and starts the channel-sounding processes again. If the average channel-sounding signal power level is within the expected range, the calibration signal receiver 620 is instructed to receive and detect 870 channel-sounding signals with all other possible code offsets. If no channel-sounding signal with substantial average signal power level is detected, the micro-controller 626 checks 874 to determine whether any messages or problems are reported from the User unit 702. If no messages are present, microcontroller 626 returns to action 866. If a channel-sounding signal with substantial average signal power level is detected or a problem is reported by the User unit 702, the micro-controller 626 goes 876 to action 802 and begins the control flow process again. To accelerate search and detection of other code offsets, two or more replicas of the calibration signal receiver 620 may be implemented, so that the "own code" detection can be continuous and uninterrupted, and other receiver replicas can scan for "other code" offsets.

Figure 7D:
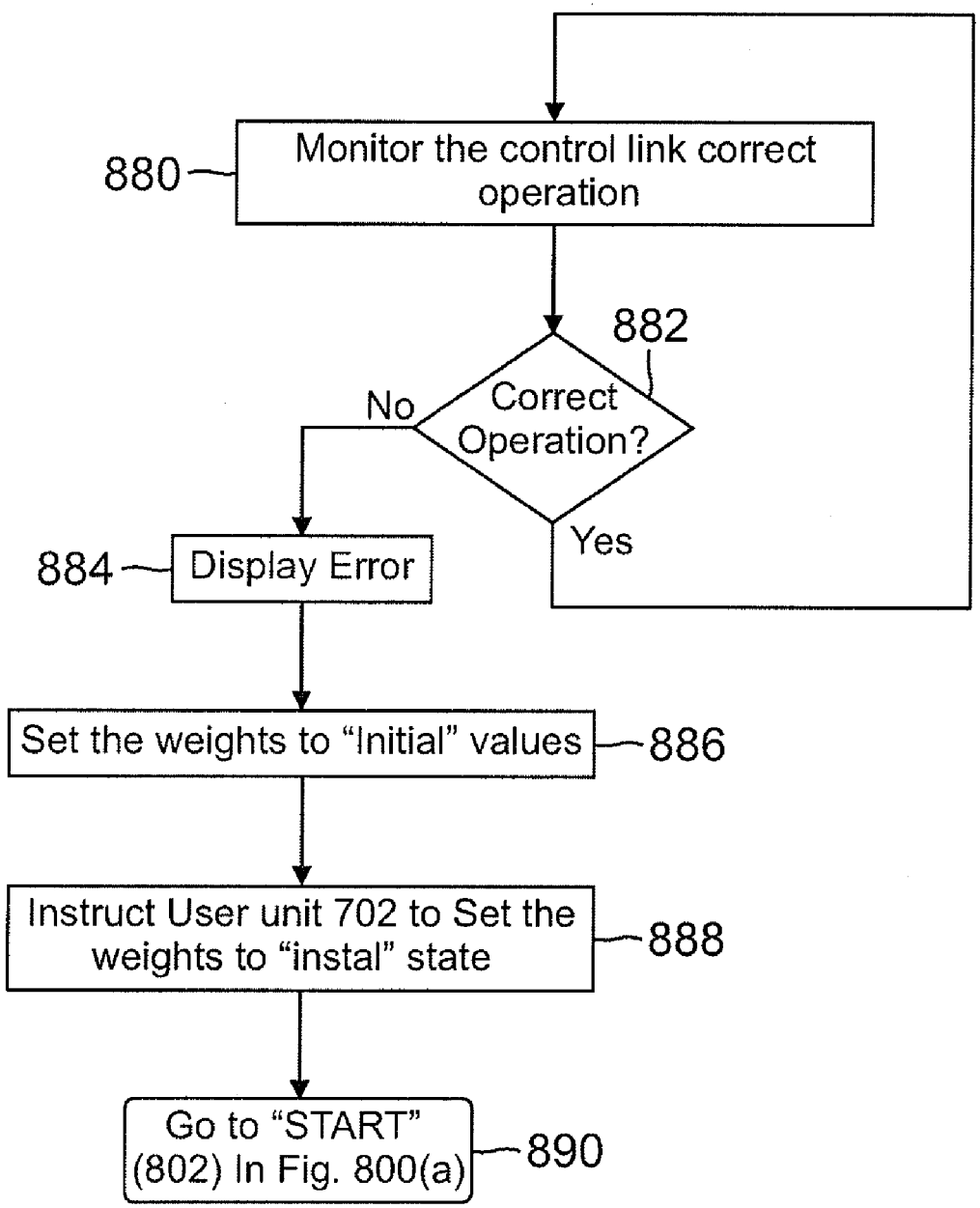

The second control-flow operation is shown in FIG. 7D. The second operation checks the quality and performance of the control links of the control units 628 and 720 operation, by monitoring such quantities as Bit Error Rate (BER), Signal to Noise Ratio (SNR), background noise and interference (step 860). If the operation of the link is not satisfactory (step 882), an error signal is flagged (step 884), and complex-weight unit 648 weights $W_0$ and $W_1$ are set to the "Initial" value (step 886), and the User unit 702 is instructed to do the same (Step 888), and finally the micro-controller 626 returns to step 802 (step 890).

FIGS. 7A, 7B, 7C, and 7D are system operation flow diagrams for the User unit 702. Two independent control flow operations are executed concurrently on the micro-controller 728. The first control-flow establishes normal operation of the booster. The second control-flow monitors correct operation of the control link between the User unit 702 and the Network unit 602. On "power-up", "reset", or a "Stop" instruction, User unit 702 sets the complex-weight unit 748 weights $W_0$ and $W_1$ to "Initial" value by default. "Initial" weight values are defines ad values that enable minimum power radiation from the two antennas 734 and 736 with no phase differential between the two radiated fields, for example broadside radiation. On "power-up" or "reset" instruction of the User unit 702, assuming the "identity code" of the interested Network unit 602 is available or pre-entered into the User unit 702 via the user interface unit 721, the micro-controller unit 728 begins 902 the control-flow in FIG. 8A. The micro-controller unit 728 instructs 904 control link unit 720 to establish communication with the Network Unit 602. The control link unit 720 uses appropriate protocols and continues attempts to establish 906 a communication link with control unit 628 of the Network unit 602 until the link is established. Micro-controller unit 728 attempts 908 to detect instruction messages from the Network unit 602 and continues to do so until an instruction is detected 910. On the receipt of the first instruction from the Network unit 602, micro-controller unit 728 attempts to determine the instruction content. The first analysis 912 determines whether the received instruction is the "Stop" instruction. For the "Stop" instruction, the micro-controller unit 728 sets 914 the complex-weight unit 648 weights $W_0$ and $W_1$ to the "Initial" value and continues to detect new instructions. If the instruction is "Scan for all code offset in the specified U-NII band" 916, the micro-controller unit 728 instructs the Calibration signal receiver unit 742 to scan 918 for all the possible code offsets in the specified frequency band, ensuring no signal paths exist from other Network units operational in the immediate area into the User unit 702 and facilitating selection of an unused code offset and transmission channel. User unit 702, via the control link 720 informs 920 the Network unit 602 of scan results for code offsets with significant signal level and waits for a new instruction. The micro-controller unit 728 awaits 908 a new instruction from Network unit 602.

If the new instruction is "Enter the channel sounding mode" 922, micro-controller unit 728 enters 924 the mode by setting the diversity switches 732 and 712 to a fixed, non-switching state. Micro-controller 728 sets 926 complex-weight unit 748 weights $W_0$ and $W_1$ to the "Initial" value. Micro-controller 728 instructs calibration signal generator and transmitter unit 744 to commence transmission 928 with the specified "own code" phase. The micro-controller 728 also instructs the calibration signal receiver unit 742 to attempt to receive 930 the channel-sounding signal for the above mentioned code offset used by the transmitter unit 744. If no substantial channel-sounding signal is detected with the specified set of weights of the complex-weight unit 748 and Down-link System Link Gain $G_{dl}$ is less than the specified maximum allowed system gain 934, micro-controller 728 modifies and issues 936 new weight values to complex-weight unit 748 so that the transmit power of the channel-sounding signal is increased by a predetermined step size dG while maintaining 936 relative phases of the weights $W_0$ and $W_1$. Actions 930, 932, 934 and 936 are repeated until a substantial channel-sounding signal is detected or the maximum allowed system gain is reached. If maximum allowed system gain is reached, the most recent weights are maintained 944 as the most optimum weights for normal operation. If maximum allowed system gain is not reached and substantial channel-sounding signal exists at the output of the calibration signal receiver 742, an adaptive convergence algorithm such as LMS is used to further modify 938 weights $W_0$ and $W_1$ such that the channel-sounding signal power is reduced or minimized. New weights are issued 940 to the complex-weight unit 748 for transmission of the channel-sounding signal. If weights are sufficiently converged, control-flow proceeds to next action, otherwise actions 928 to 942 are repeated. After the successful convergence of the User unit 702 weights $W_0$ and $W_1$, micro-controller unit 728 informs 946 the Network unit 602 and confirms the convergence of the weights. Micro-controller unit 728 awaits an instruction to exit the channel-sounding mode in actions 948 and 950. After detection of the instruction "Exit channel-sounding mode", micro-controller unit 728 exits 952 the operating mode and instructs the calibration signal receiver 742 to continue to receive 954 the channel-sounding signal transmitted by the calibration signal transmitter 744.

If the safe average channel-sounding signal power level is exceeded for a substantial amount of time 956, micro-controller 728 sets 926 the complex-weight unit 748 weights $W_0$ and $W_1$ to the "Initial" value and informs 964 the Network unit 602, and returns to action 908. If the average channel-sounding signal power level is within the expected range, the calibration signal receiver 742 is instructed to receive and detect 958 channel-sounding signals with other possible code offsets. If a channel-sounding signal with substantial average signal power level is detected, the micro-controller 728 goes 960 to action 962. If no other channel-sounding signal with substantial average signal power level is detected, the micro-controller 728 returns to action 908. To accelerate the search and detection of other code offsets, two or more replicas of the calibration signal receiver unit 620 may be included so that the "own code" detection can be continuous and uninterrupted. Other receiver replicas may scan for "other code" offsets.

Figure 8A:
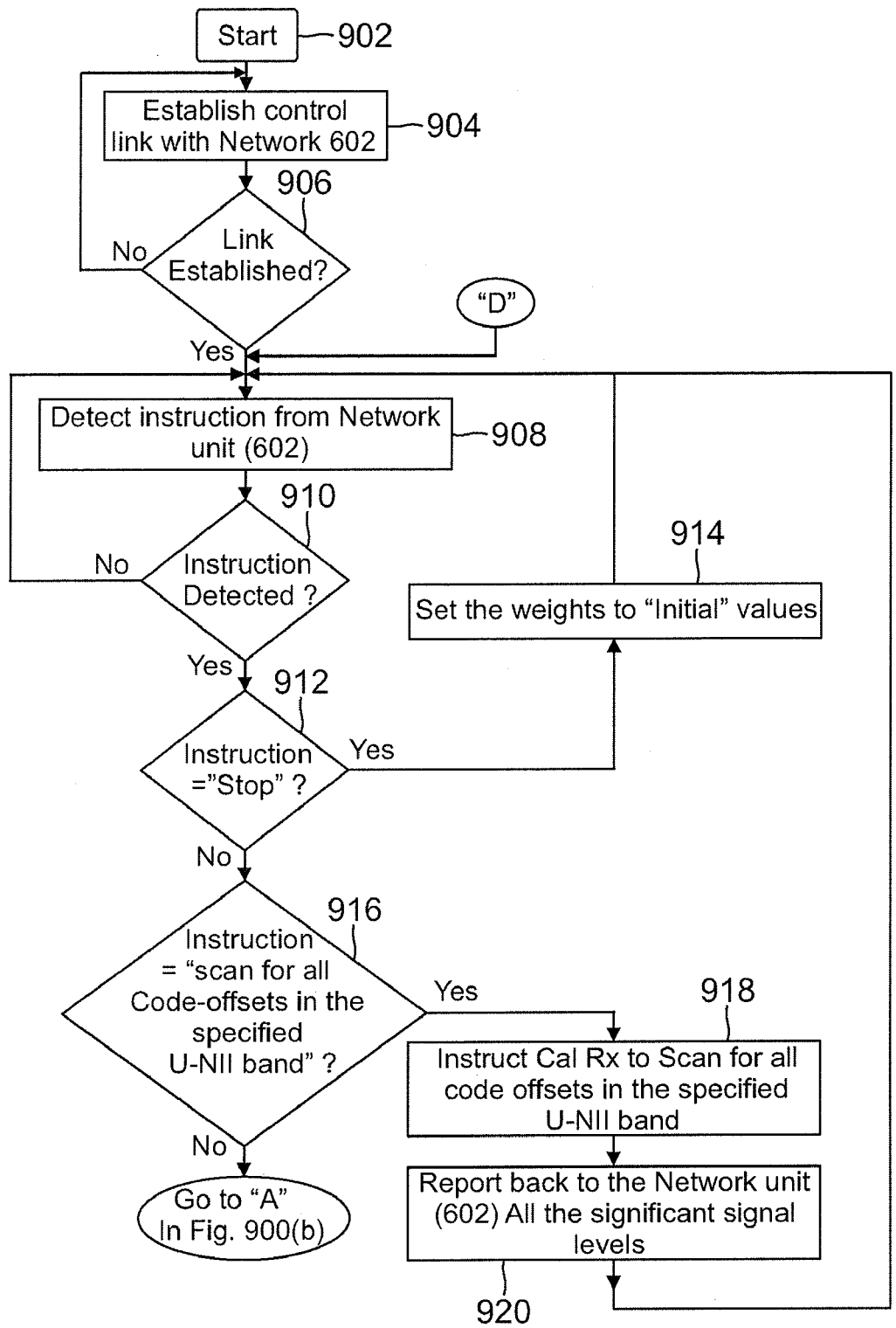
FIGS. 8A, 8B, 8C, and 8D are flow charts depicting embodiments of system operation flow for a user unit.
Figure 8B:
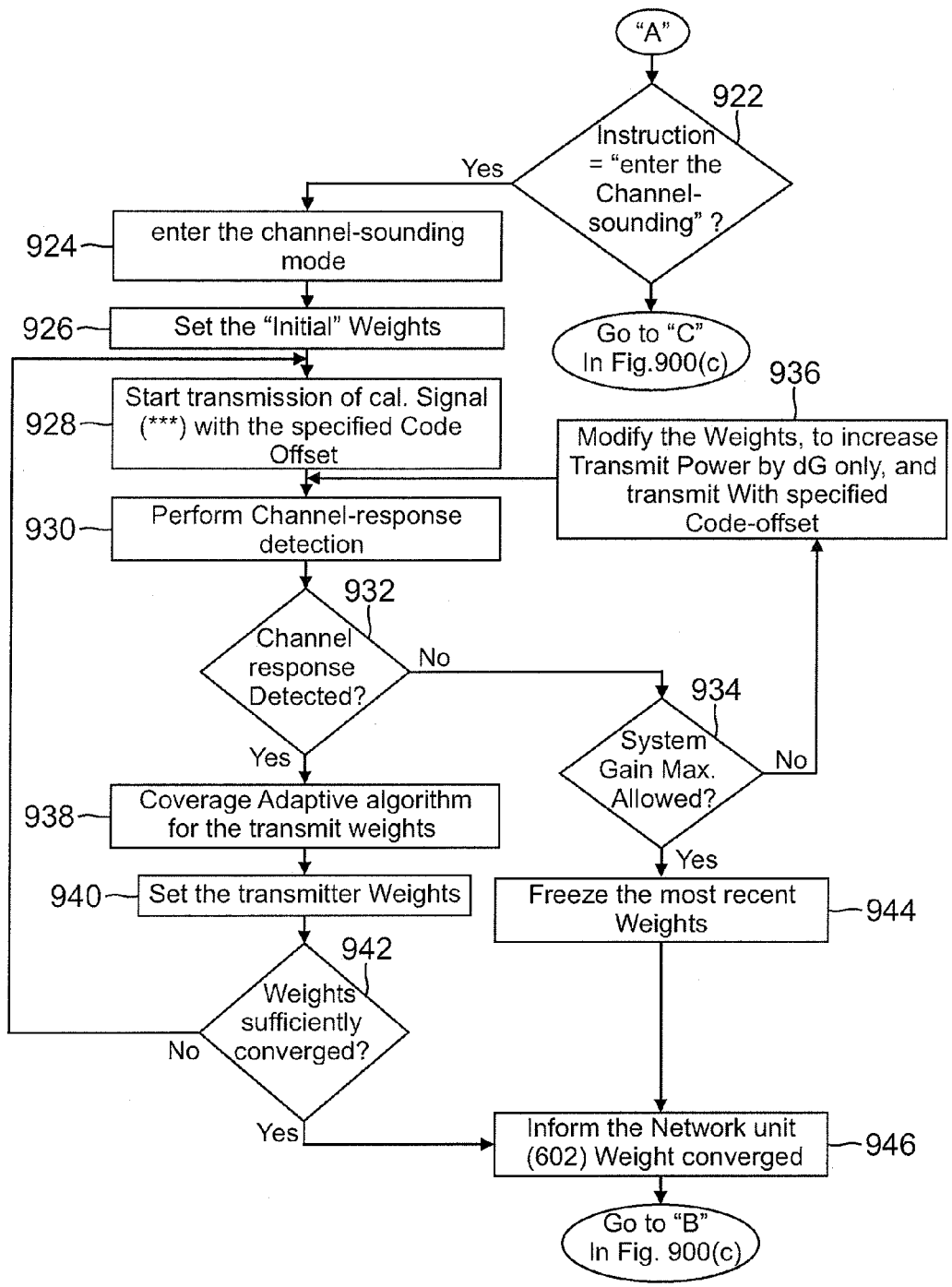
Figure 8C:
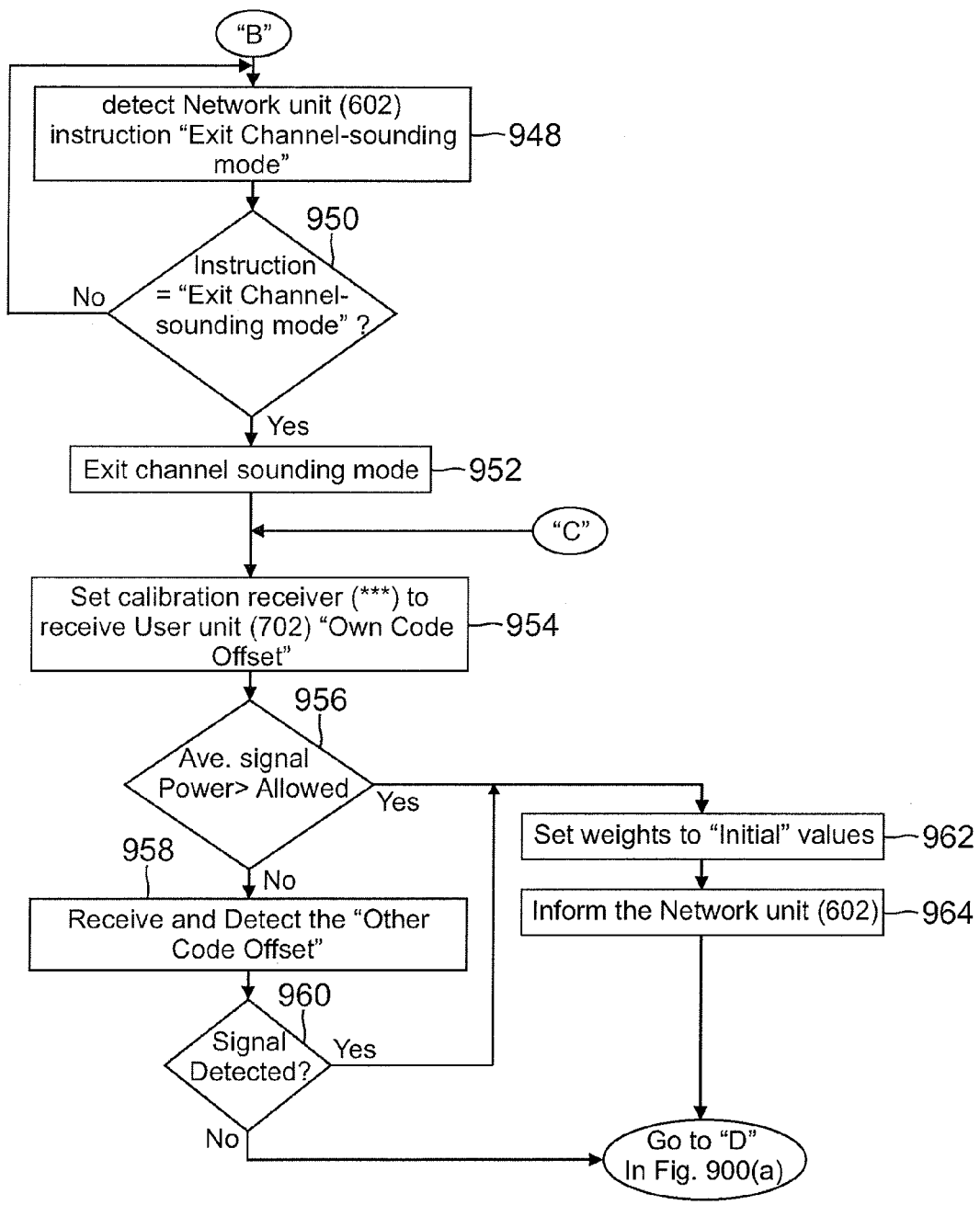
Figure 8D:
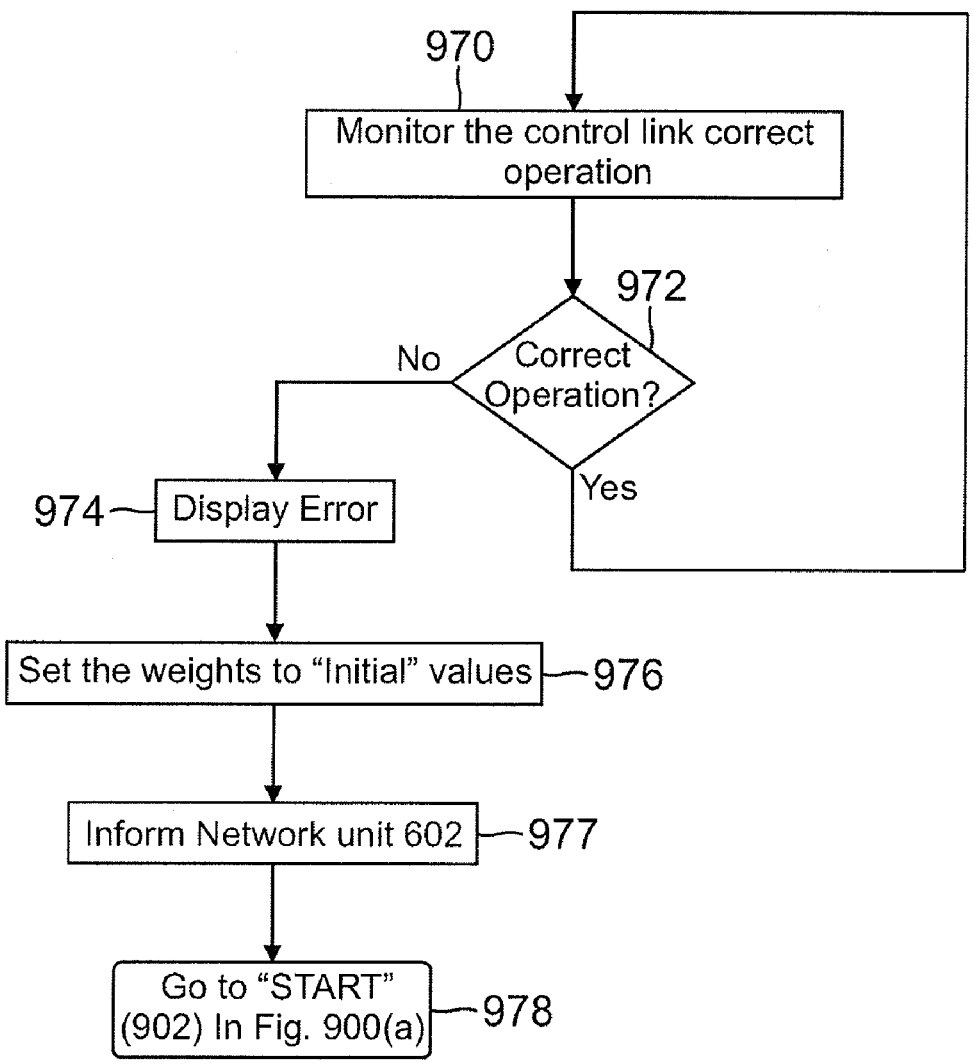

A second control-flow operation is shown in FIG. 8D. The second operation checks the quality and performance of the control links of the control units 720 and 628 by monitoring 970 quantities such as Bit Error Rate (BER), signal to noise ratio (SNR), background noise and interference. If the operation of the link is not satisfactory 972, an error signal is flagged 974 and the complex-weight unit 748 weights $W_0$ and $W_1$ are set 976 to the "Initial" value. Network unit 602 is informed 977 before the micro-controller 728 returns 978 to action 902.

The description is merely an example a system implementation. Other possible methods and solutions may be implemented and some description of control signaling is omitted. Several points may be noted.

1. The Network unit 602 can control several User units, such as the User unit 702. In such setups, the example control flow, shown in FIGS. 7A, 7B, 7C, 7D, 8A, 8B, 8C, and 8D may be modified so that the Network Unit 602 can initialize each User unit independently at first and together in a final action. In a configuration with multiple User units such as 702, the Network unit 602 weights may be converged for the User unit that has the minimum Up-link System Path Loss $PL_{ul}$, with the Network unit 602. Therefore each User unit 702 in a booster network may have a unique code phase.
2. Another modification used for a configuration with multiple User units 702, final weight convergence of the units in a booster network, including both Network and User units, may be performed with User units under control of the Network unit 602 active in the channel-sounding operation. Accordingly, combined signal power levels do not exceed the safe limit. If combined signal from the User Units exceeds the acceptable level for either of the reverse or forward system links, the appropriate weights have to be modified in iterative step increments to a level at which the maximum allowed system link gains of the forward and the reverse links are met.
3. Although the forward link direction signal path in both the Network unit 602 and the User unit 702 is always active to boost the beacon for example for Broadcast Control Channel (BCCH) in Global System for Mobile Communications (GSM) transmissions of the base stations, the reverse-link signal path of the Network unit 602 and the User unit 702 need not be active unless a substantial signal level is detected, based on the presence of uplink or gated signal. Care is taken that the reverse-link gated operation does not interfere with the channel-sounding signal path and unit 622 and 620 communications. Therefore, the gated operation is a continuous operation during the channel-sounding process with channel sounding carried out on regular bases.
4. Modifications in hardware and control software may be implemented to merge the Network unit 602 and the User unit 702 into a single unit, connected "back-to-back". Design and operation of the back-to-back option is described with reference to FIG. 11.
5. The unique Network unit 602 identity code and optionally device location can be transmitted to the cellular network. The information can be used to locate a user in an indoor environment, for example by generating a heavily coded (protected), low bit rate data, containing a long known preamble, the unique identity code and optionally the longitude and the latitude of the Network unit 602. The information can then be pulse-shaped for low spectral leakage and superimposed on the reverse-link signal of a given channel by an appropriate modulation scheme, within the Network unit 602. The choice of the modulation scheme depends on the operating cellular system. For example, for GSM, which enjoys a constant envelope modulation such as Gaussian Minimum Shift Keying (GMSK), amplitude modulation (with low modulation index) can be used. For Code Division Multiple Access (CDMA) systems, with fast reverse-link power control, Differential Binary Phase Shift Keying (DBPSK) can be used as the modulation scheme. The extraction of the above mentioned information from the received channel signal at base station may involve base station receiver modifications, but does not effect the normal operation of the cellular link.
6. The system design may also include Closed-loop power control between the Network unit 602 and User unit 702 for unlicensed band (U-NII) operation both in forward and reverse links. Closed-loop power control may be based on very low-rate, for example 10 Hz, differential or absolute power control commands based on received signal power to increase or reduce the U-NII band transmission powers so that only sufficient power is transmitted from the antennas 636, 638 on the Network unit 602 side and antennas 704 and 706 on the User unit 702 side for correct operation. Variable gain amplifiers may be used for transmission of the U-NII band both in the Network unit 602 and the User unit 702. Closed-loop power control messages may be exchanged between the Network unit 602 and the User unit 702 via the control link units 628 and 720 in forward and reverse-links.
7. On the Network unit 602 side, once the complex-weight unit 648 weights $W_0$ and $W_1$ are converged spatial dither may be superimposed on the antenna radiation pattern so that multipath standing wave patterns are sufficiently disturbed to include diversity gain on the Up-link. A second set of weights may be converged to maintain the spatial position of the "nulls" while changing the radiation pattern sufficiently to create antenna radiation pattern diversity. Weights can be converged by first performing direction finding, for example using a discrete Fourier transform (DFT) on the original weights to identify the "Null" position and forming new weights using algorithms such as Minimum-Variance Linear-Constraint Beam-forming algorithms (MVLCBF) with the constraint being the position of the spatial "Null". Repeated switching between the two sets of weights creates antenna pattern diversity gain on the up-link. Similar structures and techniques can be implemented on Down-link path of the User unit 702.
8. In the illustrative embodiment of the Network unit 602 and the User unit 702, only two sets of complex weights $W_0$ and $W_1$ are used in the complex-weight units 648 and 748 since two diversity antennas are readily available at both units. In other embodiments, in both the Network unit 602 and in the User unit 702 more than two antennas and hence more than two weights can be used with minor modifications from the disclosed structures and techniques.

9. Although the complex-weight units 648 in the Network unit 602 and complex-weight units 748 in the Network unit 702 are used for transmitter beam-forming, similar complex weight units may be used at the input terminals to the receivers of the Forward-link Network unit 604 in the Network unit 602 and Reverse-link User unit 726 in the Network unit 702 so that receiver beam-forming can also be performed. The receiver weight convergence can be based on similar procedure as for the transmitter implementation with only minor changes.

10. Weights $W_0$ and $W_1$ of the complex-weight units 648 in the Network unit 602 and complex-weight units 748 in the Network unit 702 may be converted with the Reverse-link Network unit 606 in the Network unit 602 and Forward-link User unit 724 in the Network unit 702 completely "OFF" or disabled so that cellular signals are not repeated or transmitted. Accordingly, convergence of the weights $W_0$ and $W_1$ of the complex-weight units 648 in the Network unit 602 and complex-weight units 748 in the Network unit 702 may be converged first, before the start of the booster normal operation.

The above discussion is applicable to all the different analogue implementations of all the various disclosed boosters.

Digital Implementation Example

Figure 9:
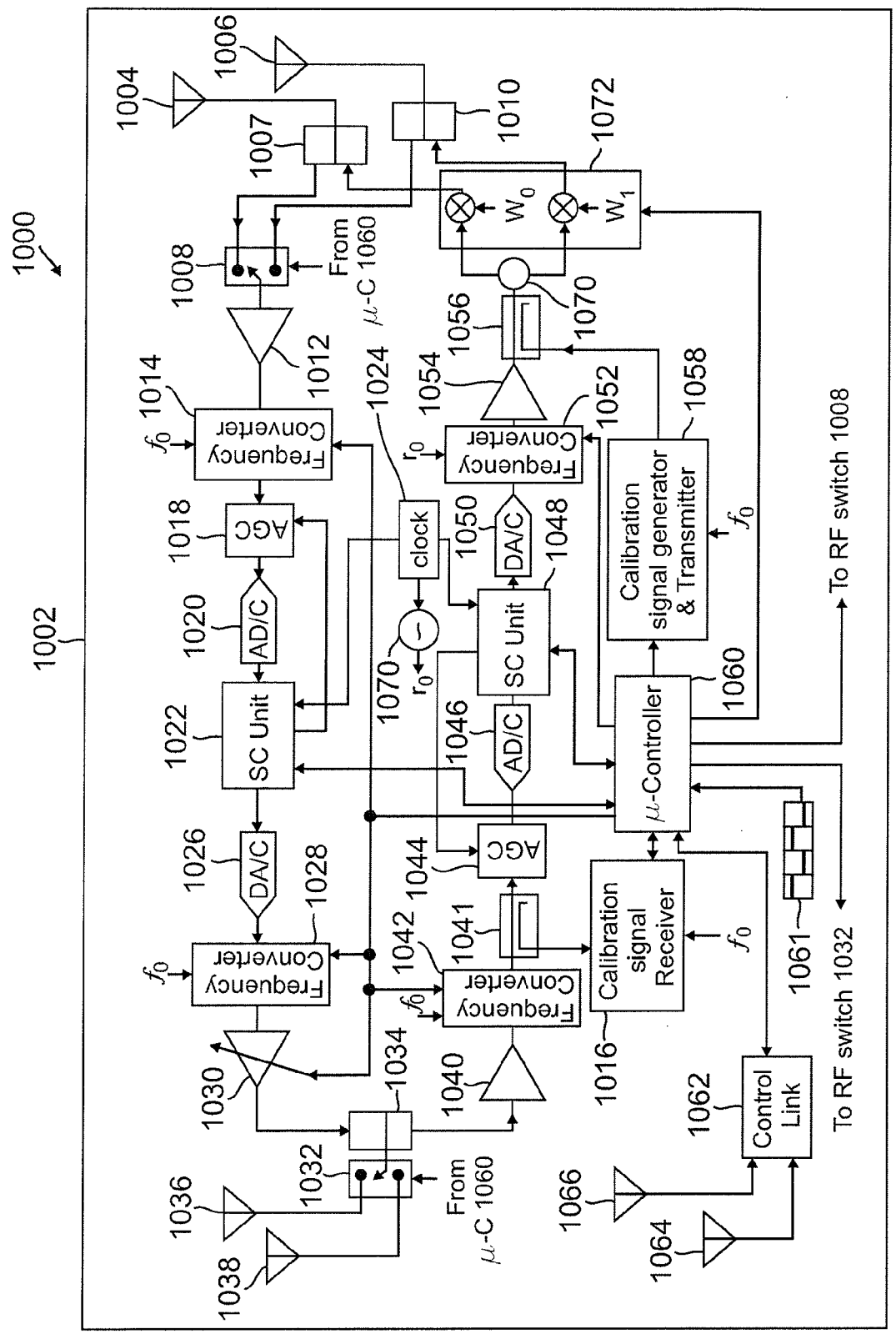
FIG. 9 is a schematic block diagram illustrating an embodiment of a digital implementation of a network unit including multiple antennas which may be used for antenna diversity.

FIG. 9 shows an example of digital implementation of the Network unit 602 (labeled 1002 in FIG. 9), which is placed where good signal coverage exists, indoor or outdoors. Two antennas 1004 and 1006 are used for antenna diversity for the cellular band transmitter and receiver of the Network unit 1002. Also two antennas 1036 and 1038 are used for antenna diversity of the U-NII band operation of the Network unit 1002. Although any diversity-combining scheme such as Maximal Ratio Combining or others can be used for the receiver chain and transmit diversity schemes such as random phase change in one or both antennas may be used for the transmitter chain, a simple scheme based on antenna switched diversity is disclosed. Switching may be continuous or based on received signal power level. Therefore, RF switch 1008 may be connected to duplexers 1007 and 1010 and Low Noise Amplifier (LNA) unit 1012 performs switching operations for the cellular receive operation of the Network unit 1002. Also, RF switch 1032 connected to antennas 1036 and 1038 and the duplex filter 1034 performs switching operations for the U-NII band transmit/receive operation of the Network unit 1002. The duplex filters 1007 and 1010 are also connected to antennas 1004 and 1006 on one side and to the Complex-Weight unit 1072 on the other side, as well as RF switch unit 1008. The complex-weight unit 1072 is connected to power-splitter hybrid combiner 1070 and the micro-controller 1060. The power-splitter hybrid combiner 1070 is connected to power amplifier unit 1054 via the directional coupler 1056. All directional couplers may be 17 dB directional couplers. Low Noise Amplifier (LNA) 1012 is connected to the frequency converter unit 1014. Frequency converter 1014 is connected to Automatic Gain Control (AGC) unit 1018. The frequency converter 1014 converts the frequency band of the incoming signal from the cellular band to baseband, or "near baseband" frequency band. The frequency converter unit 1014 includes all filtering for correct operation of the receiver chain. The operating frequency of the frequency converter unit 1014 is set by micro-controller unit 1060. The AGC unit 1018 is connected to Analogue to Digital Converter (ADC) unit 1020 and the Signal Conditioning (SC) unit 1022. The AGC 1018 is optional and places the received signal level substantially close to the middle of the dynamic range of the ADC 1020. If included, AGC 1018 is configured so that in the presence of low signal power, noise within the operating bandwidth does not dominate the operation of the AGC unit 1018. AGC 1018 is also configured so that the gain contribution of the AGC unit 1018 is compensated in the final Downlink System Link Gain $G_{dl}$ calculations or the gain value of the AGC 1018 is compensated in the Signal Conditioning (SC) unit 1022. If AGC unit 1018 is used in Network unit 1002 and the unit is designed for Code Division Multiple Access (CDMA) cellular networks, AGC bandwidth is selected to be much smaller than the power control repetition rate of the CDMA system, for example less than 1.5 kHz in WCDMA networks, so that the AGC operation does not interfere with the closed-loop power control. If AGC unit 1018 is not included, the ADC unit 1020 is designed to supply sufficient dynamic range, which can be as high as 192 dB (32-bits). The ADC unit 1020 is connected to the Signal Conditioning unit 1022. The Signal Conditioning unit 1022 performs tasks including channel select filtering for the selected operating frequency band, frequency conversion, insertion of reference frequency, signal level estimation, an AGC algorithm, WLAN transmitter algorithms, and other signal conditioning and processing features. For example, channel select filters that can be implemented as poly-phased filters and set for a selected operating bandwidth of 1.3, 5, 10 or 15 MHz, operating at any position within the forward-link cellular or Personal Communication Services (PCS) or selected frequency spectrum. Signal Conditioning unit 1022 clock frequency is derived from a local reference frequency unit 1070 and provided by clock unit 1024. Depending on system parameters, operational bandwidth, and load of the supported operations such as filtering, the Signal Conditioning unit 1022 may be implemented by a variety of technologies such as field-programmable gate arrays (FPGAs), application-specific integrated circuits (ASICs), and general purpose digital signal processors (DSPs) such as Texas Instruments TMS320C6416-7E3 processor. The Signal Conditioning unit 1022 includes all appropriate interfaces and memory. The Signal Conditioning unit 1022 is connected to Digital to Analogue Converter (DA/C) unit 1026. The DA/C unit 1026 includes sufficient post filtering after digital to analogue conversion. The DA/C unit 1026 is connected to frequency converter unit 1028. Frequency converter unit 1028 up-converts the frequencies of the input signal to the selected portion of U-NII band of frequencies. The frequency converter unit 1028 includes sufficient filtering for correct operation of the transmitter chain. The operating frequency of the frequency converter unit 1028 is set by micro-controller unit 1060. Therefore, a Dynamic Channel Allocation (DCA) algorithm can be used to select the best operating frequency band. The frequency converter unit 1028 is connected to the variable gain amplifier unit 1030. Gain of amplifier 1030 is set by the micro-controller unit 1060 and may be set to the maximum allowed power for transmission in U-NII band. The variable gain amplifier unit 1030 is connected to Duplex filter 1034. The duplex filter 1034 is connected to reverse-link LNA 1040 and the VG amplifier 1030. LNA 1040 is connected to the frequency converter unit 1042. Frequency converter unit 1042 is connected to the directional coupler unit 1041. The frequency converter 1042 converts the frequency band of the incoming signal from the U-NII band to baseband, or "near baseband" frequency band. The frequency converter unit 1042 includes appropriate filtering for correct operation of the receiver chain. The operating frequency of the frequency converter unit 1042 is set by micro-controller unit 1060. Directional coupler unit 1041 is connected to Automatic Gain Control (AGC) unit 1044 and the calibration signal receiver unit 1016. The AGC unit 1044 is connected to Analogue to Digital Converter (AD/C) unit 1046 and the Signal Conditioning unit 1048. The AGC 1044 is optional and is used to place the received signal level substantially close to the middle of the dynamic range of the AD/C 1046. If included, AGC 1044 is implemented so that in the presence of low signal power, noise within the operating bandwidth does not dominate the operation of the AGC unit 1044. Gain contribution of the AGC unit 1044 is selected to compensated in the final Up-link System Link Gain $G_{ul}$ calculations, or the gain value of the AGC 1044 is compensated in the Signal Conditioning (SC) unit 1048. If AGC unit 1044 is used in Network unit 1002 and the unit is designed for CDMA cellular networks, AGC bandwidth is selected to be much smaller than the power control repetition rate of the CDMA system, for example less than 1.5 kHz in WCDMA networks, so that AGC operation does not interfere with the closed-loop power control mechanism. If the AGC unit 1044 is not included, the AD/C unit 1046 is configured to supply suitable dynamic range, which can be as high as 192 dB (32-bits). The AD/C unit 1046 is connected to the Signal Conditioning unit 1048. The Signal Conditioning unit 104& performs tasks including channel select filtering for the selected operating frequency band, frequency conversion, signal calibration receiver, signal level estimation, AGC algorithm, WLAN receiver algorithms and any other features that use signal conditioning and processing. For example, the channel select filters that can be implemented as poly-phased filters and set for a selected operating bandwidth of 1.3, 5, 10 or 15 MHz, operating at any position within the forward-link U-NII or a selected frequency spectrum. The Signal Conditioning unit 1048 clock frequency may be derived from a local reference frequency unit 1070 and supplied by clock unit 1024. Depending on the system parameters such as operational bandwidth and supported operation load such as filtering, the Signal Conditioning unit 1048 may be implemented by a variety of technologies such as Field Programmable Gate Arrays (FPGAs), Application-Specific Integrated Circuits (ASICs) and general purpose Digital Signal Processors (DSPs) such as Texas Instruments TMS320C6416-7E3 processor. The Signal Conditioning unit 1048 includes appropriate interfaces and memory. The Signal Conditioning unit 1048 is connected to Digital to Analogue Converter (DA/C) unit 1050. The DA/C unit 1050 is connected to frequency converter unit 1052. The DA/C unit 1050 implements suitable post filtering following digital to analogue conversion. Frequency converter unit 1052 up-converts the frequencies of the input signal to the selected portion of cellular or Personal Communication Services (PCS) band of frequencies. The frequency converter unit 1052 includes appropriate filtering for correct operation of the transmitter chain. The operating frequency of the frequency converter unit 1052 is set by micro-controller unit 1060. The frequency converter unit 1052 is connected to the power amplifier unit 1054. The power amplifier unit 1054 is connected to directional coupler 1056.

A calibration signal generator/transmitter unit 1058 is coupled to the reverse-link transmitter path of the Network unit 1002 via the directional coupler 1056. The unit 1058 generates a channel-sounding signal, which is used to establish the complex channel characteristics between the Network unit 1002 antennas 1004 and 1006 and the input terminal to the calibration signal receiver 1016. The channel-sounding signal generated by unit 1058 is transmitted via the complex-weight unit 1072 and the diversity antennas 1004 and 1006 with a maximum transmit level, which is substantially below any expected signal level from cellular network, for example 20 dB below the minimum expected cellular signal level. The combined transmitted channel-sounding signal level and the processing gain used in the calibration signal receiver unit 1016 is less than or equal to the Up-link Gain Margin $dg_{ul}$. The channel-sounding signal generated by unit 1058 is a direct-sequence spread spectrum signal modulated by a known Pseudo Random (PN) code with a known code phase, called an "own code" phase, and having a chipping rate comparable to the forward and reverse links of the Network unit 1002 and User unit 2002 shown in FIG. 10 operating bandwidths, for example 5 Mchips/s for 5 MHz bandwidth, and a minimum code length to supply a suitable processing gain. The code length is supplied which is longer than the maximum expected path delay. A code length of 1000 chips is adequate for most scenarios. The channel-sounding signal can be transmitted continuously or transmitted only when prompted by transmission. The code phases are selected such that the minimum code phase difference is larger than the maximum expected path delay measured in a multiple number of chips. Subsequent code phases are integer multiples of the minimum code phase. The calibration signal receiver unit 1016 is coupled to the reverse-link receive path of the Network unit 1002 by directional coupler 1041 using the known PN code. The transmit code phase is capable of detecting and demodulating the channel-sounding signal transmitted by unit 1058, which enters the reverse-link path via the closed-loop existing between the Network unit 1002 and the User unit 2002 in FIG. 10. The calibration signal receiver unit 1016 is adapted to establish the received signal strength and phase. A complex channel impulse response exists between the Network unit 1002 combined outputs of antennas 1004 and 1006 and the input terminal to the calibration signal receiver 1016. The calibration signal receiver unit 1016 establishes the signal either by a correlation operation similar to a RAKE receiver path searcher or by matrix inversion operation on an appropriate block of sampled received signal. The calibration signal receiver unit 1016 includes many sub-units, for example a frequency converter, to return the calibration signal to base-band frequencies. Other sub-units are A/D converters and base-band processors to perform base-band algorithms. The PN code phase can be assigned uniquely or determined according to a random algorithm so that the probability of two units having the same code phase can be very low. Other code offset assignment strategies are also possible, such as dynamic assignment in which a code offset is selected so long as no other signal with the same offset is detected in that geographical area. Dynamic assignment enables the calibration signal receiver 1016 to be able to scan and receive "other code" phases, and hence establishes whether any other signal coupling to or from other units exists that may be operating in the same geographical area. More than one code phases can be used to establish the complex channel impulse response so that the probability of detection by other systems is increased. The PN code used for the channel-sounding signal can be modulated with information about the identity of the Network unit 1002. The carrier frequency of the transmitted channel-sounding signal may be the operating cellular frequency band. In other embodiments, carrier frequencies in other bands may be used, such as ISM band at 2.4 GHz, for transmission of the channel-sounding signal. In the other bands, the calibration signal generator and transmitter 1058 carrier frequency is placed as near as possible to the operating frequency band. The chipping rate and the transmit power of the channel-sounding signal PN code are implemented so that the channel-sounding signal complies with the FCC 47 CFR Part-15 rules. The ISM band, although not the same as the cellular operating band, is sufficiently close to enable the system to converge the spatial algorithm weights and establish the weights $W_0$ and $W_1$ used in the complex-weight unit 1072. Any antenna and propagation differences in average signal power and antenna behavior between the ISM and cellular operating bands can be analyzed and minimized by selection of filtering parameters.

The calibration transmitter unit 1058 and the calibration receiver unit 1016 baseband functions, as well as the complex-weight unit 1072 can be integrated and supported by the Signal Conditioning unit 1048. In this example, the complex-weight unit 1072 is implemented in combination with two amplifiers such as amplifiers 1054 positioned before the duplex filters 1007 and 1010. Also in the illustrative example, the calibration signal generator and transmitter unit 1058 and the calibration signal receiver 1016 are both in the Network unit 1002. In other embodiments one or more of the calibration signal generator 1016, the transmitter unit 1058, and the calibration signal receiver 1016 can also be placed in the User unit 2002 with various modifications and taking into account design considerations. The Equipment ID and reference frequency unit 624 shown in FIG. 6 in the forward-link path may be supported by the Signal Conditioning unit 1022 in the digital Network unit 1002. The description and function may be the same as for unit 624.

Figure 10:
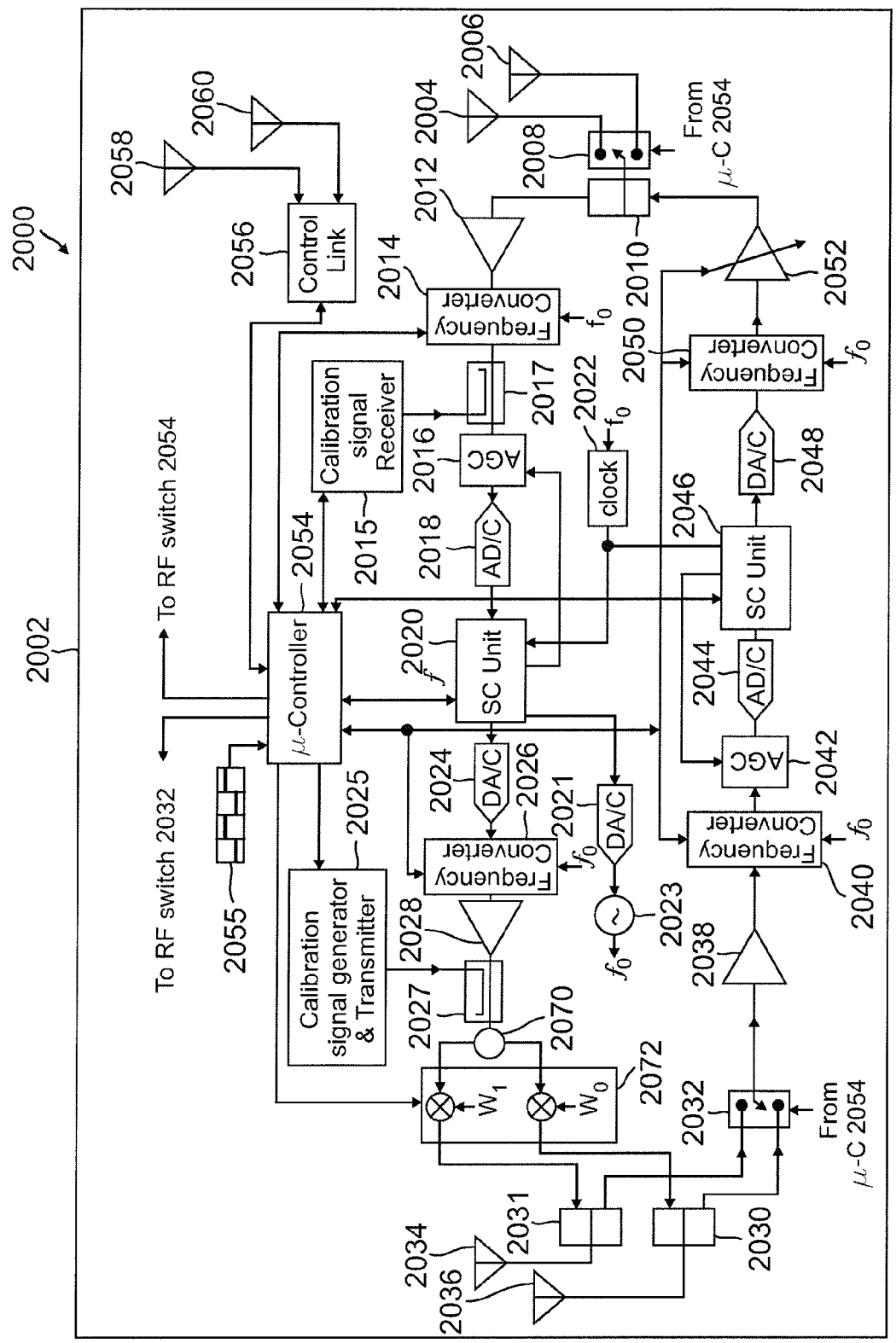
FIG. 10 is a schematic block diagram illustrating an embodiment of a digital implementation of a user unit including multiple antennas which may be used for antenna diversity.

The control link unit 1062 may be a radio link between the two Network unit 1002 and the User unit 2002 shown in FIG. 10. The control link 1062 may be a proprietary link that operates in one of the unlicensed band of frequencies or may be a standard wireless link such as 802.11b, 802.11a, 802.11g or Bluetooth links, designed to operate in the unlicensed band. The control link unit 1062 is connected to micro-controller unit 1060 and is adapted to communicate with the Network or User unit through an appropriate interface. The control link unit 1062 is also connected to antennas 1066 and 1064 for transmission and reception of the control signals. Antenna bandwidth and operating frequency may enable, with minor modifications to unit 1002, antenna units 1036 and 1038 to perform control link unit 1062 operations. Minor modifications to unit 1002 and appropriate selection of operating frequencies enable baseband functionality of the control link unit 1062 to be included in the Signal Conditioning units 1022 and 1048. Transmit/receive control link unit 1062 signals may be multiplexed in frequency or time with the transmit/receive signals of the forward and the reverse-link Network unit 1002 that are transmitted and received by antennas 1038 and 1036.

Micro-controller unit 1060 may be a simple micro-processor such as ARM7 or ARM9 with appropriate memory and interfaces. The micro-controller unit 1060 may control operation of the Network unit 1002 and may perform additional signal conditioning and processing such as signal level averaging and estimation and adaptive algorithms such as Least Mean-Square (LMS) and Recursive Least Squares (RLS). The micro-controller unit 1060 may also set the operating bandwidth and weights $W_0$ and $W_1$ to communicate and control the User unit 2002 via the control link unit 1062 and to communicate and control the calibration signal generator and transmitter 1058 and calibration signal receiver 1016 to operate switching for the receiver antenna diversity and monitor the correct operation of the Network unit 1002 and User unit 2002. Other tasks of the micro-controller 1060 are disclosed in detail in the discussion of FIGS. 7A, 7B, 7C, and 7D. The illustrative micro-controller unit 1060 is connected to units 1062, 1016, 1058, 1052, 1048, 1042, 1030, 1028, 1022, 1072 and 1014, as well as the RF switches 1008 and 1032. The micro-controller 1060 uses the complex channel impulse response at the output terminal of the calibration signal receiver unit 1016 and may use Least Mean-Square (LMS), Recursive Least Squares (RLS), QR-RLS, or QR decomposition to compute optimum values of the complex weights $W_0$ and $W_1$ such that the received complex channel impulse response at the output terminal of the calibration signal receiver unit 1016 is minimized or reduced. The determined transmit weights enable radio frequency (RF) isolation for up-link frequencies between the Network unit 1002 and the User unit 2002 within the propagation channel, and further may enable a maximum possible overall ERP (Effective Radiated Power) from antennas 1004 and 1006, resulting in a maximum coverage footprint.

Units 1062, 1016, 1058, 1052, 1042, 1060, 1028, 1046, 1020, 1024 and 1014 are depicted in an arrangement connected to local oscillator unit 1070, or may otherwise derive clock and reference frequencies from the local oscillator 1070 signal. A simple user interface unit 1061, which may be a keypad, a simple dipswitch, or other device, may be connected to micro-controller unit 1060. The Network unit 1002 has a unique "identity code", which can be set by the user interface unit 1061, is accessible to the micro-controller unit 1060, and can be communicated to the User unit 2002 micro-controller unit 2054 or other User units that may be within operating range of Network unit 1002.

FIG. 10 shows an example of digital implementation of the User unit 702, for example labeled 2002 in FIG. 10, which may be positioned in a location with poor signal coverage, either indoor or outdoors. Two antennas 2034 and 2036 may be used for antenna diversity for the cellular band transmitter and receiver of the User unit 2002. Two antennas 2004 and 2006 may be used for antenna diversity of the U-NII band operation of the User unit 2002. Although, any diversity-combining scheme such as Maximal Ratio Combining or others may be used for the receiver chain and for transmit diversity schemes such as random phase change in one or both antennas for the transmitter chain, a simple scheme that is based on antenna switched diversity may also be used. Switching may be continuous or based on received signal power level. Therefore, the RF switch 2032 connected to duplexers 2030 and 2031 and the Low Noise Amplifier (LNA) unit 2038 performs switching operations for cellular receive operation of the User unit 2002. RF switch 2008 connected to antennas 2004 and 2006 and the duplex filter 2010 performs switching operations for the U-NII band transmit/receive operation of the User unit 2002. Duplex filters 2030 and 2031 are also connected to antennas 2036 and 2034 on one side and to the Complex-Weight unit 2072 on the other side, as well as the RF switch unit 2032. The complex-weight unit 2072 is connected to power-splitter hybrid combiner 2070 and the micro-controller 2054. The power-splitter hybrid combiner 2070 is connected to power amplifier unit 2028 via the directional coupler 2027. The directional couplers may be 17 dB directional couplers. Low Noise Amplifier (LNA) 2038 is connected to the frequency converter unit 2040. Frequency converter 2040 is connected to Automatic Gain Control (AGC) unit 2042. The frequency converter 2040 converts the frequency band of the incoming signal from the cellular band to baseband or to a "near baseband" frequency band. Frequency converter unit 2040 performs appropriate filtering for correct operation of the receiver chain. The operating frequency of the frequency converter unit 2040 is set by micro-controller unit 2054. Automatic Gain Control (AGC) unit 2042 is connected to Analogue to Digital Converter (AD/C) unit 2044 and the Signal Conditioning (SC) unit 2046. AGC 2042 is optional and is used to set the received signal level substantially close to the middle of the dynamic range of the AD/C 2044. If included, AGC 2042 is adapted so that in the presence of low signal power, noise within the operating bandwidth does not dominate and the gain contribution is compensated in the final Up-link System Link Gain $G_{ul}$ calculations. Otherwise, the gain value of the AGC 2042 is compensated in Signal Conditioning (SC) unit 2046. If AGC unit 2042 is used in the User unit 2002 and the unit is designed for CDMA cellular networks, AGC bandwidth is selected to be much smaller than the power control repetition rate of the CDMA system, for example less than 1.5 kHz in WCDMA networks, so that AGC operation does not interfere with closed-loop power control. If AGC unit 2042 is not included, the AD/C unit 2044 supplies a suitable dynamic range, which can be as high as 192 dB (32-bits). The AD/C unit 2044 is connected to the Signal Conditioning unit 2046.

Signal Conditioning (SC) unit 2046 performs tasks including channel-select filtering for the selected operating frequency band, frequency conversion, insertion of reference frequency, signal level estimation, AGC algorithm, WLAN transmitter algorithms, and other signal conditioning and processing features. For example, channel select filters that can be implemented as poly-phased filters and set for a selected operating bandwidth of 1.3, 5, 10 or 15 MHz, operating at any position within the forward-link cellular or Personal Communication Services (PCS) or the selected frequency spectrum. The Signal Conditioning unit 2046 clock frequency is derived from a local reference frequency unit 2023 and supplied by clock unit 2022. Depending on the system parameters and operational bandwidth and the load of the supported operations such as filtering, the Signal Conditioning unit 2046 may be implemented by a variety of technologies such as Field-Programmable Gate Arrays (FPGAs), Application-Specific Integrated Circuits (ASICs), and general purpose Digital Signal Processors (DSPs) such as Texas Instruments TMS320C6416-7E3 processor. The Signal Conditioning unit 2046 includes appropriate interfaces and memory. The Signal Conditioning unit 2046 is connected to Digital to Analogue Converter (DA/C) unit 2048. The DA/C unit 2048 includes post filtering that is appropriate after digital to analogue conversion. The DA/C unit 2048 is connected to frequency converter unit 2050. Frequency converter unit 2050 up-converts frequencies of the input signal to the selected portion of U-NII band of frequencies. The frequency converter unit 2050 includes appropriate filtering for correct operation of the transmitter chain. Operating frequency of the frequency converter unit 2050 is set by micro-controller unit 2054. Dynamic Channel Allocation (DCA) may be used to select the best operating frequency band. The frequency converter unit 2050 is connected to the variable gain amplifier unit 2052. The gain of this amplifier 2052 is set by the micro-controller unit 2054 and can be set to maximum allowed power for transmission in U-NII band. The variable gain amplifier unit 2052 is connected to Duplex filter 2010. The duplex filter 2010 is connected to forward-link LNA 2012 and the VG amplifier 2052. Low Noise Amplifier (LNA) 2012 is connected to the frequency converter unit 2014. Frequency converter unit 2014 is connected to the directional coupler unit 2017. The frequency converter 2014 converts the frequency band of the incoming signal from the U-NII band to baseband or a "near baseband" frequency band. The frequency converter unit 2014 includes filtering for correct operation of the receiver chain. Operating frequency of the frequency converter unit 2014 is set by micro-controller unit 2054. Directional coupler unit 2017 is connected to Automatic Gain Control (AGC) unit 2016 and the calibration signal receiver unit 2015. The AGC unit 2016 is connected to Analogue to Digital Converter (AD/C) unit 2018 and the Signal Conditioning unit 2020. The AGC 2016 is optional and sets received signal level substantially close to the middle of the dynamic range of the AD/C 2018. If included, AGC 2016 is configured so that in the presence of low signal power noise within the operating bandwidth does not dominate operation and gain contribution is compensated in the final Down-ink System Link Gain $G_{dl}$ calculations. Otherwise, the gain value of AGC 2016 is compensated in the Signal Conditioning (SC) unit 2020. If AGC unit 2016 is used in the User unit 2002 and the unit is designed for Code Division Multiple Access (CDMA) cellular networks, AGC bandwidth is selected to be much smaller than the power control repetition rate of the CDMA system, for example less than 1.5 kHz in WCDMA networks, so that AGC operation does not interfere with the closed-loop power control. If AGC unit 2016 is not included, AD/C unit 2018 supplies a suitable dynamic range, which can be as high as 192 dB (32-bits). AD/C unit 2018 is connected to Signal Conditioning unit 2020. Signal Conditioning unit 2020 performs tasks including channel select filtering for the selected operating frequency band, frequency conversion, signal calibration receiver, signal level estimation, AGC algorithm, WLAN receiver algorithms, and other signal conditioning and processing features. For example, channel select filters may be implemented as poly-phased filters and set for a given operating bandwidth of 1.3, 5, 10 or 15 MHz, operating at any position within the forward-link U-NII or a selected frequency spectrum. The Signal Conditioning unit 2020 clock frequency is derived from clock unit 2022 with the reference frequency supplied by unit 2023. Depending on the system parameters such as operational bandwidth and supported operation load such as filtering, the Signal Conditioning unit 2020 may be implemented by a variety of technologies such as Field-Programmable Gate Arrays (FPGAs), Application-Specific Integrated Circuits (ASICs), and general purpose Digital Signal Processors (DSPs) such as Texas Instruments TMS320C6416-7E3 processor. The Signal Conditioning unit 2020 includes appropriate interfaces and memory. The Signal Conditioning unit 2020 is connected to Digital to Analogue Converter (DA/C) unit 2024. The DA/C unit 2024 is connected to frequency converter unit 2026. The DA/C unit 2024 includes post filtering that is appropriate after digital to analogue conversion. Frequency converter unit 2026 up-converts the frequencies of the input signal to the selected portion of cellular or Personal Communication Services (PCS) band of frequencies. The frequency converter unit 2026 includes filtering for correct operation of the transmitter chain. The operating frequency of the frequency converter unit 2026 is set by micro-controller unit 2054. The frequency converter unit 2026 is connected to the power amplifier unit 2028. The power amplifier unit 2028 is connected to directional coupler 2027.

A calibration signal generator/transmitter unit 2025 is coupled to the forward-link transmitter path of the User unit 2002 via directional coupler 2027 and generates a channel-sounding signal, which is establishes the complex channel characteristics between the User unit 2002 antennas 2034, 2036 and the input terminal to the calibration signal receiver 2015. The channel-sounding signal generated by unit 2025 is transmitted via the complex-weight unit 2072 and the diversity antennas 2034 and 2036 with a maximum transmit level substantially below any expected signal level from cellular network, for instance 20 dB below the minimum expected cellular signal level. The combined transmitted channel-sounding signal level and the processing gain used in the calibration signal receiver unit 2015 is less than or equal to the Down-link Gain Margin $dg_{dl}$. The channel-sounding signal generated by unit 2025 is a direct-sequence spread spectrum signal modulated by a known Pseudo Random (PN) code with a known code phase, which may be termed an "own code" phase. The channel-sounding signal has a chipping rate comparable to the forward and reverse links of the User unit 2002 and Network unit 1002 in FIG. 9 operating bandwidths, for example 5 Mchips/s for 5 MHz bandwidth, and a minimum code length to supply a suitable processing gain. The channel-sounding signal is generated with a time code length longer than the maximum expected path delay. A code length of 1000 chips is adequate for most scenarios. The channel-sounding signal can be transmitted continuously or transmitted only when prompted by transmission. Code phases are selected such that the minimum code phase difference is larger than the maximum expected path delay, measured in multiple number of chips. Subsequent code phases are integer multiples of the minimum code phase. The calibration signal receiver unit 2015 is coupled to the forward-link receive path of the User unit 2002 by directional coupler 2017 using the known PN code. The transmit code phase is capable of detecting and demodulating the channel-sounding signal transmitted by unit 2025, which enters the reverse-link path via the closed-loop mechanism that exists between the User unit 2002 and the Network unit 1002. The calibration signal receiver unit 2015 is adapted to establish the received signal strength and phase, either by correlation operation similar to a RAKE receiver path searcher or by matrix inversion operation on an appropriate block of sampled received signal. A complex channel impulse response exists between the User unit 2002 combined outputs of antennas 2034, 2036 and the input terminal to the calibration signal receiver 2015.

The calibration signal receiver unit 2015 includes many sub-units. A frequency converter sub-unit returns the calibration signal to base-band frequencies. Other units such as A/D converters and base-band processors perform base-band algorithms. The PN code phase can be assigned uniquely or determined according to a random algorithm whereby the probability of two units having the same code phase can be very low. Other code offset assignment strategies may otherwise be used, such as dynamic assignment, whereby a code offset is selected so long as the offset is not otherwise detected in the geographical area. Offset determination enables the calibration signal receiver 2015 to scan and receive "other code" phases, establishing whether any other signal couples to other units that may be operating in the same geographical area. More than one code phase can be used to establish the complex channel impulse response so that the probability of detection by other systems is increased. The PN code for the channel-sounding signal can be modulated with information about the identity of the User unit 2002. The carrier frequency of the transmitted channel-sounding signal may be set to the operating cellular frequency band or may be set to carrier frequencies in other bands, such as ISM band at 2.4 GHz, for transmission of the channel-sounding signal. For operating frequencies outside the cellular band, the calibration signal generator and transmitter 2025 carrier frequency is placed as near as possible to the operating frequency band. The chipping rate and the transmit power of the channel-sounding signal PN code are implemented so that the channel-sounding signal complies with the FCC 47 CFR Part-15 rules. The ISM band, although not the same as the cellular operating band, is sufficiently close to enable the system to converge the spatial algorithm weights, and establish the weights $W_0$ and $W_1$ used in the complex-weight unit 2072. Any antenna and propagation differences in average signal power and antenna behavior between the ISM and cellular operating bands can be taken into account in filter implementation.

The calibration transmitter unit 2025 and the calibration receiver unit 2015 baseband functions, as well as the complex-weight unit 2072 may be integrated and supported by the Signal Conditioning unit 2020. In the illustrative example, two amplifiers 2028 are positioned before duplex filters 2031 and 2030. The depicted example also includes the calibration signal generator and transmitter unit 2025 and the calibration signal receiver 2015, are contained both within the User unit 2002. In other embodiments, in one or both of the Network and User units, calibration signal generator and transmitter unit 2025, and the calibration signal receiver 2015 may also be placed in the Network unit 1002 with some modifications. The reference frequency receiver unit 716 shown in FIG. 7 in the forward-link path and may be supported by the Signal Conditioning unit 2020 in the digital User unit 2002 with similar structure and function to unit 716.

Control Link unit 2056 may be a radio link between the Network unit 1002 and the User unit 2002, may be a proprietary link that operates in one of the unlicensed band of frequencies, or may be a standard wireless link such as 802.11b, 802.11a or Bluetooth designed to operate in unlicensed band. The control link unit 2056 is connected to micro-controller unit 2054 and may be adapted to communicate with the unit through an appropriate interface. The control link unit 2056 may also connected to antennas 2058 and 2060 for transmission and reception of the control signals. At suitable antenna bandwidth and operating frequency, antenna units 2004 and 2006 can also be used for control link unit operations with minor modifications to unit 2002. Also, with minor modifications to unit 2002 and with suitable selected operating frequencies, baseband functionality of the control link unit 2056 can be included in the Signal Conditioning units 2046 and 2020 with transmit/receive control link unit 2056 signals multiplexed in frequency or time. Transmit/receive signals of the forward and reverse User unit 2002 are transmitted and received by antennas 2004 and 2006.

Micro-controller unit 2054 may be a simple micro-processor such as ARM7 or ARM9 with appropriate memory and interfaces. Micro-controller unit 2054 controls operation of the User unit 2002 and may perform some additional signal conditioning and processing operations such as signal level averaging and estimation and adaptive algorithms. Suitable adaptive algorithms include Least Mean-Square (LMS) and Recursive Least Squares (RLS). Micro-controller unit 2054 sets the operating bandwidth and sets weights $W_0$ and $W_1$ to communicate and control the Network unit 1002 in FIG. 9 via the control link unit 2056, communicate and control the calibration signal generator and transmitter 2025 and calibration signal receiver 2015, operate switching for the receiver antenna diversity, and monitor for correct operation of the User unit 2002. Other micro-controller 2054 operation examples are discussed with reference to FIGS. 7A, 7B, 7C, and 7D. Micro-controller unit 2054 is connected to units 2056, 2052, 2050, 2046, 2040, 2026, 2020, 2015, 2025, 2072 and 2014, as well as the RF switches 2032 and 2008. Micro-controller 2054, using the complex channel impulse response at the output of the calibration signal receiver unit 2015, and using Least Mean-Square (LMS), Recursive Least Squares (RLS), QR-RLS, or QR decomposition computes the optimum values of the complex weights $W_0$ and $W_1$ such that the received complex channel impulse response at the output of the calibration signal receiver unit 2015 is minimized or reduced. With the transmit weights arrangement, radio frequency (RF) isolation for down-link frequencies between the User unit 2002 and the Network unit 1002 is adapted within the propagation channel, enabling the maximum possible overall ERP (Effective Radiated Power) from antennas 2034 and 2036 and generating the maximum coverage footprint.

Units 2056, 2050, 2040, 2026, 2054, 2018, 2044, 2022, 2025, 2015 and 2014 are connected to local oscillator unit 2023 or derive clock and reference frequencies from the local oscillator 2023 signal. A simple user interface unit 2055, which can be a keypad, a simple dipswitch, or similar device, is connected to micro-controller unit 2054. The User unit 2002 has a unique "identity code", which can be set by the user interface unit 2055 and is accessible to the micro-controller unit 2054, and can be communicated to the Network unit 1002 micro-controller unit 1060.

The control-flow description given for FIGS. 7A, 7B, 7C, 7D, 8A, 8B, 8C, and 8D may also be used for the digital implementation of the Network unit 1002 and User unit 2002, and is discussed with respect to FIGS. 9 and 10.

In the reverse-link operation of the Network unit 1002 and the User unit 2002, for example, signals received through antenna units 2034 and 2036 are re-transmitted through the antenna units 1004 and 1006 at a higher signal power. The re-transmitted signals can be received again through the antenna units 2034 and 2036 and may be termed "Up-link Returned-Signals", causing a signal return path that may cause instability in booster operation. In the digital implementation of Network unit 1002 and User unit 2002, magnitude of the returned "Up-link Returned-Signal" may be reduced by various signal-processing techniques.

The selection, design, and effectiveness of a technique depend on system parameters and operating conditions. Most multi-path mitigation algorithms may be applied for return signal reduction. However, due to the extremely small propagation delays between the Network unit 1002 and the User unit 2002 and limited system temporal resolution, conventional algorithms may be, at best, difficult and expensive to implement in practice and, at worst, detrimental. Accordingly, an example of a novel filtering technique is described in the "Novel Channel Filtering" section. A deliberate delay is inserted in re-transmission of the received signal to separate the returned signal ("Up-link Returned-Signal") from the original incident signal at the output terminators of the antenna unit 2034 and 2036. For example, a delay of about μsec ensures time separation of the re-transmitted signal from the original received signal, and enables mitigation of the re-transmitted signal by using a "Channel Filtering" technique. Delay can be introduced in the Signal Conditioning unit 1048 given availability of a digital data buffer of sufficient size. The Channel Filtering operation can be performed by the Signal Conditioning unit 1048 or Signal Conditioning unit 2046, or can be performed by a separate ASIC or FPGA connected to the AD/C unit 1046 and the Signal Conditioning unit 1048. In another embodiment, with minor modifications the "channel filtering" ASIC or FPGA unit can be placed in the User unit 2002, connected to the AD/C unit 2044 and Signal Conditioning unit 2046. The channel-sounding signal can be used for channel estimation, so that amplitude and the phase of the overall channel response including the return path can be estimated during the channel-sounding mode following convergence of the complex-weight unit 1072 weights $W_0$ and $W_1$ for setting the Channel Filter taps. Introduction of Channel Filter in the signal path also has an impact on the operation of the antenna diversity scheme. During performance of the complex channel estimation, antenna switching operations are synchronized so that of possible switched antenna combinations, only two possibilities exist. Antenna switching or selection may be controlled by micro-controller unit 1060 in the Network unit 1002 and micro-controller 2054 in the User unit 2002. Channel estimation can be performed for two propagation paths and two sets of Channel Filter coefficients can be determined for filtering operation. Accordingly, relevant filter coefficients may be selected or switched into operation in synchrony and in harmony with antenna selection. Channel Filtering is not used to totally mitigate the returned signal but rather is used to sufficiently suppress the signal so that some system gain is possible for the signal boosting operation. Introduction of the deliberate delay may also be used in conjunction with other known signal-processing algorithms to reduce coupling between the two Network 1002 and User 2002 units. Similar analysis applies to the forward-link of the Network unit 1002 and the User unit 2002. Accordingly, the "delay" and "Channel Filtering", with aid of the forward-link calibration signal shown in FIG. 10, is performed in the forward-link of the User unit 2002.

Other techniques, such as use of vertical polarization for antenna units 1004, 1006 and horizontal polarization for antennas 2034, 2036 can further improve the system performance. System performance may also be improved by use of directional antennas.

The control-flow description given for FIGS. 7A, 7B, 7C, 7D, 8A, 8B, 8C, and 8D may be modified for inclusion of the "Channel filtering" channel estimation in the digital implementation of the Network unit 1002 and User unit 2002.

The illustrative description is only an example of how the system may be implemented, and is not the only possible method and solution. Several points are noted, as follows:

1. Network unit 1002 may control several User units, such as the User unit 2002. In such configurations, the example control flow shown in FIGS. 7A, 7B, 7C, 7D, 8A, 8B, 8C, and 8D may be implemented such that the Network Unit 1002 can initialize each User unit independently at first, and in combination in a final step. In a scenario with several User units such as 2002, Network unit 1002 may converge weights for the User unit that have minimum Up-link System Path Loss $PL_{ul}$ with the Network unit 1002. Therefore each User unit 2002 in a booster network may have a unique code phase.

2. Another modification that is used for multiple-User unit operation is that the final weights convergence of the units in a booster network with Network and User units is performed with all User units under control of the Network unit that is active in the channel-sounding operation such that combined signal power levels do not exceed the safe limit. If the combined signal from the User Units exceeds the acceptable level for either the reverse or forward system links, appropriate weights are modified in iterative step increments to a level so that maximum system link gains of the forward and the reverse links are met.

3. Although the signal path in both the Network unit 1002 and the User unit 2002 are typically always active in the forward link direction to boost the beacon, for example the Broadcast Control Channel (BCCH) in Global System for Mobile Communications (GSM)) transmissions of the base stations. The reverse-link signal path of the Network unit 1002 and the User unit 2002 need not to be active unless a substantial signal level is detected based on the presence of uplink, "gated" signal. The reverse-link "gated" operation is managed to avoid interference with the channel-sounding signal path and technique involving the units 1058 and 1016. The "gated" operation becomes a continuous operation during the channel-sounding process with channel sounding performed on a regular basis.

4. Modifications in the hardware and the control software may be implemented to merge the Network unit 1002 and the User unit 2002 into a single unit, connected "back-to-back". The design and operation of the back-to-back option is shown and disclosed with reference to FIG. 12.

5. The unique Network unit 1002 identity code and optionally device location may be transmitted to the cellular network. The information can be used to locate a user in an indoor environment by generating heavily-coded, protected, low bit rate data that contains a long known preamble. The unique identity code and optionally longitude and latitude of the Network unit 1002 may also be transmitted. The information can be pulse-shaped for low spectral leakage and superimposed on the reverse-link signal of a given channel by an appropriate modulation scheme within the Network unit 1002. The modulation scheme is selected based on the operating cellular system. For example, GSM has a constant envelope modulation such as Gaussian Minimum Shift Keying (GMSK) so that amplitude modulation with low modulation index can be used. For CDMA systems with fast reverse-link power control, Differential Binary Phase Shift Keying (DBPSK) can be used as a modulation scheme. Extraction of the information from the received channel signal at base station involves base station receiver modifications but does not affect the normal operation of the cellular link.

6. A closed-loop power control capability may also be implemented between the Network unit 1002 and User unit 2002 for the unlicensed band (U-NII) operation both in forward and reverse links. Closed-loop power control can be based on very low-rate, for example 10 Hz, differential or absolute power control commands based on received signal power to increase or reduce U-NII band transmission power. Closed-loop power control limits power transmitted from the antennas 1036, 1038 on the Network unit 1002 side and antennas 2004, 2006 on the User unit 2002 side to a minimum level sufficient for correct operation. Variable gain amplifiers may be used for the transmission of the U-NII band both in the Network unit 1002 and the User unit 2002. The closed-loop power control messages can be exchanged between the Network unit 1002 and the User unit 2002 via the control link units 1062 and 2056 in forward and reverse-links.

7. On the Network unit 1002 side, once the complex-weight unit 1072 weights $W_0$ and $W_1$ are converged, spatial dither may be superimposed on the antenna radiation pattern so that the multipath standing waves patterns are sufficiently disturbed to provide some diversity gain on the Up-link. A second set of weights may also be converted that maintain spatial position of "nulls" while changing the radiation pattern sufficiently to create antenna radiation pattern diversity. Weights can be converged by first performing direction finding, for example using a discrete Fourier transform, on the original weights to identify the "Null" position and forming new weights using algorithms such as Minimum-Variance Linear-Constraint Beam-forming algorithms (MV-LCBF) with the constraint being the position of the spatial "Null". Repeated switching between the two sets of weights performs antenna pattern diversity gain on the up-link. A similar operation is applicable to the User unit 2002 for Down-link path.

8. In the example of the Network unit 1002 and the User unit 2002, only two sets of complex weights $W_0$ and $W_1$ are used in the complex-weight units 1072 and 2072 since two diversity antennas are readily available at both units. However, both in the Network unit 1002 and in the User unit 2002 more than two antennas and hence more than two weights can be used, based on similar analysis with minor modifications.

9. Although the complex-weight units 1072 and 2072 in the Network units 1002 and 2002, respectively, are used for transmitter beam-forming, similar complex weight units may be used at the input terminal of receivers of the forward-link of the Network units 1002 and 2002 in place of RF switches 1008 and 2032 respectively, so that receiver beam-forming can also be performed. The receiver weight convergence can be based on a procedure similar to that of the transmitter with only minor changes.

10. Weights $W_0$ and $W_1$ of the complex-weight units 1072 and 2072 in the Network units 1002 and 2002, respectively, may be converged with the reverse-link of the Network unit 1002 not operational, for example not receiving and transmitting the up-link cellular band signals within the Signal Conditioning unit 1048, and the forward-link of the User unit 2002 not operational, for example not receiving and transmitting the down-link cellular band signals within the Signal Conditioning unit 2020, such that cellular signals are not repeated or transmitted. The operation enables convergence of weights $W_0$ and $W_1$ of the complex-weight units 1072 and 2072 in the Network units 1002 and 2002 first, before the start of normal booster operation.

The enumerated points are applicable to many different digital booster implementations.

Back-to-Back Booster

Figure 11:
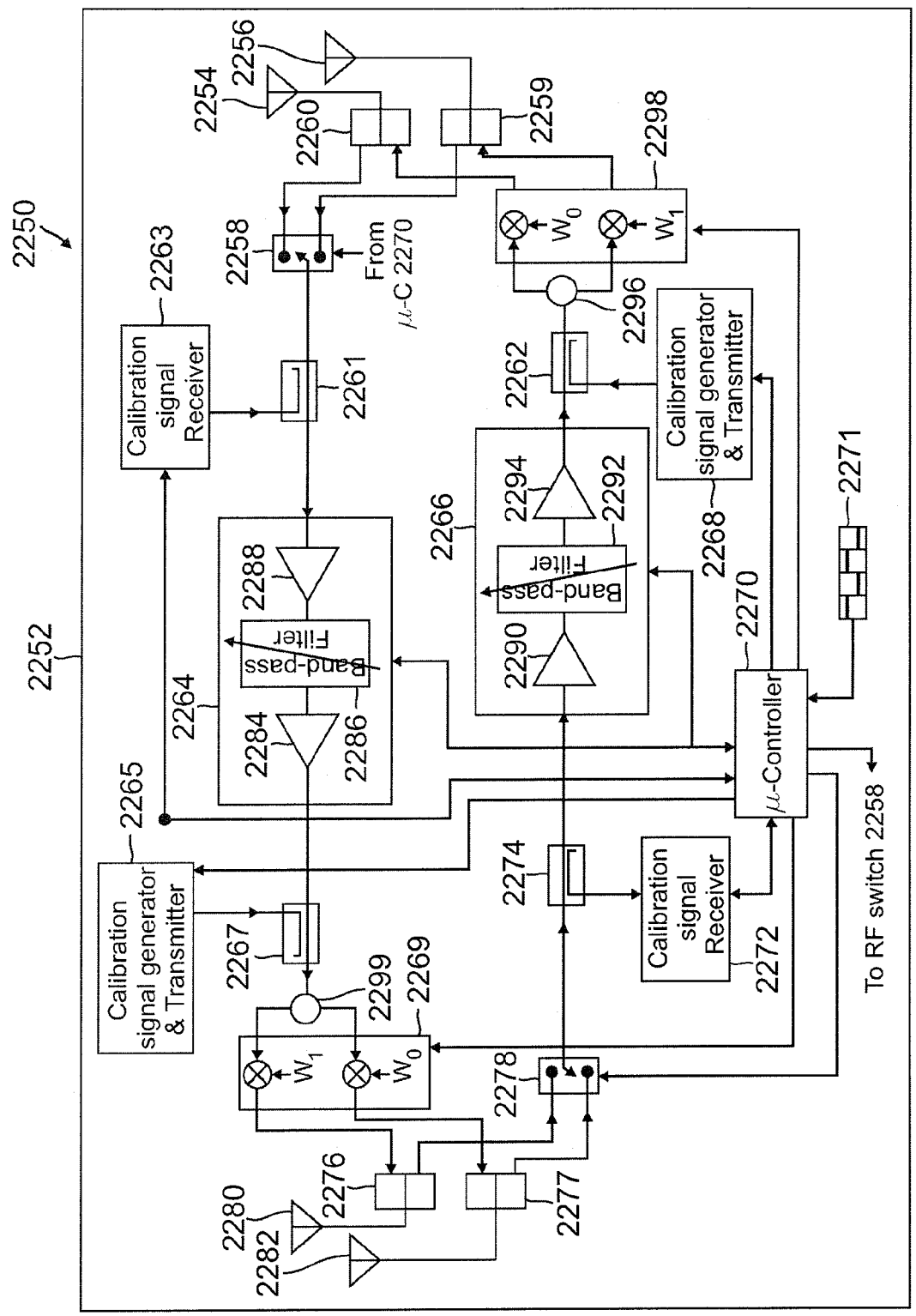
FIG. 11 is a schematic block diagram showing an embodiment of an analog implementation of a back-to-back repeater.

In a Back-to-Back arrangement, transmission and reception in U-NII band and a control link between the Network unit 602 and the User unit 702 may be eliminated. FIG. 11 depicts an analogue implementation example of a suitable back-to-back arrangement. A booster can be positioned in a location with good signal coverage, either indoors or outdoors. The back-to-back unit 2252 includes antennas 2254, 2256, 2282 and 2280, all operating in a cellular spectrum of interest. Antennas 2254 and 2256 are connected to the duplex filters 2260 and 2259 respectively. The RF switch 2258 is also connected to the duplex filters 2260 and 2259 to provide antenna switched diversity operation for receive operation as disclosed with respect to operation of Network unit 602 and User unit 702. In the forward-link, Radio Frequency (RF) switch unit 2258 is connected to the Low Noise Amplifier (LNA) 2288 in the Forward-link unit 2264 via directional coupler 2261. The directional coupler unit 2261 may also be connected to calibration signal receiver unit 2263. Low Noise Amplifier (LNA) 2288 is shown connected to the filter unit 2286. Bandpass filter unit 2286 can be designed to pass all or a desired part of the interested cellular spectrum or can be a bank of overlapping bandpass filters. Overlapping bandpass filters may cover the full spectrum of interest in a cellular system with an RF switch included so that the selected band and bandwidth can be selected either manually or automatically. Filter unit 2286 is connected to the power amplifier 2284. The power amplifier unit 2284 is connected to the directional coupler 2267. The directional coupler 2267 is connected to power splitter unit hybrid combiner 2299 and to the calibration signal generator and transmitter unit 2265. Power splitter unit hybrid combiner 2299 is connected to the complex-weight unit 2269. The complex-weight unit 2269 is connected to the duplex filters 2276 and 2277 and the microcontroller 2270. The duplex filters 2276 and 2277 are connected to antennas 2280 and 2282 and are connected to the RF switch 2278. On the reverse-link, the RF switch unit 2278 is connected to directional coupler unit 2274. The directional coupler unit 2274 is connected to calibration signal receiver 2272 and Low Noise Amplifier (LNA) 2290 in the Reverse-link unit 2266. Calibration signal receiver unit 2272 is adapted to establish the received signal strength and phase in a complex channel impulse response that exists between the combined outputs of antennas 2254, 2256 and the input terminal to the calibration signal receiver 2272. Received signal strength and phase are established either by a correlation operation, which is similar to operation of a RAKE receiver path searcher, or by a matrix inversion operation on an appropriate block of sampled received signal. The calibration signal receiver unit 2272 may have many sub-units, including a frequency converter adapted to return the calibration signal to base-band frequencies, A/D converters, and base-band processors to perform base-band algorithms. Low Noise Amplifier (LNA) 2290 is connected to filter unit 2292, which may in turn be connected to power amplifier unit 2294. Bandpass filter 2292 can be designed to pass all or a desired part of the interested cellular spectrum, or can be a bank of overlapping bandpass filters, which cover the full spectrum of the cellular system of interest. An RF switch may be included to manually or automatically select band and bandwidth. Power amplifier 2294 is connected to directional coupler unit 2262. Directional coupler unit 2262 is connected to the calibration signal generator and transmitter unit 2268 and power splitter unit, hybrid combiner 2296. Power splitter unit, hybrid combiner 2296 is connected to the complex-weight unit 2298. The complex-weight unit 2298 is connected to the duplex filters 2260 and 2259 and the micro-controller 2270. The duplex filters 2260 and 2259 are connected to antennas 2254 and 2256 and connected to the RF switch 2258. The micro-controller 2270 is connected to calibration signal generator and transmitter units 2268 and 2265, the calibration signal receiver units 2272 and 2263, the Reverse-link unit 2266 and Forward-link unit 2264. A simple user interface unit 2271, for example a keypad, simple dipswitch, or other switching unit, is connected to micro-controller unit 2270.

Although many functional units of the Network unit 602 and the User unit 702 are eliminated in the back-to-back unit 2252, operation and other units of the booster remain fundamentally the same as the components described for the Network unit 602 and User unit 702. Operation and description of the calibration signal generator and transmitter units 2268 and 2265, and the calibration signal receiver units 2272 and 2263 in the reverse-link and forward-link are fundamentally similar to units with similar functionality described for the Network unit 602 and User unit 702. Antenna units 2254, 2256, 2282 and 2280 are placed in mutual close proximity, extra antenna isolation can be provided by highly directional antennas and an associated increase in front-to-back radiation ratios.

A unique unit 2252 identity code and optional device location may also be transmitted to the cellular network to supply information useful in locating a user in an indoor environment. The information can be transmitted as heavily coded, protected, low bit-rate data, which contains a preamble, a unique identity code, and may optionally contain the longitude and the latitude of the unit 2252. The information can be pulse-shaped for low spectral leakage and superimposed on the reverse-link signal of a selected channel by an appropriate modulation scheme. The data handling may be performed within the unit 2252. The choice of the modulation scheme depends on the operating cellular system. For example, Global System for Mobile Communications (GSM) uses a constant envelope modulation such as Gaussian Minimum Shift Keying (GMSK) so that amplitude modulation with a low modulation index can be used. Code Division Multiple Access (CDMA) systems have fast reverse-link power control so that Differential Binary Phase Shift Keying (DBPSK) can be used as the modulation scheme. Extraction of information from the received channel signal at base station may use base station receiver modifications, although the cellular link maintains normal operation.

Figure 12:
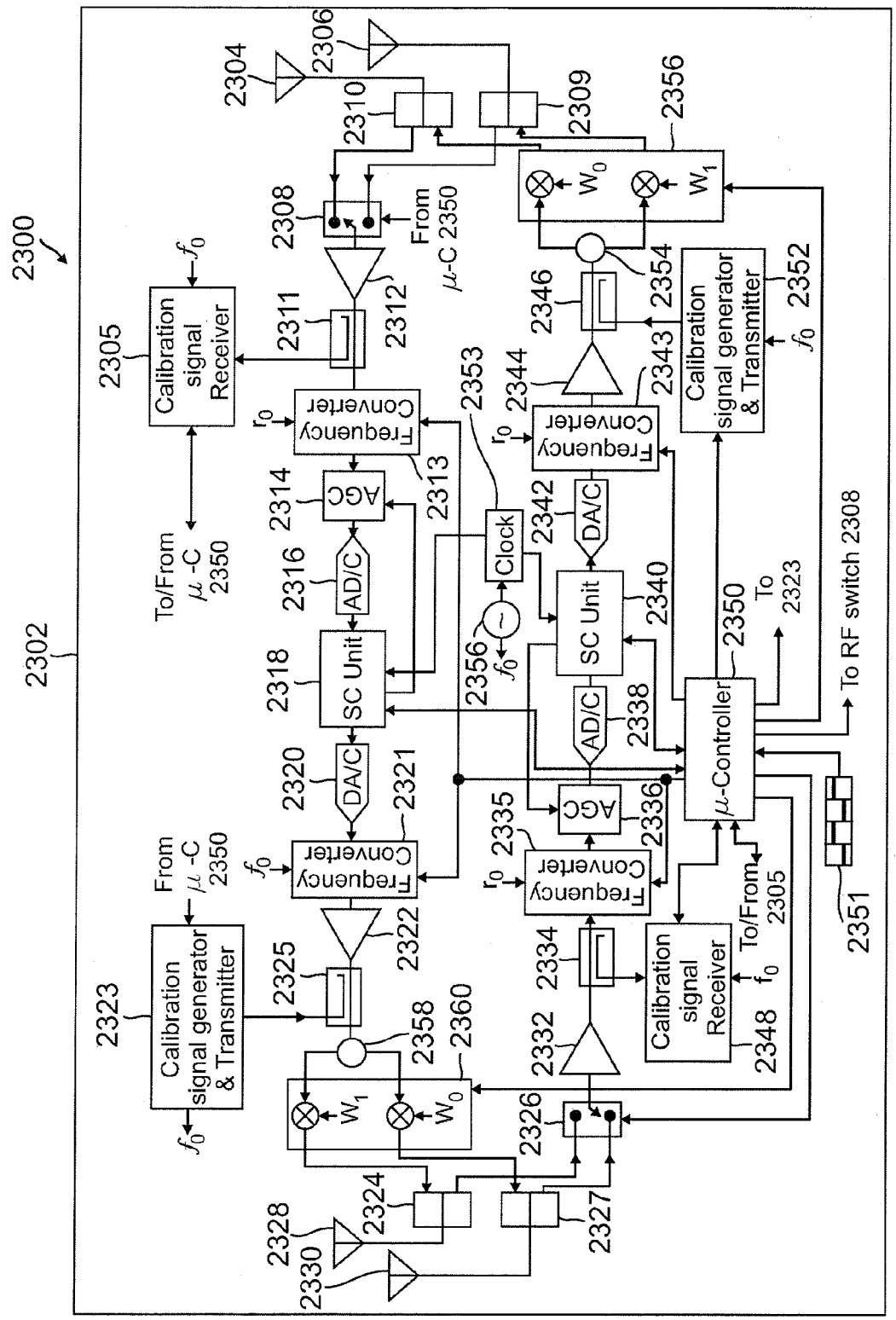
FIG. 12 is a schematic block diagram showing an embodiment of a digital implementation of a back-to-back repeater.

FIG. 12 depicts a digital implementation example of a back-to-back arrangement with a booster is placed in a location with good signal coverage, either indoors or outdoors. The back-to-back unit 2302 includes antennas 2304, 2306, 2328 and 2330, which operate in the cellular spectrum of interest. Antennas 2304 and 2306 are connected to the duplex filters 2310 and 2309 respectively. RF switch 2308 is also connected to the duplex filters 2310 and 2309 to perform an antenna switched diversity operation for receive operation as discussed for Network unit 1002 and User unit 2002. In the forward-link, the RF switch unit 2308 is connected to the Low Noise Amplifier (LNA) 2312. The directional coupler unit 2311 is connected to output of the LNA 2312 and the calibration receiver unit 2305. The calibration receiver 2305 is also connected to micro-controller 2350. The directional coupler unit 2311 is also connected to the frequency converter unit 2313. Frequency converter 2313 is connected to Automatic Gain Control (AGC) unit 2314. The frequency converter 2313 converts the frequency band of the incoming signal from the cellular band to baseband or "near baseband" frequency band. The frequency converter unit 2313 includes filtering for correct operation of the receiver chain. The operating frequency of the frequency converter unit 2313 is set by micro-controller unit 2350. The AGC unit 2314 is connected to Analogue-to-Digital Converter (AD/C) unit 2316. The AGC 2314 is optional and sets received signal level substantially close to the middle of the dynamic range of the AD/C 2316. If included, AGC 2314 is configured so that in the presence of low signal power noise within the operating bandwidth does not dominate operation. The gain contribution of the AGC unit 2314 is compensated in the final Down-link System Link Gain $G_{dl}$ calculations. Otherwise, the gain value of the AGC 2314 may be compensated in the Signal Conditioning unit 2318. If AGC unit 2314 is used in the booster unit 2300 and the booster unit is designed for Code Division Multiple Access (CDMA) cellular networks, AGC unit bandwidth is selected to be much smaller than the power control repetition rate of the CDMA system, for example less than 1.5 kHz in WCDMA networks so that the AGC operation does not interfere with the closed-loop power control. If AGC unit 2314 is not included, the AD/C unit 2316 may supply a suitable dynamic range which can be as high as 192 dB (32-bits). The AD/C unit 2316 is connected to Signal Conditioning unit 2318. The Signal Conditioning unit 2318 performs such tasks as channel select filtering for the selected operating frequency band, frequency conversion, signal level estimation, AGC algorithm, and other signal conditioning and processing features. For example, channel select filters implemented as poly-phased filters can be set for a given operating bandwidth of 1.3, 5, 10 or 15 MHz operating at any position within the forward-link cellular or Personal Communication Services (PCS) or other selected frequency spectrum. Depending on the system parameters such as operational bandwidth and supported operation load such as filtering, the Signal Conditioning unit 2318 may be implemented by a variety of technologies such as Field Programmable Gate Arrays (FPGAs), Application-Specific Integrated Circuits (ASICs) and general purpose Digital Signal Processors (DSPs) such as Texas Instruments TMS320C6416-7E3 processor. The Signal Conditioning unit 2318 includes appropriate interfaces and memory and is connected to Digital-to-Analogue Converter (DA/C) unit 2320. The DA/C unit 2320 includes post filtering that is appropriate after digital to analogue conversion. The DA/C unit 2320 is connected to frequency converter unit 2321. Frequency converter unit 2321 up-converts frequencies of the input signal to the original band of cellular frequencies. The frequency converter unit 2321 includes appropriate filtering for correct operation of the transmitter chain. The operating frequency of the frequency converter unit 2321 is set by micro-controller unit 2350. The frequency converter unit 2321 is connected to the power amplifier unit 2322, which is connected to the directional coupler unit 2325. The directional coupler unit 2325 is connected to the calibration signal generator and transmitter unit 2323 and the power splitter unit, hybrid combiner 2358. Power splitter unit, hybrid combiner 2358 is connected to the complex-weight unit 2360. The complex-weight unit 2360 is connected to the duplex filters 2324 and 2327 and the micro-controller 2350. The duplex filters 2324 and 2327 are connected to antennas 2328 and 2330 and connected to the RF switch 2326. The calibration signal generator and transmitter unit 2323 is also connected to the micro-controller 2350. On the reverse-link, the RF switch unit 2326 is connected to micro-controller 2350 and also connected to LNA unit 2332. The LNA unit 2332 is connected to the directional coupler unit 2334. The directional coupler unit 2334 is connected to the frequency converter unit 2335. Frequency converter 2335 is connected to Automatic Gain Control (AGC) unit 2336. The frequency converter 2335 converts the frequency band of the incoming signal from the cellular band to baseband or "near baseband" frequency band. The frequency converter unit 2335 includes filtering for correct operation of the receiver chain. The operating frequency of the frequency converter unit 2335 is set by micro-controller unit 2350. The directional coupler unit 2334 is also connected to calibration signal receiver unit 2348. The frequency converter unit 2335 is connected to AGC unit 2336. The AGC unit 2336 is connected to Analogue-to-Digital Converter (AD/C) unit 2338. The AGC 2336 is optional and sets received signal level substantially close to the middle of the dynamic range of the AD/C 2338. If included, AGC 2336 is configured so that in the presence of low signal power, noise within the operating bandwidth does not dominate the operation of the AGC unit 2336. AGC unit 2336 is also designed with gain contribution that is compensated in the final Up-link System Link Gain $G_{ul}$ calculations. Otherwise, the gain value of the AGC unit 2336 may be compensated in the Signal Conditioning unit 2340. If AGC unit 2336 is used in booster unit 2300 and the unit is designed for Code Division Multiple Access (CDMA) cellular networks, AGC unit bandwidth is selected to be much smaller than the power control repetition rate of the CDMA system, for example less than 1.5 kHz in WCDMA networks, so that AGC operation does not interfere with the closed-loop power control.

If the AGC unit 2336 is not included, the AD/C unit 2338 supplies a suitable dynamic range which can be as high as 192 dB (32-bits). The AD/C unit 2338 is connected to Signal Conditioning unit 2340. The Signal Conditioning unit 2340 performs such tasks as channel select filtering for the selected operating frequency band, frequency conversion, signal level estimation, AGC algorithm, and other signal conditioning and processing features. For example, the channel select filters that can be implemented as poly-phased filters can be set for a given operating bandwidth of 1.3, 5, 10 or 15 MHz, operating at any position within the forward-link cellular or Personal Communication Services (PCS) or other selected frequency spectrum. Depending on system parameters such as operational bandwidth and supported operation load such as filtering, the Signal Conditioning unit 2340 may be implemented by a variety of technologies such as Field-Programmable Gate Arrays (FPGAs), Application-Specific Integrated Circuits (ASICs), and general purpose Digital Signal Processors (DSPs) such as Texas Instruments TMS320C6416-7E3 processor. The Signal Conditioning unit 2340 includes appropriate interfaces and memory. The Signal Conditioning unit 2340 is connected to Digital-to-Analogue Converter (DA/C) unit 2342. The DA/C unit 2342 includes post filtering that is appropriate after digital to analogue conversion. The DA/C unit 2342 is connected to the Frequency converter unit 2343, which up-converts the frequencies of the input signal to the selected portion of cellular or Personal Communication Services (PCS) band of frequencies. The frequency converter unit 2343 includes filtering for correct operation of the transmitter chain. The operating frequency of the frequency converter unit 2343 is set by micro-controller unit 2350. The frequency converter unit 2343 is connected to the power amplifier unit 2344, which is connected to the directional coupler unit 2346. Directional coupler unit 2346 is connected to the calibration signal generator and transmitter unit 2352 and power splitter unit, hybrid combiner 2354. Power splitter unit, hybrid combiner 2354 is connected to the complex-weight unit 2356. The complex-weight unit 2356 is connected to the duplex filters 2309 and 2310 and the micro-controller 2350. The duplex filters 2310 and 2309 are connected to antennas 2304 and 2306 and connected to the RF switch 2308. The micro-controller 2350 is connected to calibration signal generator and transmitter units 2352, 2323 and to calibration signal receiver units 2348 and 2305. A simple user interface unit 2351, which can be a keypad, simple dipswitch or other device, is connected to micro-controller unit 2350. Units 2305, 2323, 2313, 2321, 2348, 2335, 2343, 2352 and 2350 are either connected to local oscillator unit 2356 or derive clock or reference frequencies via clock unit 2353 from the local oscillator 2356. The Signal Conditioning units 2318 and 2340 clock frequencies are supplied by clock unit 2353.

Although many functional units of the Network 1002 and the User 2002 units are not used in the back-to-back unit 2302, operation and the function of many of the units in the booster 2302 remain fundamentally the same as those described for the Network unit 1002 and User unit 2002. In the digital implementation of booster unit 2302, functional blocks for calibration signal generator and transmitter unit 2352 and the calibration receiver unit 2348 can be included in the Signal Conditioning unit 2340 for the uplink, and in the Signal Conditioning unit 2318 for the downlink operation. The operation and description of the calibration signal generator and transmitter units 2352 and 2323, and the calibration signal receiver units 2348 and 2305, in the reverse-link and forward-link are fundamentally similar to those described for the Network unit 1002 and User unit 2002. Since the antenna units 2304, 2306, 2328 and 2330 are placed in close proximity, antenna isolation can be provided by highly directional antennas with increased front-to-back radiation ratios.

For reverse-link operation of the booster 2302, signals received through antenna units 2328 and 2330 may be re-transmitted through the antenna units 2304 and 2306 at a higher signal power. The re-transmitted signals can be received again through the antenna units 2330 and 2328 and are termed an "Up-link Returned-Signal". The signal return path may cause instability in booster operation. In the digital implementation of the booster unit 2302, magnitude of the returned signal, the Up-link Returned-Signal, may be reduced through various signal-processing techniques. The selection, configuration, and effectiveness of signal-processing techniques depend on system parameters and operating conditions. Most known multiple-path mitigation algorithms can also be applied for return signal reduction. However, due to the extremely small propagation delays between the antenna units 2304, 2306 and the antenna units 2328, 2330, and the limited temporal resolution of the system, conventional multiple-path mitigation algorithms may at best be difficult and expensive to practically implement, and often are detrimental to system operation.

An example of a novel filtering technique that avoids system difficulty is disclosed herein in the "Novel Channel Filtering" section. The novel filtering imposes a "deliberate" delay in the re-transmission of the received signal to separate the returned signal, called an Up-link Returned-Signal, from the original incident signal at the output terminators of antenna units 2328 and 2330. A delay of about 1 µsec ensures time separation of the retransmitted signal from the original received signal and enables mitigation of the re-transmitted signal. The delay can be introduced in the Signal Conditioning unit 2340 so long as a sufficient size digital data buffer is available. The Channel Filtering operation can also be performed by the Signal Conditioning unit 2340 or can be performed by a separate ASIC or FPGA connected to the AD/C unit 2338 and the Signal Conditioning unit 2340. The calibration signal can be used for channel estimation after convergence of the complex-weight unit 2356 weights $W_0$ and $W_1$ so that amplitude and the phase of the overall channel response including the return path can be estimated to enable setting of the Channel Filter taps. Inclusion of the Channel Filter in the signal path also affects operation of antenna diversity. As the channel estimation is performed, antenna switching operations are synchronized to eliminate two of four possible propagation paths. Antenna switching selection is controlled by micro-controller unit 2350 so that channel estimation can be performed for two propagation paths and two sets of Channel Filter coefficients can be determined for filtering operation. Therefore, relevant filter coefficients can be selected and switched in synchrony and in harmony with antenna selection operation. The Channel Filtering technique does not completely mitigate the returned signal but is rather used to sufficiently suppress the return signal so that some system gain is possible for the signal boosting operation. The "deliberate delay" may also be used in conjunction with any other known signal-processing algorithm to reduce coupling between the two antenna sets 2304, 2306 and 2330, 2328. The forward-link of the booster unit 2302 may be modified in a similar manner to include the delay and channel filtering.

Other techniques, such as the use of vertical polarization for antenna units 2304, 2306 and horizontal polarization for antennas 2328, 2330 can further improve the system performance. Similarly, system performance may be improved by use of directional antennas as in conventional booster and repeater systems.

The unique unit 2302 identity code and optionally device location may be transmitted to the cellular network and used to locate a user in an indoor environment by generating heavily coded, protected, low bit-rate data, which contains a long known preamble, the unique identity code, and optionally the longitude and the latitude of the unit 2302. The information can be pulse-shaped for low spectral leakage and superimposed on the reverse-link signal of a selected channel by an appropriate modulation scheme within the unit 2302. The choice of the modulation scheme is based on the operating cellular system. For example, for Global System for Mobile Communications (GSM), which uses constant envelope modulation such as Gaussian Minimum Shift Keying (GMSK), amplitude modulation with low modulation index can be used. For CDMA systems with fast reverse-link power control, Differential Binary Phase Shift Keying (DBPSK) can be used as the modulation scheme. Information extraction from the received channel signal at base station may be performed through base station receiver modifications which do not affect normal operation of the cellular link.

An example of system operational flow diagrams for the booster unit shown in FIGS. 11 or 12 is shown in FIGS. 17A, 17B. The example does not include all the possible functionalities for complete operation of booster unit 2302 or 2252. The example may be considered to show a minimal control flow for most basic operations of the booster unit 2302 or 2252. On "power-up", "reset", or a "Stop" instruction, booster unit 2302 or 2252 sets complex-weight units 2360 and 2356 weights $W_0$ and $W_1$ to an "Initial" value by default. The "Initial" weights values enable minimum power radiation from the two connected antennas with no phase differential between the two radiated fields, for example broadside radiation. On "power-up" or "reset" instruction of the booster unit 2302 or 2252, the micro-controller unit 2350 starts 2402 the control-flow in FIG. 17A. Micro-controller 2350 instructs the reverse-link calibration receiver 2348 to scan 2404 for all possible code offsets. If a substantial signal power is transmitted by other units operating within the same geographical area is detected 2406 by the receiver unit 2348, the received signal powers are stored 2408. If no substantial signal is detected 2410, the micro-controller 2350 instructs the forward-link calibration receiver 2305 to scan 2410 for all possible code offsets. If a substantial signal power is transmitted by other units operating within the same geographical area and detected 2416 by the receiver unit 2305, the received signal powers are stored 2414. After the test for all possible code offsets is finished for the forward and reverse links of the system and if other units signal power is detected 2417, the received signals for each offset are tested and the largest signal power is selected 2412. If the selected signal power is above a safe threshold 2418, the unit 2302 displays 2419 an error message and stops operation 2422. If the selected signal power is below the safe threshold, the unit proceeds to action 2420. If no substantial signal is detected or the detected signals are below the safe threshold 2416, the micro-controller 2350 selects 2420 an unused code offset for both forward and reverse channel-sounding transmissions. Micro-controller 2350 sets 2424 the booster unit 2302 or 2252 in "channel-sounding" mode. In "channel-sounding" mode, diversity switches 2308 and 2326 are maintained in the current position and not switched. Micro-controller 2350 sets 2426 the complex-weight units 2356 and 2360 weights $W_0$ and $W_1$ to the "Initial" value. Micro-controller 2350 instructs calibration signal generator and transmitter units 2352 and 2323 to commence transmission 2428 with the specified "own code" phase continuously. The micro-controller 2350 also instructs the up-link calibration signal receiver unit 2348 to attempt to receive 2430 the channel-sounding signal for the code offset used by the transmitter unit 2352. If no substantial channel-sounding signal is detected with the specified set of weights of the complex-weight unit 2356 and Up-link System Link Gain $G_{ul}$ is less than the specified maximum allowed system gain 2434, micro-controller 2350 modifies and issues 2436 new up-link weight values to complex-weight unit 2356 such that transmit power of the channel-sounding signal from antenna units 2304 and 2306 is increased by a predetermined step size dG while maintaining relative phases of weights $W_0$ and $W_1$. Actions 2430, 2432, 2434 and 2436 are repeated until a substantial channel-sounding signal is detected for uplink path or the maximum allowed up-link system gain is reached. If maximum allowed up-link system gain is reached, the most recent weights are maintained unchanged 2438 as the most optimum weights for normal operation. If maximum allowed system gain is not reached and no substantial channel-sounding signal exists at the output of the calibration signal receiver 2348, an adaptive convergence algorithm such as Least-Means Squared (LMS) is used to further modify weights $W_0$ and $W_1$ such that the channel-sounding signal power is minimized 2442. The new weights are issued to the complex-weight unit 2356 for transmission of the channel-sounding signal 2444. If the up-link weights are sufficiently converged, control-flow proceeds, otherwise actions 2430 to 2446 are repeated. After the successful convergence of the up-link weights $W_0$ and $W_1$, micro-controller 2350 converges the down-link weights in actions 2448 to 2460 in much the same way as the up-link weights. After successful convergence of both up-link and down-link weights, micro-controller 2350 exits 2462 the channel-sounding mode. Micro-controller 2350 instructs the calibration signal receivers 2348 and 2305 to continue 2464 to receive the channel-sounding signal transmitted by the calibration signal transmitter units 2352 and 2323. If the safe average channel-sounding signal power level is exceeded for a substantial amount of time 2468 for the up-link or down-link path, the micro-controller 2350 sets 2470 both up-link and down-link weights to "Initial" value and returns 2474 to action 2402. If the average channel-sounding signal power level is within the expected range, the calibration signal receiver units 2348 and 2305 are instructed to receive and detect 2469 channel-sounding signals with all other possible code offsets. If no channel-sounding signal with substantial average signal power level is detected in the up-link or down-link, the micro-controller 2350 returns 2472 to action 2464. The channel-sounding operation can be initiated on regular bases to ensure correct operation before detection of excess signal in either the up-link or down-link of the booster 2302, 2252 paths.

Channel Filtering Example

Figure 17:
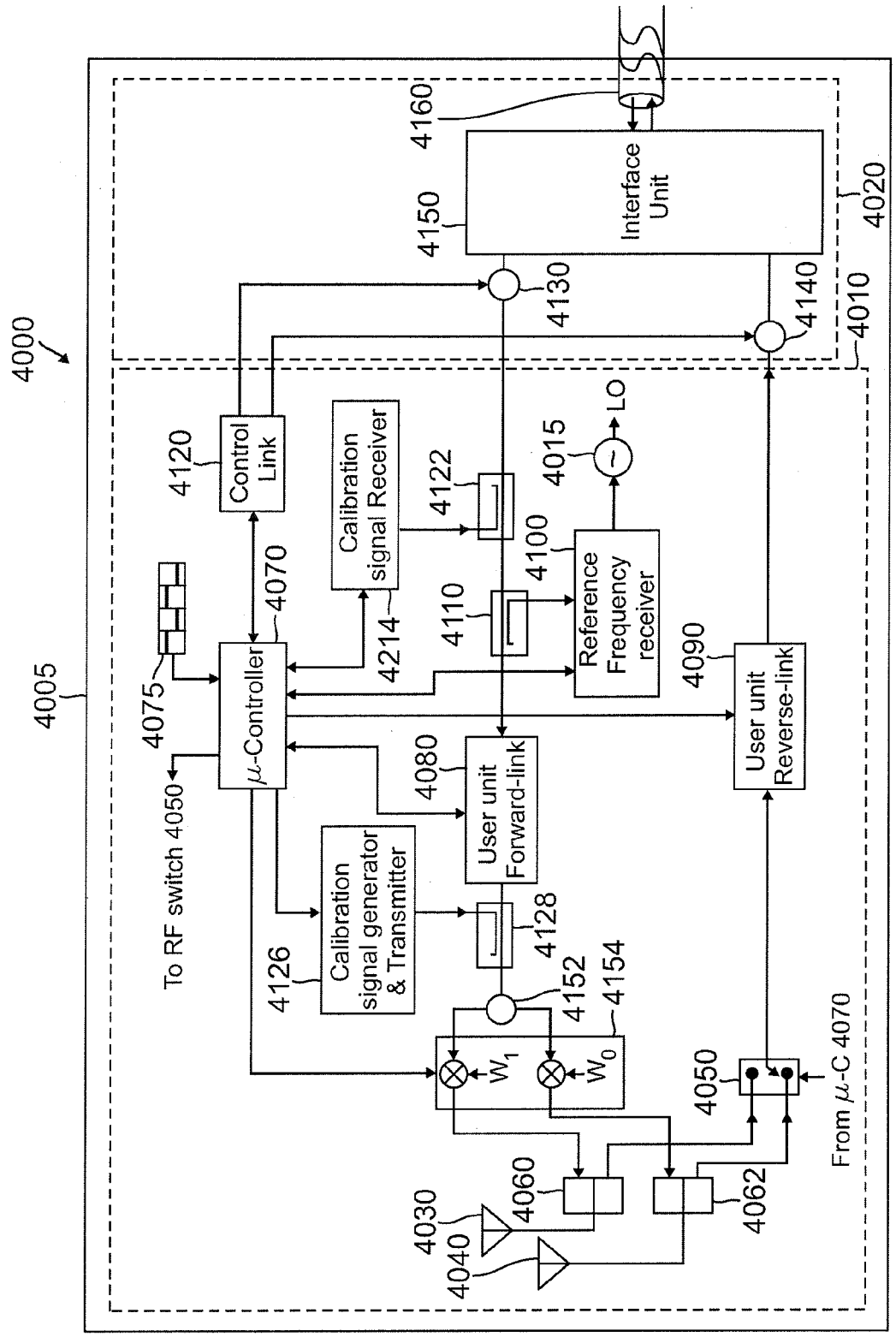

The example can be applied to the booster system to counter the effect of the feed-back loop and the Up-link Returned-Signal that may exist in the reverse-link of the system and Down-link Returned-Signal that may exist in the forward-link of the system. "Channel Filtering" for the forward and the reverse links is autonomous and can either be applied to both or one of the forward or the reverse links of the system, and can be implemented in the Network unit 1002, the User unit 2002, or both. A simplified block diagram of the booster with channel filtering capability in isolation is shown in FIG. 17. Reverse-link operation alone is discussed for the Network unit 1002 and User unit 2002. Channel Filtering is applicable to all digital implementations. In the representation, no antenna diversity is assumed for either the Network unit 2452, which is substantially similar to 1002 in FIG. 9, or the User unit 2454, which is substantially similar to 2002 in FIG. 10. The processing and propagation delays within the booster system can be categorized as the following:

$\tau_{Us}$=the User unit 2454 processing delay (relatively negligible).

$\tau_{P1}$=the unlicensed band propagation delay.

$\tau_{Nrx}$=the Network unit 2452 receiver processing delay (relatively negligible).

$\tau_{Ntx}$=the Network unit 2452 transmitter processing delay (relatively negligible).

$\tau_d$=the "deliberate" delay introduced in the transmission path of the Network unit 2452.

$\tau_{P2}$=the licensed band propagation delay of the Up-link Returned-Signal.

The overall impulse response 2464 of the booster unit 2451 is shown. The original incident pulse enters from antenna 2462 (A1) and arrives at the input terminal of the Network unit 2452 receiver after a delay of $\tau_f$, with the pulse 2468 shown where:

$$\tau_f = \tau_{Us} + \tau_{P1} = \tau_{P1}$$

The pulse is amplified and transmitted 2470 after the "deliberate" time delay $\tau_d$, from antenna 2456 (marked A4 in FIG. 17). The transmitted signal re-enters the antenna 2462 (A1) after the propagation delay $\tau_{P2}$ and arrives at the input to the Network unit 2452 receiver after a delay 2472 of $\tau_f$. The overall delay for the Up-link Returned-Signal at the input to the Network unit 2452 receiver is $\tau_t$ and is substantially equal to:

$$\tau_t = \tau_{Nrx} + \tau_d + \tau_{Ntx} + \tau_{P2} + \tau_f = \tau_d + \tau_{P1} + \tau_{P2}$$

The returned pulse 2472 is delayed by the propagation path delays $\tau_{P1}$ and $\tau_{P2}$, which can be very small in the booster's operating environment. The "deliberate" delay is introduced to sufficiently separate the Up-link Returned-Signal from the original incident pulse, such that filter coefficients can be estimated easily and filtering can be performed more effectively. Introduction of another "deliberate" delay in the transmit path of the User unit 2454 ensures separation of the boosted transmitted pulse and the Up-link Returned-Signal, a condition that may be desirable to reduce the effect of the multipath experienced by the boosted transmitted pulse on the operation of the Channel filtering.

Figure 13A:
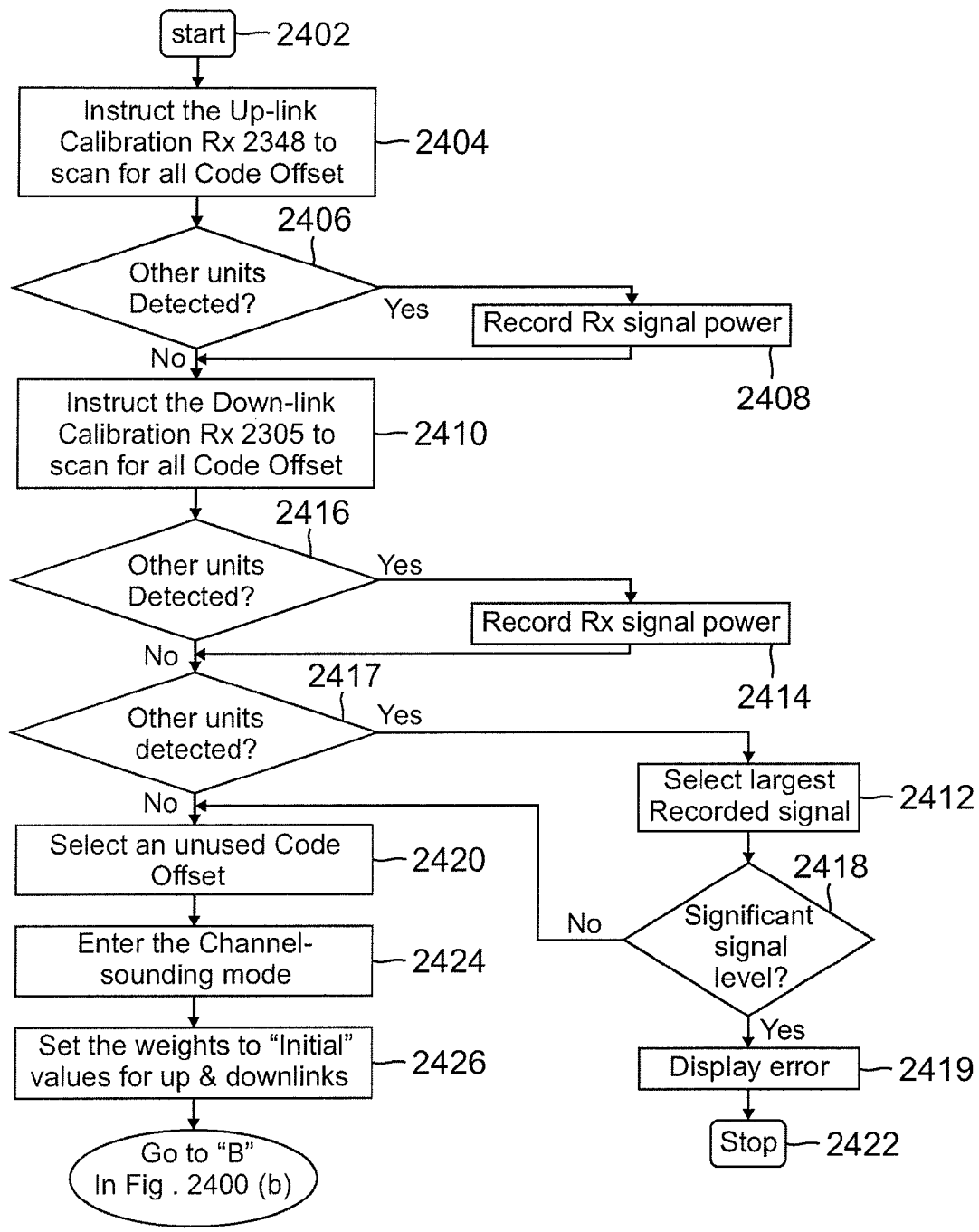
FIGS. 13A, 13B, and 13C are flow charts showing an embodiment of operation flow of a back-to-back repeater.
Figure 13B:
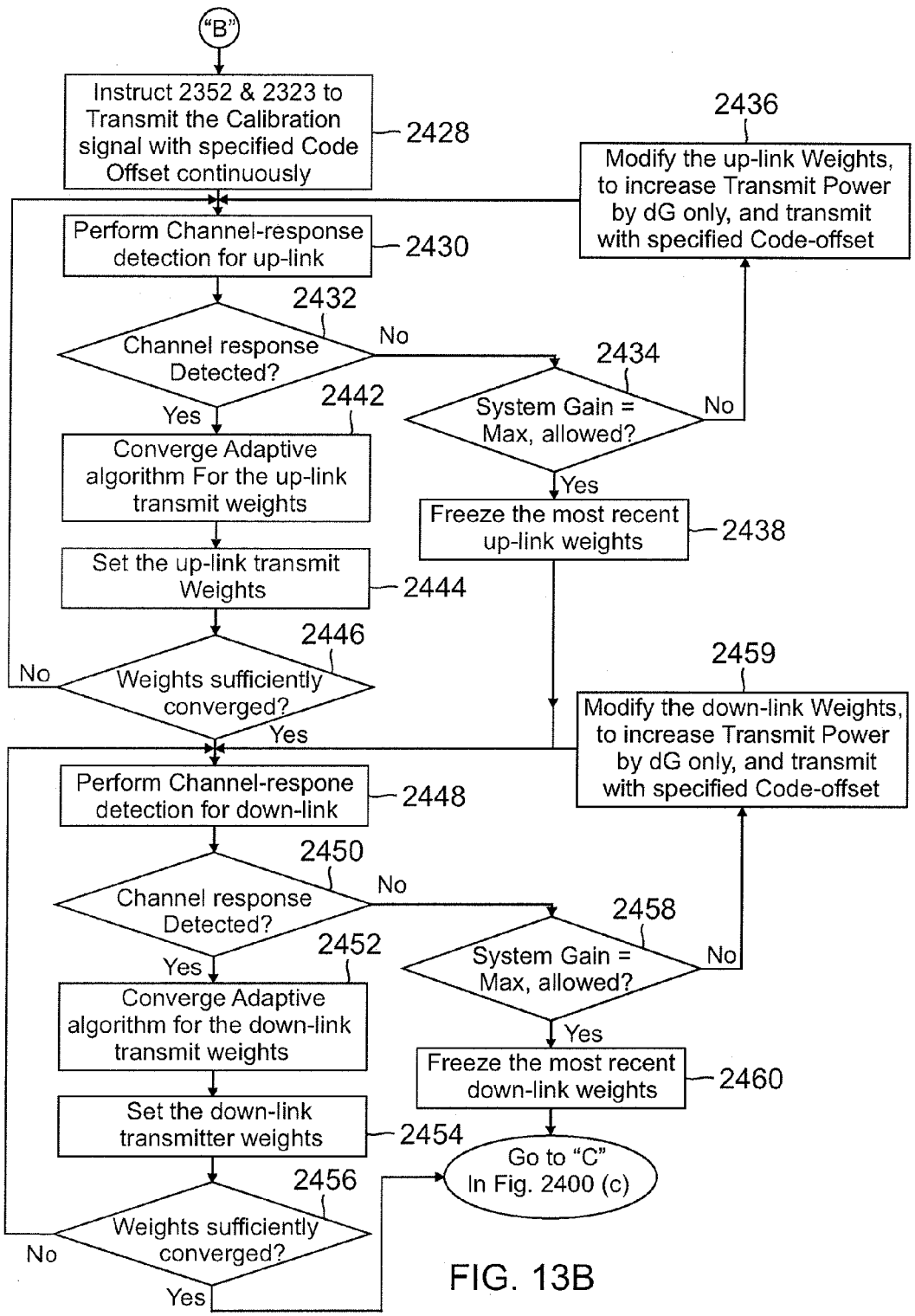
Figure 13C:
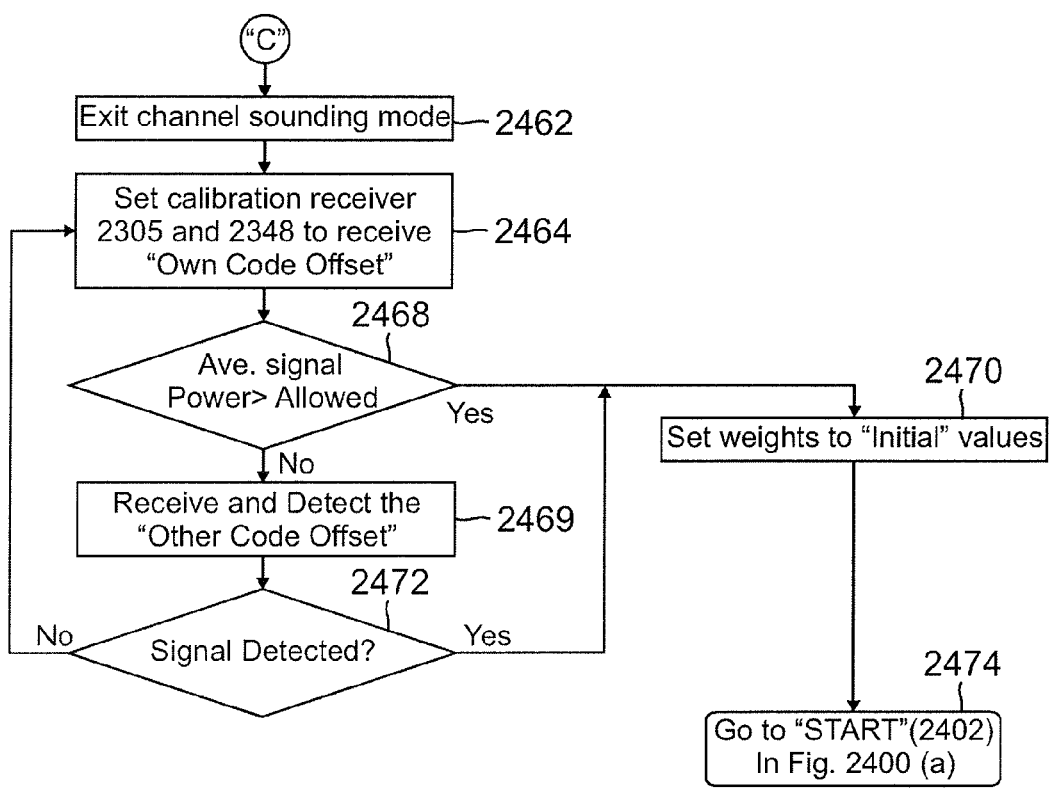
Figure 14A:
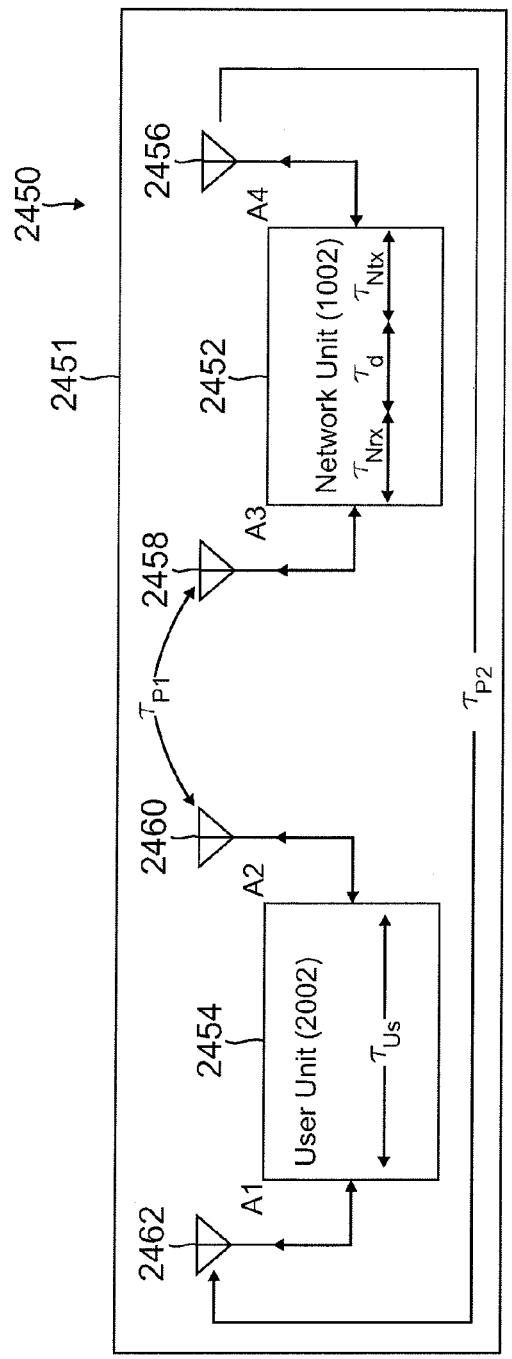
FIGS. 14A and 14B are a simplified block diagram and a spectral graph which illustrate a channel filtering operation.
Figure 14B:
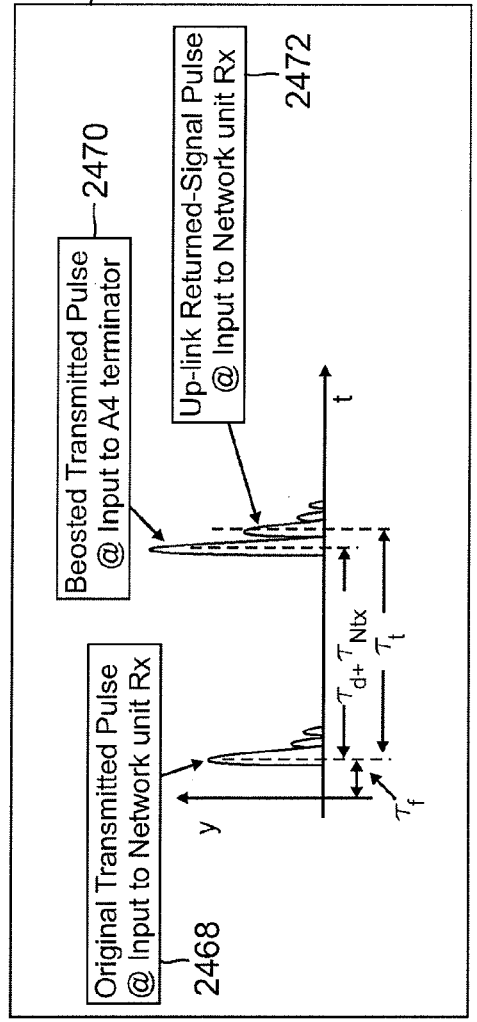
Figure 18:
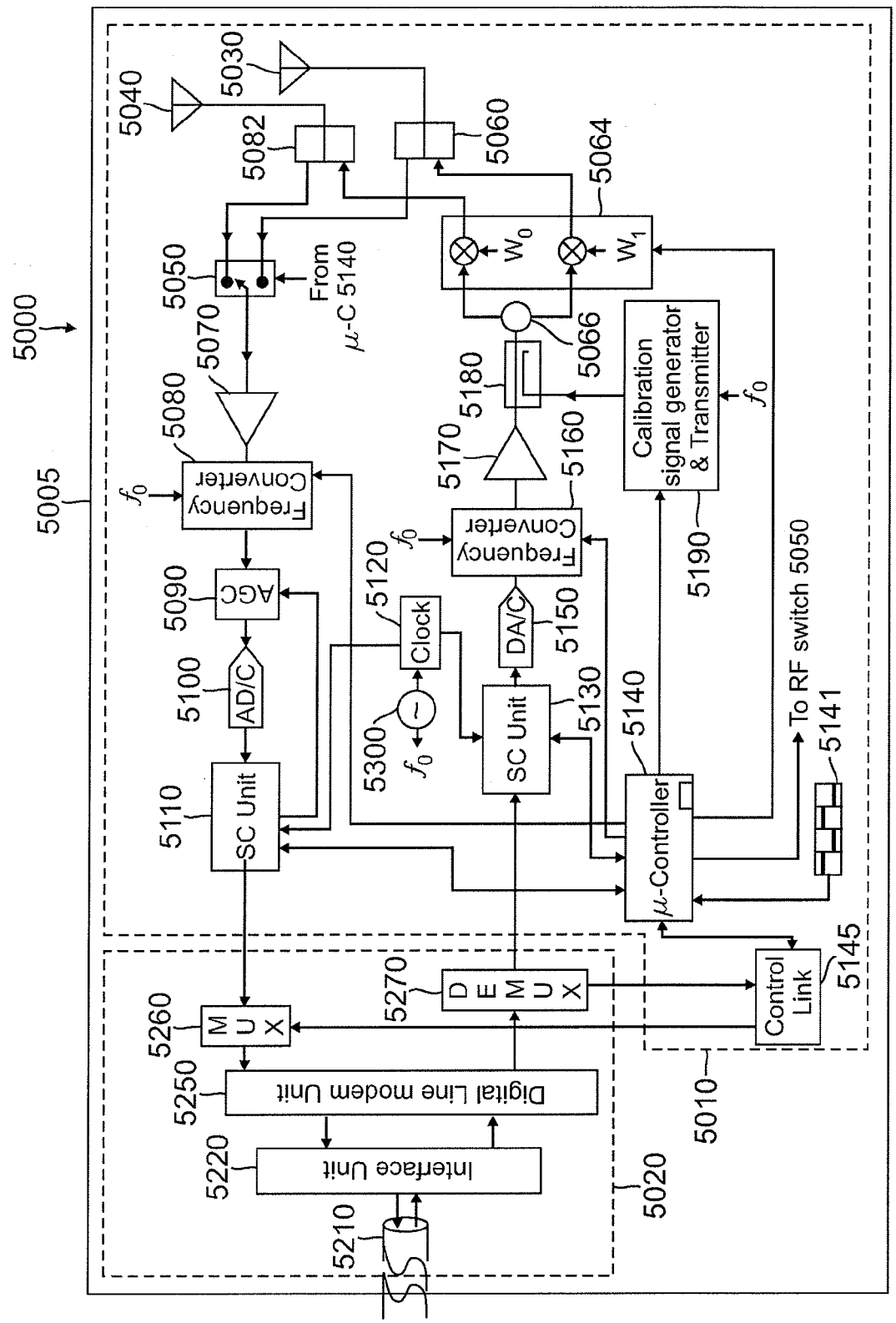

In the example, "Channel Filtering" unit 2512 shown in FIG. 18 is placed only on the reverse-link of the Network unit 1002. The channel filtering process involves estimating the complex propagation channel impulse response including amplitude and phase for all time delays up to the maximum expected multipath delay. The complex channel impulse response $C(t,\tau)$ can be provided by the calibration signal receiver unit 1016 shown in FIG. 9 because the information is readily available at the output of the unit for the reverse-link path of the system. Based on the described design of the calibration signal technique shown in FIGS. 13A, 13B, and 13C, the channel impulse response provided by the calibration signal receiver unit 1016 does not include the delay contributions of the "deliberate" delay ($\tau_d$) and the $\tau_{Nrx} + \tau_{Ntx}$ components. While $\tau_{Nrx} + \tau_{Ntx}$ is sufficiently small to ignore, the "deliberate" delay ($\tau_d$) is added in the overall impulse response in the Network unit 1002 for the estimation of the Channel Filter coefficients. Similarly, if Channel Filtering operation is also used for the forward-link, a separate complex channel impulse response is used for the link. As a result, a similar calibration technique to the reverse-link is performed on the forward-link. An example of the estimated power of the channel impulse response $C(t,\tau)$ 2510 at the output of the calibration signal receiver 1016 is shown in FIGS. 15A. 15B, and 15C. The impulse response 2510 is for a maximum delay of 1 μsec assuming a calibration signal PN code chipping rate of 5 Mchips/sec and 2 samples per chip. In FIG. 15A, $C(t,\tau)$ 2510 has three substantial distinguishable propagation paths at delays of 0.2 (P1), 0.4 (P2) and 1.0 (P3) μsec respectively. The maximum expected time delay corresponds to a signal path of about 300 meters which is reasonable for the booster range and operational environment. The 1.0 μsec maximum time delay in combination with a "deliberate delay $\tau_d$ of 1 μsec may be implemented using a 21-tap complex finite impulse response (FIR) filter with half-chip tap spacing for Channel Filtering operation.

FIG. 15A shows the Channel Filter unit 2512. The Channel Filter unit 2512 has a 21-tap FIR filter 2506 with tap delay of D=0.1 μsec spacing and with variable complex coefficients set to the values shown in table 2508. The FIR filter 2506 output is connected to one of the inputs of the adder unit 2504 and the input of the FIR filter unit 2506 is connected to the output of the adder unit 2504. The other input of the adder unit 2504 is connected to the AD/C 2502. In the example, the AD/C is the unit 1046 in FIG. 9. The FIR filter 2506 produces a replica of the received signal at the selected time delay with the respective complex coefficient specifying the magnitudes and the phases of the received Up-link Returned-Signal to "wipe off" the incoming first (P1), second (P2) and third (P3) return signal components. The FIR filter 2506 can either be implemented by a Field-Programmable Gate Array (FPGA), Application-Specific Integrated Circuit (ASIC) or by the Signal Conditioning unit 1048 in FIG. 9. The processes of channel estimation $C(t,\tau)$ and up-dating the FIR filter 2506 filter coefficients are performed continuously with an update rate that depends on the channel coherence time. For the example, a value of 100 msec can be assumed as the indoor channels exhibit large coherence time. Other embodiments may include an adaptive algorithm such as Normalized Least Mean-Square (NLMS) and Recursive Least Squares (RLS), which converge on the received calibration signal at the Network unit 1002 to estimate the filter coefficients on an on-going basis.

Wire Connected Booster

FIG. 17 shows an example of analogue implementation of the Network unit 600 using a transmission cable as the physical medium for communication with the User unit 4000 shown as unit 702 in FIG. 6. The Network unit 602 shown in FIG. 5 is modified to the form of unit 3005 shown in FIG. 16 to transmit and receive signals from the User unit 4005 over a cable configured to support the operating bandwidth and the frequencies of the Network unit 3005 and User unit 4005 signals. The User unit 4005 shown in FIG. 17 is a modified version of the User unit 702 shown in FIG. 6. The cable interface unit 3020 comprises a line interface unit 3160 which is connected to the transmission/reception cable 3170 and hybrid combiners 3140 on the forward-link and 3150 on the reverse link of the Network sub unit 3010. The line interface unit 3160 performs load matching for connection to a transmission line 3170 and includes other appropriate components such as the amplifiers, modulation and frequency converters with modem functionality for reliable transmission over the transmission line 3170. Design of the line interface unit 3160 is dependent on the transmission line 3170 characteristics. For example, in-building power lines or telephone lines can be used as a transmission line 3170 as in homePNA and HomeNetworking, where the line interface unit 3160 is designed for such transmission. The hybrid combiner or directional coupler 3140 may be used to combine the control link 3110 signal with the forward-link signal. Otherwise, output lines from the directional coupler unit 3040 and the control link unit 3110 can be connected directly to line interface unit 3160, where signals are modulated on adjacent carriers for simultaneous transmission to the User unit 4005. The hybrid combiner or directional coupler 3150 is used to extract sufficient signal for reception and detection of control link 3110 received signal. In another embodiment, the input lines to the directional coupler unit 3130 and the control link unit 3110 can directly be connected to line interface unit 3160 if the control and data signals are modulated on adjacent carriers for simultaneous transmission from the User unit 4005. Hybrid combiners may be used instead of the directional couplers 3040, 3130 and 3085. Reverse-link Network unit 3060 receiver internal LNA amplifier may be positioned before the directional coupler 3130 or the hybrid combiner replacement, in FIG. 16.

Figure 16:
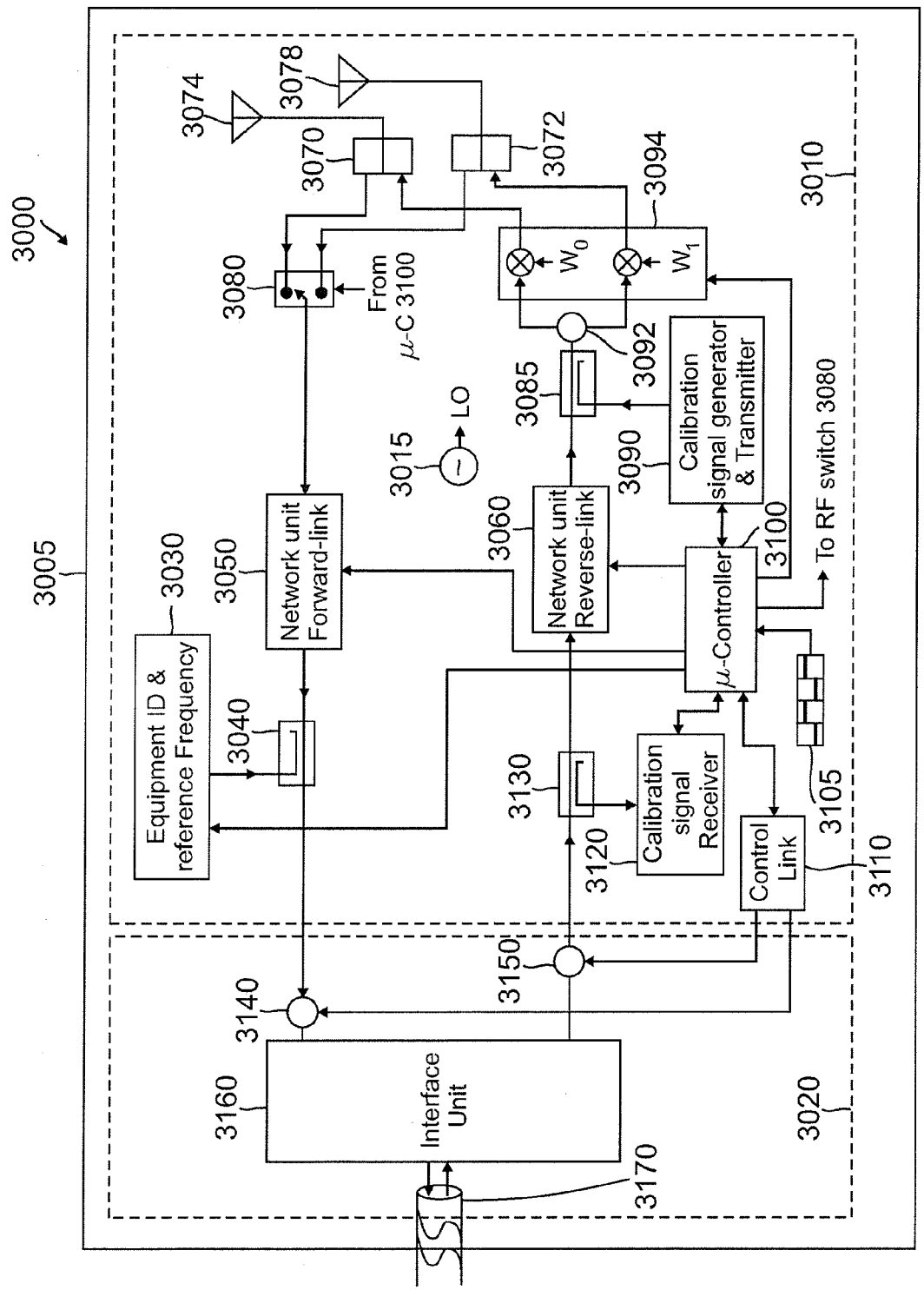
FIGS. 16-19 are schematic block diagrams showing other repeater embodiments.

Operation of the units 3015, 3030, 3050, 3120, 3110, 3060, 3100, 3105, 3070, 3074, 3078, 3080, 3085, 3040, 3130, 3072, 3092, 3094, and 3090 in FIG. 16 is similar to that of units 640, 624, 604, 620, 628, 606, 626, 627, 614, 610, 608, 612, 618, 630, 616, 613, 646, 648, and 622 respectively, as discussed in the description of FIG. 5. In the modified Network unit 3005, the directional coupler 3040 (630 in FIG. 5) is connected to hybrid combiner 3140, and the directional coupler 3130 (616 in FIG. 5) is connected to hybrid combiner 3150.

FIG. 16 shows an example of analogue implementation of the User unit 702 (FIG. 6) using a transmission cable as the physical medium for communication with the Network unit 3005 (602 in FIG. 5). The User unit 702 shown in FIG. 6 is modified into the form of unit 4005 shown in FIG. 17 to transmit and receive signals from the Network unit 3005 over a cable capable of supporting the operating bandwidth and the frequencies of the Network 3005 and User 4005 units' signals. Network unit 3005 is a modified version of the Network unit 602 shown in FIG. 5. Cable interface unit 4020 comprises a line interface unit 4150 which is connected to the transmission/reception cable 4160 and two hybrid combiners 4130 on the forward-link and 4140 on the reverse link of the User sub unit 4010. The line interface unit 4150 performs load matching for connection to a transmission line 4160. Other suitable components such as the amplifiers, modulation and frequency converters with modem functionalities may be used to enable reliable transmission over the transmission line 4160. Design of the line interface unit 4150 is dependent on the transmission line 4160 characteristics. For example, even in-building power lines or telephone lines can be used as the transmission line 4160 as in homePNA and HomeNetworking applications where the line interface unit 4150 is designed for such operation. The hybrid combiner, mixer, or directional coupler 4140 is used to combine the control link 4120 signal with the reverse-link signal. The hybrid combiner or duplexer 4130 is used to extract sufficient signal for reception and detection of control link 4120 received signal. Hybrid combiners may also be used instead of the directional coupler 4110. In some embodiments, the Forward-link Network unit 4080 internal LNA amplifier may be positioned before the directional coupler 4110 or the hybrid combiner replacement, shown in FIG. 17.

Operation of the units 4015, 4030, 4040, 4050, 4070, 4075, 4080, 4090, 4100, 4110, 4060, 4062, 4152, 4154, 4128, 4126, 4124, 4122, and 4120 in FIG. 17 is similar to that of units 722, 734, 736, 732, 728, 721, 724, 726, 716, 718, 754, 756, 745, 748, 746, 744, 742, 740, and 720 respectively, as discussed with respect to FIG. 6. In the modified User unit 4005, the directional coupler 4110 (718 in FIG. 6) is connected to hybrid combiner 4130, and the Reverse-link User unit 4090 (726 in FIG. 6) is connected to hybrid combiner 4140.

Operation of Network unit 3010 is similar to the operation of the Network unit 602 and the operation of User unit 4010 is similar to the operation of the User unit 702.

The control-flow description given for FIGS. 7A, 7B, 7C, 7D, 8A, 8B, 8C, and 8D can also be used for the digital implementation of the Network unit 3005 and User unit 4005, described with reference to FIGS. 16 and 17.

FIG. 18 shows an example of digital implementation of the Network unit 5005 (1002 in FIG. 9), which uses a transmission cable as a physical medium for communication with the User unit 6005 (2002 in FIG. 10). The Network unit 1002 shown in FIG. 9 is modified to the unit 5005 shown in FIG. 18 to transmit and receive signals from the User unit 6005 shown in FIG. 19 over a cable capable of supporting the operating bandwidth and the frequencies of the Network 5005 and User 6005 unit signals. User unit 6005 is a modified version of the User unit 2002 shown in FIG. 10. Modified cable interface unit 5020 comprises a line interface unit 5220, which is connected to the transmission/reception cable 5210 and the Line Modem unit 5250.

The line interface unit 5220 and the Line Modem unit 5250 perform load matching for connection to transmission line 5210. Other suitable components may be included such as amplifiers, and modulation and frequency converters to enable reliable transmission over the transmission line 5210. The design of the line interface unit 5220 is dependent on the transmission line 5210 characteristics. For example, even the in-building power lines or telephone lines can be used as the transmission line 5210 as in a homePNA application, where the line interface unit 5220 is designed for such operation. The line modem unit 5250 may be used for modulation and demodulation AD/C, DA/C and all other modem functionalities for transmission of the signal generated by the unit 5010 and reception of signal generated by unit 6010. Also, design of the modem unit 5250 may implement example technologies such as homePNA and Home Networking. Line modem unit 5250 is connected to data multiplexer unit 5260 and data demultiplexer unit 5270. The line modem unit 5250 can be implemented in analogue, digital, or hybrid technology. In the illustrative example, line modem unit 5250 is implemented in digital domain.

Data multiplexer unit 5260 is also connected to Signal Conditioning unit 5110 and the control link unit 5145, and is used to multiplex control samples generated by control link unit 5145 and the signal samples generated by the Signal Conditioning unit 5110. The multiplexer unit 5260 can be integrated within the Signal Conditioning unit 5110. Otherwise, output lines of the Signal Conditioning unit 5110 and control link unit 5140 can be separately connected to the line modem unit 5250 and modulated on adjacent carriers for simultaneous transmission to the User unit 6005.

Data Demultiplexer unit 5270 is also connected to Signal Conditioning unit 5130 and the control link unit 5145 and is used to demultiplex received control samples and the signal samples generated by the User unit 6005. The demultiplexer unit 5270 can be integrated within the Signal Conditioning unit 5130. Otherwise, the input line to the Signal Conditioning unit 5130 and control link unit 5145 can be separately connected to the line modem unit 5250 if the control and data signals are modulated on adjacent carriers for simultaneous transmission by the User unit 6005.

In Network unit 5005, the calibration signal receiver unit (1016 in FIG. 9) is no longer implemented separately. No analogue signal path is available in the reverse-link of the Network unit 5005, so the calibration signal receiver unit (1016 in FIG. 9) is integrated and operates in the Signal Conditioning unit 5130.

Operation of the units 5110, 5120, 5130, 5140, 5141, 5145, 5386, 5100, 5150, 5090, 5160, 5080, 5170, 5070, 5180, 5190, 5060, 5050, 5040, 5082, 5060, 5064, and 5030 in FIG. 18 is similar to that of units 1022, 1024, 1048, 1060, 1061, 1062, 1070, 1020, 1050, 1018, 1052, 1014, 1054, 1012, 1056, 1058, 1010, 1008, 1004, 1007, 1010, 1072, and 1006 respectively, as discussed for FIG. 9.

Figure 19:
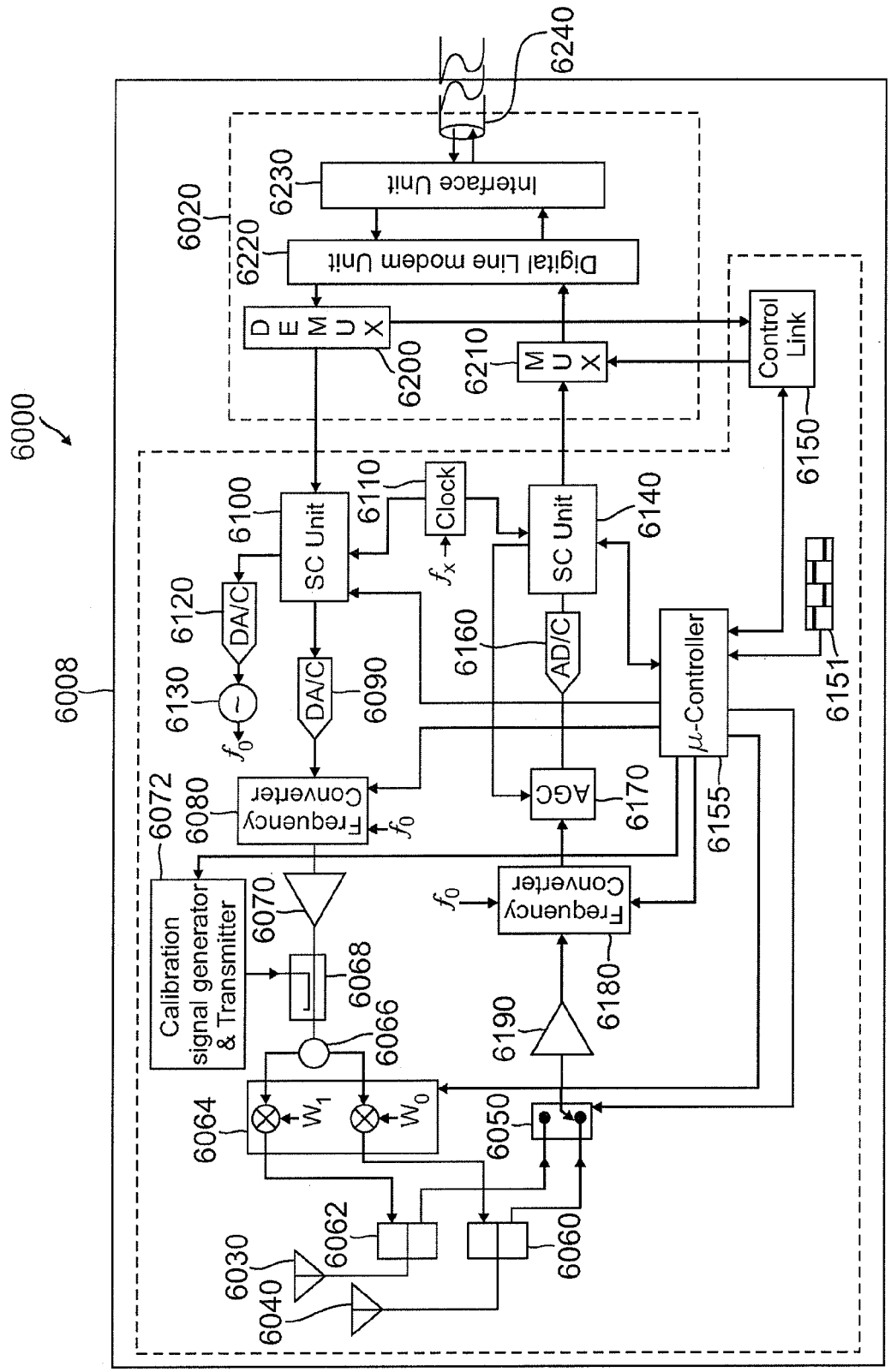

FIG. 19 shows an example of digital implementation of the User unit 6005 (2002 in FIG. 10) using a transmission cable as the physical medium for communication with the Network unit 5005 (1002 in FIG. 9). The User unit 2002 shown in FIG. 10 is modified to the form of unit 6005, shown in FIG. 19 to transmit and receive signals from the Network unit 5005, which is a modified version of the Network unit 1002 shown in FIG. 9 over a cable capable of supporting the operating bandwidth and the frequencies of the Network 5005 and User 6005 units signals. The modified cable interface unit 6020 comprises a line interface unit 6230 which is connected to the transmission/reception cable 6240 and the line modem unit 6220.

The line interface unit 6230 an d the Line Modem unit 6220 perform load matching for connection to transmission line 6240. Other suitable components such as the amplifiers, modulation and frequency converters may be included for reliable transmission over the transmission line 6240. Design of the line interface unit 6230 is dependent on the transmission line 6240 characteristics. For example, even in-building power lines or telephone lines can be used as the transmission line 6240 as in homePNA operation where the line interface unit 6230 is designed accordingly. The line modem unit 6220 may be used for modulation and demodulation, AD/C, DA/C and other functionalities for transmission of the signal generated by the unit 6010 and reception of signal generated by unit 5005. Design of the modem unit 6220 may be implemented in various example technologies such as homePNA and Home Networking. Line modem unit 6220 is connected to data multiplexer unit 6200 and data demultiplexer unit 6210. The line modem unit 6220 can be implemented in analogue, digital, or hybrid technology. In the illustrative example line modem unit 6220 is assumed to be implemented in digital domain.

Data multiplexer unit 6210 is also connected to Signal Conditioning unit 6140 and the control link unit 6150 and is used to multiplex control samples generated by control link unit 6150 and the signal samples generated by the Signal Conditioning unit 6140. The multiplexer unit 6210 can be integrated within the Signal Conditioning unit 6140. Otherwise, the output lines of the Signal Conditioning unit 6140 and control link unit 6150 can be separately connected to the line modem unit 6220 and modulated on adjacent carriers for simultaneous transmission to the Network unit 5005.

Data Demultiplexer unit 6200 is also connected to Signal Conditioning unit 6100 and the control link unit 6150 and may be used to demultiplex received control samples and the signal samples generated by the Network unit 5005. The demultiplexer unit 6200 can be integrated within the Signal Conditioning unit 6100. Otherwise, the input to the Signal Conditioning unit 6100 and control link unit 6150 can be separately connected to the line modem unit 6220 if the control and data signals are modulated on adjacent carriers for simultaneous transmission by the Network unit 5005.

Operation of units 6150, 6100, 6110, 6140, 6155, 6151, 6120, 6130, 6090, 6160, 6170, 6080, 6180, 6070, 6190, 6060, 6050, 6030, 6062, 6064, 6066, 6068, 6072, and 6040 in FIG. 19 is similar to that of units 2056, 2020, 2022, 2046, 2054, 2055, 2021, 2023, 2024, 2044, 2042, 2026, 2040, 2028, 2038, 2030, 2032, 2034, 2031, 2072, 2070, 2027, 2025, and 2036 respectively, as discussed in the description of FIG. 10.

The control-flow description given for FIGS. 7A, 7B, 7C, 7D, 8A, 8B, 8C, and 8D can also be used for the digital implementation of the Network unit 5005 and User unit 6005, which is discussed above in FIGS. 18 and 19.

Operation of Network unit 5010 is similar to the operation of the Network unit 1002 and the operation of User unit 6010 is similar to the operation of the User unit 2002.

Channel Estimation by Matrix Inversion

Most digital communication systems use a type of channel estimation. Channel estimation is usually based on a known transmitted sequence known as a "preamble" or "midamble" or "training sequence" among other names. The known sequence is used for channel estimation as various algorithms use the priori knowledge to estimate the propagation channel complex parameters and characteristics. Two basic signal processing domains are fundamentally used for channel estimation including (1) a time domain approach, and (2) a frequency domain approach. The time domain approach includes many algorithms, most notably "correlation-based" and "Matrix inversion" algorithms. While correlation based channel estimation are frequently used, mainly due to simplicity and low computation demands, matrix inversion channel estimation yields better performance at a higher computation cost. "Matrix inversion" channel estimation algorithms may otherwise be used.

The complex impulse response coefficients of a propagation channel of length n may be estimated using a single transmitted sequence that is using a known PN code of length s samples, where s>n. The time invariant channel coefficients may be represented by matrix H given as:

$$H^T = [h_1 \ h_2 \ \ldots \ h_n]$$

and the transmitted PN sequence as M given by:

$$M^T = [m_1 \ m_2 \ \ldots \ m_s]$$

All s samples of the code are not needed for the channel sounding operation. The convolution between the Channel coefficients and the transmitted sequence yields the received signal $e_t$ given by:

$$e_1 = m_n \cdot h_1 + \ldots + m_2 \cdot h_{n-1} + m_1 \cdot h_n$$
$$e_2 = m_{n+1} \cdot h_1 + \ldots + m_3 \cdot h_{n-1} + m_2 \cdot h_n$$
$$\vdots$$
$$e_k = m_{k+n} \cdot h_1 + \ldots + m_{k+1} \cdot h_{n-1} + m_k \cdot h_n$$

where t denotes time and k is the maximum required estimation length, and a relationship s>k+n is assumed.

The above set of equations, representing $e_t$, can be shown in matrix notation as the following:

$$E = V.H$$

where the received complex samples, E, can be represented as:

$$E^T = [e_1 e_2 \ \ldots \ e_k]$$

and:

$$V = \begin{bmatrix} m_n & m_{n-1} & \ldots & m_1 \\ m_{n+1} & m_n & \ldots & m_2 \\ \vdots & & & \\ m_{k+n} & m_{k+n-1} & \ldots & m_k \end{bmatrix}$$

The complex channel impulse response can be calculated by matrix inversion of V matrix as shown below:

$$I.H = V^{-1}.E$$

where I is an Identity matrix with dimensions of n×n. If k=n, unique values of the channel impulse response can be calculated using the above matrix inversion approach. V matrix can be pre-calculated and stored in memory, so that high computation complexity is avoided.

What is claimed is:

1. A method for mediating wireless communications between a network transceiver and a user transceiver in a wireless communication system, the method comprising:
generating a two-way communication pathway between a network unit and a user unit to facilitate signal communication between the network transceiver and the user transceiver in separate repeater hops between the network transceiver and the network unit, between the user transceiver and the user unit, and between the network unit and the user unit, the network unit and the user unit being included in a repeater; and
communicating signals to each of the network unit and the user unit in an operating frequency band of the network transceiver or user transceiver respectively such that radio frequency isolation between the network unit and the user unit is maximized, and the signal communication between the network unit and the user unit has a signal waveform that is independent of the operating frequency band of the signal communication between the network and user transceivers.

2. The method in accordance with claim 1, wherein communicating signals to each of the network unit and the user unit includes beam-forming the signals to each of the network unit and the user unit.

3. The method in accordance with claim 1, wherein communicating the signals to each of the network unit and the user unit includes controlling an effective radiated power to increase coverage area of the riser unit.

4. The method in accordance with claim 1, wherein communicating signals to each of the network unit and the user unit includes controlling an effective radiated power to improve link quality of the network unit.

5. The method in accordance with claim 1, wherein communicating signals to each of the network unit and the user unit includes using transmit antennas at the network and user transceiver operating frequency, and using beam-formers to control an effective radiated power of the network unit and user unit to increase coverage area of the user unit.

6. The method in accordance with claim 1, wherein communicating signals to each of the network unit and the user unit includes using receiver antennas at the network and user transceiver operating frequency, and using beam-formers to control antenna radiation patterns of the network unit and user unit to increase coverage area of the user unit.

7. The method in accordance with claim 1, wherein the repeater hop between the network unit and the user unit is tuned to operate at a frequency band selected from a group consisting of an Unlicensed National Information Infrastructure (U-ISM) spectrum frequency band, an Unlicensed Personal Communication Services (U-PCS) spectrum frequency band, an Industrial, Scientific and Medical (ISM) spectrum frequency band, and any unlicensed frequency band.

8. The method in accordance with claim 1, further comprising compensating for propagation losses between the network unit and user unit alone using a gain controller.

9. The method in accordance with claim 1, wherein the repeater hop between the network unit and the user unit on the communication pathway communicates on a carrier signal that is independent of signals communicated between the repeater and the network and user transceivers.

10. The method in accordance with claim 1, wherein the repeater hop between the network unit and the user unit on the communication pathway communicates at a carrier frequency that is independent of signals communicated between the repeater and the network and user transceivers.

11. The method in accordance with claim 1, wherein the repeater hop between the network unit and the user unit on the communication pathway communicates with a signal waveform that is independent of signal waveform communicated between the repeater and the network and user transceivers.

12. The method in accordance with claim 1, wherein dedicated wireless data and/or control links in the communication pathway between the network unit and the user unit operate at unlicensed frequency bands.

13. The method in accordance with claim 1, wherein dedicated wireless data and/or control links in the communication pathway between the network unit and the user unit operate according to a wireless standard.

14. The method in accordance with claim 1, wherein dedicated wireless data and/or control links in the communication pathway between the network unit and the user unit are power-controlled for operation at reduced transmit power.

15. The method in accordance with claim 1, wherein the network unit and/or the user unit comprise:
   a pair of antennas; and
   a switch connected to the pair of antennas that performs switching operations for transmit/receive operations enabling switched antenna diversity in all or some of the separate repeater hops.

16. A method for mediating wireless communications between a network transceiver and a user transceiver in a wireless communication system, the method comprising:
   establishing a network link with the network transceiver;
   establishing a user link with the user transceiver;
   generating a two-way communication pathway between a network unit and a user unit to facilitate signal communication between the network transceiver and the user transceiver in separate repeater hops between the network transceiver and the network unit, between the user transceiver and the user unit, and between the network unit and the user unit; and
   communicating signals to each of the network unit and the user unit in an operating frequency band of the network transceiver or user transceiver respectively such that radio frequency isolation between the network unit and the user unit is maximized, the signal communication on the network link and the user link having a signal waveform that is independent of the operating frequency band of the signal communication between the network and user transceivers.

17. The method in accordance with claim 16, wherein the repeater hop between the network unit and the user unit is tuned to operate at a frequency band selected from a group consisting of an Unlicensed National Information Infrastructure (U-ISM) spectrum frequency band, an Unlicensed Personal Communication Services (U-PCS) spectrum frequency band, an Industrial, Scientific and Medical (ISM) spectrum frequency band, and any unlicensed frequency band.

18. The method in accordance with claim 16, wherein the repeater hop between the network unit and the user unit on the communication pathway communicates with a signal waveform that is independent of signal waveform communicated between the repeater and the network and user transceivers.

19. A repeater that mediates communication between a network transceiver and a user transceiver in a wireless communication system, the repeater comprising:
   a network unit that communicates with the network transceiver;
   a user unit that communicates with the user transceiver;
   a two-way communication pathway between the network unit and the user unit to facilitate signal communication between the network transceiver and the user transceiver in separate repeater hops between the network transceiver and the network unit, between the user transceiver and the user unit, and between the network unit and the user unit; and
   a signal processing unit respectively coupled to the network unit and the user unit, each signal processing unit to communicate signals in an operating frequency band of the network and user transceivers, and to control effective radiated power of the signals;
   the communication between the network unit and the user unit having a signal waveform that is independent of the operating frequency band of the communication between the network and user transceivers.

20. The repeater in accordance with claim 19, wherein the signal processing unit is a beam-former unit.

* * * * *

UNITED STATES PATENT AND TRADEMARK OFFICE
CERTIFICATE OF CORRECTION

| | | |
|---|---|---|
| PATENT NO. | : 8,086,174 B2 | Page 1 of 1 |
| APPLICATION NO. | : 12/422221 | |
| DATED | : December 27, 2011 | |
| INVENTOR(S) | : Mohebbi | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 115 days.

Signed and Sealed this
Second Day of October, 2012

David J. Kappos
*Director of the United States Patent and Trademark Office*